United States Patent
Allen et al.

(10) Patent No.: US 10,344,118 B2
(45) Date of Patent: Jul. 9, 2019

(54) ROMP POLYMERS HAVING IMPROVED RESISTANCE TO HYDROCARBON FLUIDS

(71) Applicant: MATERIA, INC., Pasadena, CA (US)

(72) Inventors: Daryl P. Allen, Pasadena, CA (US); Christopher J. Cruce, Poway, CA (US); James J. Danford, Murrieta, CA (US)

(73) Assignee: MATERIA, INC., Pasadena, CA (US)

( * ) Notice: Subject to any disclaimer, the term of this patent is extended or adjusted under 35 U.S.C. 154(b) by 0 days.

(21) Appl. No.: 15/547,930

(22) PCT Filed: Feb. 11, 2016

(86) PCT No.: PCT/US2016/017448
§ 371 (c)(1),
(2) Date: Aug. 1, 2017

(87) PCT Pub. No.: WO2016/130742
PCT Pub. Date: Aug. 18, 2016

(65) Prior Publication Data
US 2018/0022863 A1    Jan. 25, 2018

Related U.S. Application Data

(60) Provisional application No. 62/116,389, filed on Feb. 14, 2015.

(51) Int. Cl.
| | | |
|---|---|---|
| C08G 61/02 | (2006.01) | |
| C08G 61/08 | (2006.01) | |
| C08K 5/13 | (2006.01) | |
| C08K 5/14 | (2006.01) | |

(52) U.S. Cl.
CPC ............ *C08G 61/02* (2013.01); *C08G 61/08* (2013.01); *C08K 5/13* (2013.01); *C08K 5/14* (2013.01); *C08G 2261/11* (2013.01); *C08G 2261/122* (2013.01); *C08G 2261/135* (2013.01); *C08G 2261/3325* (2013.01); *C08G 2261/418* (2013.01); *C08G 2261/598* (2013.01); *C08G 2261/76* (2013.01)

(58) Field of Classification Search
CPC .. C08K 5/13; C08K 5/14; C08L 65/00; C08G 61/08; C08G 61/02; C08G 2261/122; C08G 2261/418; C08G 2261/76; C08G 2261/135; C08G 2261/11; C08G 2261/3325; C08G 2261/598
USPC ........................................................ 524/739
See application file for complete search history.

(56) References Cited

U.S. PATENT DOCUMENTS

| | | |
|---|---|---|
| 4,507,453 A | 3/1985 | Tom |
| 4,899,005 A | 2/1990 | Lane et al. |
| 5,204,427 A | 4/1993 | Torii et al. |
| 5,268,232 A | 12/1993 | Khasat et al. |
| 5,312,940 A | 5/1994 | Grubbs et al. |
| 5,342,909 A | 8/1994 | Grubbs et al. |
| 5,728,785 A | 3/1998 | Grubbs et al. |
| 5,977,393 A | 11/1999 | Grubbs et al. |
| 6,281,307 B1 | 8/2001 | Muhlebach et al. |
| 6,284,852 B1 | 9/2001 | Lynn et al. |
| 6,486,279 B2 | 11/2002 | Lynn et al. |
| 6,552,139 B1 | 4/2003 | Herrmann et al. |
| 6,613,910 B2 | 9/2003 | Grubbs et al. |
| 6,620,955 B1 | 9/2003 | Pederson et al. |
| 6,635,768 B1 | 10/2003 | Herrmann et al. |
| 6,787,620 B2 | 9/2004 | Herrmann et al. |
| 6,838,489 B2 | 1/2005 | Bell et al. |
| 6,921,735 B2 | 7/2005 | Hoveyda et al. |
| 7,026,495 B1 | 4/2006 | Pederson et al. |
| 7,273,915 B2 | 9/2007 | Sugawara |
| 7,294,717 B2 | 11/2007 | Herrmann et al. |
| 7,378,528 B2 | 5/2008 | Herrmann et al. |
| 7,652,145 B2 | 1/2010 | Herrmann et al. |
| 7,666,966 B2 | 2/2010 | Sugawara |
| 7,671,224 B2 | 3/2010 | Winde et al. |
| 7,687,635 B2 | 3/2010 | Verpoort et al. |
| 8,318,965 B2 | 11/2012 | Grela et al. |
| 2003/0055262 A1 | 3/2003 | Grubbs et al. |

(Continued)

FOREIGN PATENT DOCUMENTS

| | | |
|---|---|---|
| EP | 0271007 B1 | 3/1994 |
| EP | 02171007 | 3/1994 |

(Continued)

OTHER PUBLICATIONS

Ppeter Schwab, Robert H. Grubbs and Joseph W. Ziller Synthesis and Applications of RuCl2(=CHR')(PR3)2: The Influence of the Alkylidene Moiety on Metathesis Activity J. Am. Chem. Soc. 1996, 118, 100-110.
Melanie S. Sanford, Michael Ulman, and Robert H. Grubbs New Insights into the Mechanism of Ruthenium-Catalyzed Olefin Metathesis Reactions J. Am. Chem. Soc. 2001, 123, 749-750.
Matthias Scholl, Sheng Ding, Choon Woo Lee, and Robert H. Grubbs Synthesis and Activity of a New Generation of Ruthenium-Based Olefin Metathesis Catalysts Coordinated with 1,3-Dimesityl-4,5-dihydroimidazol-2-ylidene Ligands Org. Lett. 1999 vol. 1, No. 6, 953-956.
ASTM D3616 Standard Test Method for Rubber—Determination of Gel, Swelling Index, and Dilute Solution Viscosity.
International Search Report and Written Opinion in International Application No. PCT/US2016/017448, dated Apr. 19, 2016.

(Continued)

*Primary Examiner* — William K Cheung
(74) *Attorney, Agent, or Firm* — J.A. Lindeman & Co, PLLC; Jeffrey Lindeman; Aaron Raphael

(57) ABSTRACT

The present invention relates to compositions comprising at least one cyclic olefin, at least one metal carbene olefin metathesis catalyst, and dicumyl peroxide. The present invention relates to a method of making ROMP polymers and articles of manufacture with improved resistance to hydrocarbon fluids. Particularly the invention relates to ROMP polymer compositions with improved resistance to hydrocarbon fluids. Such ROMP polymers and ROMP polymer compositions can be used in a variety of materials and composite applications.

12 Claims, No Drawings

(56) References Cited

U.S. PATENT DOCUMENTS

| | | | |
|---|---|---|---|
| 2003/0069374 A1* | 4/2003 | Grubbs | B01J 31/181 526/171 |
| 2003/0144437 A1* | 7/2003 | Bell | B01J 31/2265 526/171 |
| 2007/0043188 A1 | 2/2007 | Schaubroeck et al. | |
| 2007/0185343 A1 | 8/2007 | Verpoort et al. | |
| 2008/0125531 A1* | 5/2008 | Sugawara | B32B 27/04 524/384 |
| 2008/0293905 A9 | 11/2008 | Schaubroeck et al. | |
| 2014/0329017 A1 | 11/2014 | Wang et al. | |
| 2014/0357820 A1 | 12/2014 | Stephen et al. | |
| 2014/0370318 A1 | 12/2014 | Stephen et al. | |

FOREIGN PATENT DOCUMENTS

| | | |
|---|---|---|
| EP | 1757613 | 1/2011 |
| EP | 1757613 B1 | 1/2011 |
| EP | 1577282 | 6/2011 |
| EP | 1577282 B1 | 6/2011 |
| WO | 02/14376 A2 | 2/2002 |
| WO | WO0214376 | 2/2002 |
| WO | 02/079208 A2 | 10/2002 |
| WO | WO02079208 | 10/2002 |
| WO | 03/011455 A1 | 2/2003 |
| WO | WO03011455 | 2/2003 |
| WO | 2010/037550 A1 | 4/2010 |
| WO | WO20100375 | 4/2010 |
| WO | 2012/174502 A2 | 12/2012 |
| WO | WO20121745 | 12/2012 |

OTHER PUBLICATIONS

International Preliminary Report on Patentability in International Application No. PCT/US2016/017448, dated Aug. 24, 2017.

Standard Test Method for Rubber—Determination of Gel, Swelling Index, and Dilute Solution Viscosity; ASTM Designation: D3616-95 (Reapproved 2014).

Sanford et al., "New Insights into the Mechanism of Ruthenium-Catalyzed Olefin Metathesis Reactions", J. Am. Chem. Soc., 2001, 123, pp. 749-750.

Scholl et al., "Synthesis and Activity of a New Generation of Ruthenium-Based Olefin Metathesis Catalysts Coordinated with 1,3-Dimesityl-4,5-dihydromidazol-2-ylidene Ligands", Org. Lett. 1999, vol. 1, No. 6, pp. 953-956.

Schwab et al., "Synthesis and Applications of RuCl2(=CHR')(PR3)2: The Influence of the Alkylidene Moiety on Metathesis Activity", J. Am. Chem. Soc., 1996, 118, pp. 100-110.

* cited by examiner

ROMP POLYMERS HAVING IMPROVED RESISTANCE TO HYDROCARBON FLUIDS

RELATED APPLICATIONS

This application is a 35 U.S.C. § 371 national stage application of PCT International Application No. PCT/US2016/017448, filed on Feb. 11, 2016, which claims the benefit of the filing date of U.S. Provisional Application No. 62/116,389, filed on Feb. 14, 2015, the contents of which are incorporated by reference herein in their entireties.

TECHNICAL FIELD

The present invention relates to compositions comprising at least one cyclic olefin, at least one metal carbene olefin metathesis catalyst, and dicumyl peroxide. The present invention relates to a method of making ROMP polymers and articles of manufacture with improved resistance to hydrocarbon fluids. Particularly the invention relates to ROMP polymer compositions with improved resistance to hydrocarbon fluids. Such ROMP polymers and ROMP polymer compositions can be used in a variety of materials and composite applications.

BACKGROUND

Olefin metathesis has emerged as a unique and powerful transformation for the interconversion of olefinic hydrocarbons, namely due to the development of well-defined catalysts. See Grubbs, R. H. *Handbook of Metathesis*, Wiley-VCH: Weinheim, Germany (2003). The exceptionally wide scope of substrates and functional group tolerances makes olefin metathesis a valuable technique that quickly and efficiently produces otherwise hard to make molecules, compared to traditional synthetic organic techniques. In particular, certain Ruthenium and Osmium metal carbene compounds known as "Grubbs catalysts," have been identified as effective catalysts for olefin metathesis reactions such as, cross metathesis (CM), ring-closing metathesis (RCM), ring-opening metathesis (ROM), ring-opening cross metathesis (ROCM), ring-opening metathesis polymerization (ROMP) and acyclic diene metathesis (ADMET) polymerization. The use of such Ruthenium carbene complexes has greatly expanded the scope of olefin metathesis due to increased tolerance of organic functionality, moisture, and oxygen.

Polymers prepared by metathesis polymerization of cyclic olefins (i.e., ROMP polymers), particularly polymers based on dicyclopentadiene, having good resistance to hydrocarbon fluids (e.g., hydrocarbon solvents such as gasoline, naphthas, chlorinated hydrocarbons, toluenes, benzenes xylenes and other aromatics) are desirable and have numerous applications in industry. Therefore, there is an ongoing need in industry for ROMP polymers having improved resistance to hydrocarbon fluids, particularly hydrocarbon solvents.

U.S. Pat. No. 4,507,453 teaches that in polymers prepared by metathesis polymerization of cyclic olefins (i.e., ROMP polymers), particularly polymers based on dicyclopentadiene, one important property that gives rise to hydrocarbon fluid resistance is the extent to which the polymer is crosslinked, where the extent of crosslinking is provided by the polymer's gel swell value. As described therein, gel swell is typically measured through methods which are in general accordance with ASTM D-3616, which sets forth a method for making gel swell measurements by immersing a polymer in a hydrocarbon solvent (e.g., toluene) for a period of time at a given temperature, where gel swell is expressed as a percentage defined as final polymer weight minus initial polymer weight, divided by initial polymer weight times one hundred.

U.S. Pat. No. 5,728,785 teaches that polymers prepared by metathesis polymerization of cyclic olefins (i.e., ROMP polymers), particularly polymers based on dicyclopentadiene, having high density crosslinking are desirable for their improved mechanical strength and low gel swell. In other words, increased crosslink density correlates to decreased gel swell.

U.S. Pat. No. 5,268,232 teaches that polymers prepared by metathesis polymerization of cyclic olefins (i.e., ROMP polymers), particularly polymers based on dicyclopentadiene, are capable of crosslinking the unsaturated double bonds of the polymer and thereby increasing the crosslink density of the polymer and its glass transition temperature (Tg). In other words, increased crosslink density correlates to increased Tg values.

Therefore, based on the teachings in the art, one skilled in the art would anticipate that ROMP polymers having higher Tg values, would correspondingly possess a higher crosslink density and also a lower gel swell. So, relying on the teachings in the art, one skilled in the art wanting to prepare a polymer having a lower gel swell, would expect such polymers to possess a higher Tg value.

The inventors have discovered that while ROMP polymers of the present invention possess comparable Tg values to ROMP polymers known and exemplified in the art, the ROMP polymers of the present invention possessed lower gel swell values than ROMP polymers known and exemplified in the art. This discovery, as described and exemplified herein, was surprising and unexpected in view of the teachings in the art.

SUMMARY OF THE INVENTION

As presented above, polymers prepared by metathesis polymerization of cyclic olefins (i.e., ROMP polymers), particularly polymers based on dicyclopentadiene, having improved resistance to hydrocarbon fluids are desirable and are needed in industry. The present invention meets this need.

The present invention provides compositions (e.g., resin compositions and ROMP compositions) useful for preparing ROMP polymers, wherein the prepared ROMP polymers possess improved resistance to hydrocarbon fluids, compared to the prior art compositions.

In one embodiment, the ROMP polymers prepared from resin compositions or ROMP compositions of the invention disclosed herein comprising, inter alia, dicumyl peroxide, have lower gel swell values than comparable ROMP polymers prepared from resin compositions or ROMP compositions containing an equimolar amount of a peroxide radical initiator not of the invention. Gel swell of ROMP polymers was determined and measured as described herein. The ROMP polymers prepared from resin compositions or ROMP compositions of the invention disclosed herein comprising, inter alia, dicumyl peroxide exhibit a gel swell which is at least 10% lower than comparable ROMP polymers prepared from resin compositions or ROMP compositions containing an equimolar amount of a peroxide radical initiator not of the invention. For clarity, the aforementioned percent difference in gel swell is determined by the following formula: [((gel swell of polymer prepared from resin composition containing an equimolar amount of a peroxide radical initiator not of the invention)−(gel swell of polymer prepared from resin composition containing an equimolar amount of dicumyl peroxide radical initiator))/(gel swell of polymer prepared from resin composition containing an equimolar amount of a peroxide radical initiator not of the invention)]×100.

In one embodiment, the ROMP polymers prepared from resin compositions or ROMP compositions of the invention disclosed herein comprising, inter alia, dicumyl peroxide have lower gel swell values than comparable ROMP polymers prepared from resin compositions or ROMP compositions containing an equimolar amount of di-tert-butyl peroxide. Gel swell of ROMP polymers was determined and measured as described herein. The ROMP polymers prepared from resin compositions or ROMP compositions of the invention disclosed herein comprising, inter alia, dicumyl peroxide exhibit a gel swell which is at least 10% lower than comparable ROMP polymers prepared from resin compositions or ROMP compositions containing an equimolar amount of di-tert-butyl peroxide. For clarity, the aforementioned percent difference in gel swell is determined by the following formula: [((gel swell of polymer prepared from resin composition containing an equimolar amount of di-tert-butyl peroxide)−(gel swell of polymer prepared from resin composition containing an equimolar amount of dicumyl peroxide))/(gel swell of polymer prepared from resin composition containing an equimolar amount of di-tert-butyl peroxide)]×100.

In one embodiment, the invention provides a resin composition comprising at least one cyclic olefin, at least one metal carbene olefin metathesis catalyst, and dicumyl peroxide.

In one embodiment, the invention provides a resin composition having improved resistance to hydrocarbon fluids, the resin composition comprising at least one cyclic olefin, at least one metal carbene olefin metathesis catalyst, and dicumyl peroxide.

In another embodiment, the invention provides a resin composition comprising a cyclic olefin composition, dicumyl peroxide and a catalyst composition, wherein the cyclic olefin composition comprises at least one cyclic olefin and the catalyst composition comprises at least one metal carbene olefin metathesis catalyst.

In another embodiment, the invention provides a resin composition having improved resistance to hydrocarbon fluids, the resin composition comprising a cyclic olefin composition, dicumyl peroxide and a catalyst composition, wherein the cyclic olefin composition comprises at least one cyclic olefin and the catalyst composition comprises at least one metal carbene olefin metathesis catalyst.

In another embodiment, the invention provides a ROMP composition comprising at least one cyclic olefin, at least one metal carbene olefin metathesis catalyst, and dicumyl peroxide.

In another embodiment, the invention provides a ROMP composition having improved resistance to hydrocarbon fluids, the ROMP composition comprising at least one cyclic olefin, at least one metal carbene olefin metathesis catalyst, and dicumyl peroxide.

In another embodiment, the invention provides a ROMP composition comprising a resin composition and a catalyst composition, wherein the resin composition comprises dicumyl peroxide and a cyclic olefin composition comprising at least one cyclic olefin, and the catalyst composition comprises at least one metal carbene olefin metathesis catalyst.

In another embodiment, the invention provides a ROMP composition having improved resistance to hydrocarbon fluids, the ROMP composition comprising a resin composition and a catalyst composition, wherein the resin composition comprises dicumyl peroxide and a cyclic olefin composition comprising at least one cyclic olefin, and the catalyst composition comprises at least one metal carbene olefin metathesis catalyst.

In one embodiment, the invention provides a resin composition comprising at least one cyclic olefin, at least one metal carbene olefin metathesis catalyst, at least one antixodiant, and dicumyl peroxide.

In one embodiment, the invention provides a resin composition having improved resistance to hydrocarbon fluids, the resin composition comprising at least one cyclic olefin, at least one metal carbene olefin metathesis catalyst, at least one antixodiant, and dicumyl peroxide.

In another embodiment, the invention provides a resin composition comprising a cyclic olefin composition, dicumyl peroxide, at least one antixodiant, and a catalyst composition, wherein the cyclic olefin composition comprises at least one cyclic olefin and the catalyst composition comprises at least one metal carbene olefin metathesis catalyst.

In another embodiment, the invention provides a resin composition having improved resistance to hydrocarbon fluids, the resin composition comprising a cyclic olefin composition, dicumyl peroxide, at least one antioxidant, and a catalyst composition, wherein the cyclic olefin composition comprises at least one cyclic olefin and the catalyst composition comprises at least one metal carbene olefin metathesis catalyst.

In another embodiment, the invention provides a ROMP composition comprising at least one cyclic olefin, at least one metal carbene olefin metathesis catalyst, at least one antioxidant, and dicumyl peroxide.

In another embodiment, the invention provides a ROMP composition having improved resistance to hydrocarbon fluids, the ROMP composition comprising at least one cyclic olefin, at least one metal carbene olefin metathesis catalyst, at least one antioxidant, and dicumyl peroxide.

In another embodiment, the invention provides a ROMP composition comprising a resin composition and a catalyst composition, wherein the resin composition comprises dicumyl peroxide, at least one antioxidant, and a cyclic olefin composition comprising at least one cyclic olefin, and the catalyst composition comprises at least one metal carbene olefin metathesis catalyst.

In another embodiment, the invention provides a ROMP composition having improved resistance to hydrocarbon fluids, the ROMP composition comprising a resin composition and a catalyst composition, wherein the resin composition comprises dicumyl peroxide, at least one antioxidant, and a cyclic olefin composition comprising at least one cyclic olefin, and the catalyst composition comprises at least one metal carbene olefin metathesis catalyst.

In another embodiment, the invention provides a resin composition having improved resistance to hydrocarbon fluids, the resin composition comprising a cyclic olefin composition, dicumyl peroxide, at least one antioxidant, at least one impact modifier and a catalyst composition, wherein the cyclic olefin composition comprises at least one cyclic olefin and the catalyst composition comprises at least one metal carbene olefin metathesis catalyst.

In another embodiment, the invention provides a ROMP composition comprising at least one cyclic olefin, at least one metal carbene olefin metathesis catalyst, at least one antioxidant, at least one impact modifier and dicumyl peroxide.

In another embodiment, the invention provides a ROMP composition having improved resistance to hydrocarbon fluids, the ROMP composition comprising at least one cyclic olefin, at least one metal carbene olefin metathesis catalyst, at least one antioxidant, at least one impact modifier and dicumyl peroxide.

In another embodiment, the invention provides a ROMP composition comprising a resin composition and a catalyst composition, wherein the resin composition comprises dicumyl peroxide, at least one antioxidant, at least one impact modifier and a cyclic olefin composition comprising at least one cyclic olefin, and the catalyst composition comprises at least one metal carbene olefin metathesis catalyst.

In another embodiment, the invention provides a ROMP composition having improved resistance to hydrocarbon fluids, the ROMP composition comprising a resin composition and a catalyst composition, wherein the resin composition comprises dicumyl peroxide, at least one antioxidant, at least one impact modifier and a cyclic olefin composition comprising at least one cyclic olefin, and the catalyst composition comprises at least one metal carbene olefin metathesis catalyst.

In another embodiment, the invention provides a resin composition having improved resistance to hydrocarbon fluids, the resin composition comprising a cyclic olefin composition, dicumyl peroxide, at least one antioxidant, at least one impact modifier, at least one exogenous inhibitor and a catalyst composition, wherein the cyclic olefin composition comprises at least one cyclic olefin and the catalyst composition comprises at least one metal carbene olefin metathesis catalyst.

In another embodiment, the invention provides a ROMP composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides a ROMP composition having improved resistance to hydrocarbon fluids, the ROMP composition comprising at least one cyclic olefin, at least one metal carbene olefin metathesis catalyst, at least one antioxidant, at least one exogenous inhibitor, at least one impact modifier and dicumyl peroxide.

In another embodiment, the invention provides a ROMP composition comprising a resin composition and a catalyst composition, wherein the resin composition comprises dicumyl peroxide, at least one antioxidant, at least one impact modifier, at least one exogenous inhibitor and a cyclic olefin composition comprising at least one cyclic olefin, and the catalyst composition comprises at least one metal carbene olefin metathesis catalyst.

In another embodiment, the invention provides a ROMP composition having improved resistance to hydrocarbon fluids, the ROMP composition comprising a resin composition and a catalyst composition, wherein the resin composition comprises dicumyl peroxide, at least one antioxidant, at least one impact modifier, at least one exogenous inhibitor and a cyclic olefin composition comprising at least one cyclic olefin, and the catalyst composition comprises at least one metal carbene olefin metathesis catalyst.

In another embodiment, the invention provides a ROMP polymer composition comprising at least one cyclic olefin, at least one metal carbene olefin metathesis catalyst, and dicumyl peroxide.

In another embodiment, the invention provides a ROMP polymer composition having improved resistance to hydrocarbon fluids, the ROMP polymer composition comprising at least one cyclic olefin, at least one metal carbene olefin metathesis catalyst, and dicumyl peroxide.

In another embodiment, the invention provides a ROMP polymer composition comprising a resin composition and a catalyst composition, wherein the resin composition comprises dicumyl peroxide and a cyclic olefin composition comprising at least one cyclic olefin, and the catalyst composition comprises at least one metal carbene olefin metathesis catalyst.

In another embodiment, the invention provides a ROMP polymer composition having improved resistance to hydrocarbon fluids, the ROMP polymer composition comprising a resin composition and a catalyst composition, wherein the resin composition comprises dicumyl peroxide and a cyclic olefin composition comprising at least one cyclic olefin, and the catalyst composition comprises at least one metal carbene olefin metathesis catalyst.

In another embodiment, the invention provides a ROMP polymer composition comprising at least one cyclic olefin, at least one metal carbene olefin metathesis catalyst, at least one antioxidant, and dicumyl peroxide.

In another embodiment, the invention provides a ROMP polymer composition having improved resistance to hydrocarbon fluids, the ROMP polymer composition comprising at least one cyclic olefin, at least one metal carbene olefin metathesis catalyst, at least one antioxidant, and dicumyl peroxide.

In another embodiment, the invention provides a ROMP polymer composition comprising a resin composition and a catalyst composition, wherein the resin composition comprises dicumyl peroxide, at least one antioxidant, and a cyclic olefin composition comprising at least one cyclic olefin, and the catalyst composition comprises at least one metal carbene olefin metathesis catalyst.

In another embodiment, the invention provides a ROMP polymer composition having improved resistance to hydrocarbon fluids, the ROMP polymer composition comprising a resin composition and a catalyst composition, wherein the resin composition comprises dicumyl peroxide, at least one antioxidant, and a cyclic olefin composition comprising at least one cyclic olefin, and the catalyst composition comprises at least one metal carbene olefin metathesis catalyst.

In another embodiment, the invention provides a ROMP polymer composition comprising at least one cyclic olefin, at least one metal carbene olefin metathesis catalyst, at least one antioxidant, at least one impact modifier and dicumyl peroxide.

In another embodiment, the invention provides a ROMP polymer composition having improved resistance to hydrocarbon fluids, the ROMP polymer composition comprising at least one cyclic olefin, at least one metal carbene olefin metathesis catalyst, at least one antioxidant, at least one impact modifier and dicumyl peroxide.

In another embodiment, the invention provides a ROMP polymer composition comprising a resin composition and a catalyst composition, wherein the resin composition comprises dicumyl peroxide, at least one antioxidant, at least one impact modifier and a cyclic olefin composition comprising at least one cyclic olefin, and the catalyst composition comprises at least one metal carbene olefin metathesis catalyst.

In another embodiment, the invention provides a ROMP polymer composition having improved resistance to hydrocarbon fluids, the ROMP polymer composition comprising a resin composition and a catalyst composition, wherein the resin composition comprises dicumyl peroxide, at least one antioxidant, at least one impact modifier and a cyclic olefin composition comprising at least one cyclic olefin, and the catalyst composition comprises at least one metal carbene olefin metathesis catalyst.

In another embodiment, the invention provides a ROMP polymer composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides a ROMP polymer composition having improved resistance to hydrocarbon fluids, the ROMP polymer composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides a ROMP polymer composition comprising a resin composition and a catalyst composition, wherein the resin composition comprises dicumyl peroxide, at least one antioxidant, at least one impact modifier, at least one exogenous inhibitor and a cyclic olefin composition comprising at least one cyclic olefin, and the catalyst composition comprises at least one metal carbene olefin metathesis catalyst.

In another embodiment, the invention provides a ROMP polymer composition having improved resistance to hydrocarbon fluids, the ROMP polymer composition comprising a resin composition and a catalyst composition, wherein the resin composition comprises dicumyl peroxide, at least one antioxidant, at least one impact modifier, at least one exogenous inhibitor and a cyclic olefin composition comprising at least one cyclic olefin, and the catalyst composition comprises at least one metal carbene olefin metathesis catalyst.

In another embodiment, the invention provides a method of making a ROMP polymer comprising: providing a catalyst composition comprising at least one metal carbene olefin metathesis catalyst; providing a resin composition comprising a cyclic olefin composition and dicumyl peroxide, wherein the cyclic olefin composition comprises at least one cyclic olefin; combining the catalyst composition and the resin composition to form a ROMP composition; and subjecting the ROMP composition to conditions effective to promote polymerization of the ROMP composition.

In another embodiment, the invention provides a method of making a ROMP polymer having improved resistance to hydrocarbon fluids, the method comprising: providing a catalyst composition comprising at least one metal carbene olefin metathesis catalyst; providing a resin composition comprising a cyclic olefin composition and dicumyl peroxide, wherein the cyclic olefin composition comprises at least one cyclic olefin; combining the catalyst composition and the resin composition to form a ROMP composition; and subjecting the ROMP composition to conditions effective to promote polymerization of the ROMP composition.

In another embodiment, the invention provides a method of making a ROMP polymer comprising: providing a catalyst composition comprising at least one metal carbene olefin metathesis catalyst; providing a resin composition comprising a cyclic olefin composition, at least one antioxidant, and dicumyl peroxide, wherein the cyclic olefin composition comprises at least one cyclic olefin; combining the catalyst composition and the resin composition to form a ROMP composition; and subjecting the ROMP composition to conditions effective to promote polymerization of the ROMP composition.

In another embodiment, the invention provides a method of making a ROMP polymer having improved resistance to hydrocarbon fluids, the method comprising: providing a catalyst composition comprising at least one metal carbene olefin metathesis catalyst; providing a resin composition comprising a cyclic olefin composition, at least one antioxidant, and dicumyl peroxide, wherein the cyclic olefin composition comprises at least one cyclic olefin; combining the catalyst composition and the resin composition to form a ROMP composition; and subjecting the ROMP composition to conditions effective to promote polymerization of the ROMP composition.

In another embodiment, the invention provides a method of making a ROMP polymer comprising: providing a catalyst composition comprising at least one metal carbene olefin metathesis catalyst; providing a resin composition comprising a cyclic olefin composition, at least one antioxidant, at least one impact modifier and dicumyl peroxide, wherein the cyclic olefin composition comprises at least one cyclic olefin; combining the catalyst composition and the resin composition to form a ROMP composition; and subjecting the ROMP composition to conditions effective to promote polymerization of the ROMP composition.

In another embodiment, the invention provides a method of making a ROMP polymer having improved resistance to hydrocarbon fluids, the method comprising: providing a catalyst composition comprising at least one metal carbene olefin metathesis catalyst; providing a resin composition comprising a cyclic olefin composition, at least one antioxidant, at least one impact modifier and dicumyl peroxide, wherein the cyclic olefin composition comprises at least one cyclic olefin; combining the catalyst composition and the resin composition to form a ROMP composition; and subjecting the ROMP composition to conditions effective to promote polymerization of the ROMP composition.

In another embodiment, the invention provides a method of making a ROMP polymer comprising: providing a catalyst composition comprising at least one metal carbene olefin metathesis catalyst; providing a resin composition comprising a cyclic olefin composition, at least one antioxidant, at least one impact modifier, at least one exogenous inhibitor and dicumyl peroxide, wherein the cyclic olefin composition comprises at least one cyclic olefin; combining the catalyst composition and the resin composition to form a ROMP composition; and subjecting the ROMP composition to conditions effective to promote polymerization of the ROMP composition.

In another embodiment, the invention provides a method of making a ROMP polymer having improved resistance to hydrocarbon fluids, the method comprising: providing a catalyst composition comprising at least one metal carbene olefin metathesis catalyst; providing a resin composition comprising a cyclic olefin composition, at least one antioxidant, at least one impact modifier, at least one exogenous inhibitor and dicumyl peroxide, wherein the cyclic olefin composition comprises at least one cyclic olefin; combining the catalyst composition and the resin composition to form a ROMP composition; and subjecting the ROMP composition to conditions effective to promote polymerization of the ROMP composition.

In another embodiment, the invention provides a method of making an article of manufacture comprising: providing a catalyst composition comprising at least one metal carbene olefin metathesis catalyst; providing a resin composition comprising a cyclic olefin composition and dicumyl peroxide, wherein the cyclic olefin composition comprises at least one cyclic olefin; combining the catalyst composition and the resin composition to form a ROMP composition; and subjecting the ROMP composition to conditions effective to promote polymerization of the ROMP composition.

In another embodiment, the invention provides a method of making an article of manufacture having improved resistance to hydrocarbon fluids, the method comprising: providing a catalyst composition comprising at least one metal carbene olefin metathesis catalyst; providing a resin composition comprising a cyclic olefin composition and dicumyl peroxide, wherein the cyclic olefin composition comprises at least one cyclic olefin; combining the catalyst composition and the resin composition to form a ROMP composition; and subjecting the ROMP composition to conditions effective to promote polymerization of the ROMP composition.

In another embodiment, the invention provides a method of making an article of manufacture comprising: providing a catalyst composition comprising at least one metal carbene olefin metathesis catalyst; providing a resin composition comprising a cyclic olefin composition, at least one antioxidant, and dicumyl peroxide, wherein the cyclic olefin composition comprises at least one cyclic olefin; combining the catalyst composition and the resin composition to form a ROMP composition; and subjecting the ROMP composition to conditions effective to promote polymerization of the ROMP composition.

In another embodiment, the invention provides a method of making an article of manufacture having improved resistance to hydrocarbon fluids, the method comprising: providing a catalyst composition comprising at least one metal carbene olefin metathesis catalyst; providing a resin composition comprising a cyclic olefin composition, at least one antioxidant, and dicumyl peroxide, wherein the cyclic olefin composition comprises at least one cyclic olefin; combining the catalyst composition and the resin composition to form a ROMP composition; and subjecting the ROMP composition to conditions effective to promote polymerization of the ROMP composition.

In another embodiment, the invention provides a method of making an article of manufacture comprising: providing a catalyst composition comprising at least one metal carbene olefin metathesis catalyst; providing a resin composition comprising a cyclic olefin composition, at least one antioxidant, at least one impact modifier and dicumyl peroxide, wherein the cyclic olefin composition comprises at least one cyclic olefin; combining the catalyst composition and the resin composition to form a ROMP composition; and subjecting the ROMP composition to conditions effective to promote polymerization of the ROMP composition.

In another embodiment, the invention provides a method of making an article of manufacture having improved resistance to hydrocarbon fluids, the method comprising: providing a catalyst composition comprising at least one metal carbene olefin metathesis catalyst; providing a resin composition comprising a cyclic olefin composition, at least one antioxidant, at least one impact modifier and dicumyl peroxide, wherein the cyclic olefin composition comprises at least one cyclic olefin; combining the catalyst composition and the resin composition to form a ROMP composition; and subjecting the ROMP composition to conditions effective to promote polymerization of the ROMP composition.

In another embodiment, the invention provides a method of making an article of manufacture comprising: providing a catalyst composition comprising at least one metal carbene olefin metathesis catalyst; providing a resin composition comprising a cyclic olefin composition, at least one antioxidant, at least one impact modifier, at least one exogenous inhibitor and dicumyl peroxide, wherein the cyclic olefin composition comprises at least one cyclic olefin; combining the catalyst composition and the resin composition to form a ROMP composition; and subjecting the ROMP composition to conditions effective to promote polymerization of the ROMP composition.

In another embodiment, the invention provides a method of making an article of manufacture having improved resistance to hydrocarbon fluids, the method comprising: providing a catalyst composition comprising at least one metal carbene olefin metathesis catalyst; providing a resin composition comprising a cyclic olefin composition, at least one antioxidant, at least one impact modifier, at least one exogenous inhibitor and dicumyl peroxide, wherein the cyclic olefin composition comprises at least one cyclic olefin; combining the catalyst composition and the resin composition to form a ROMP composition; and subjecting the ROMP composition to conditions effective to promote polymerization of the ROMP composition.

In another embodiment, the invention provides an article of manufacture comprising a resin composition comprising at least one cyclic olefin, at least one metal carbene olefin metathesis catalyst, and dicumyl peroxide.

In another embodiment, the invention provides an article of manufacture having improved resistance to hydrocarbon fluids, the article of manufacture comprising a resin composition comprising at least one cyclic olefin, at least one metal carbene olefin metathesis catalyst, and dicumyl peroxide.

In another embodiment, the invention provides an article of manufacture comprising a resin composition comprising a cyclic olefin composition, dicumyl peroxide and a catalyst composition, wherein the cyclic olefin comprises at least one cyclic olefin and the catalyst composition comprises at least one metal carbene olefin metathesis catalyst.

In another embodiment, the invention provides an article of manufacture having improved resistance to hydrocarbon fluids, the article of manufacture comprising a resin composition comprising a cyclic olefin composition, dicumyl peroxide and a catalyst composition, wherein the cyclic olefin comprises at least one cyclic olefin and the catalyst composition comprises at least one metal carbene olefin metathesis catalyst.

In another embodiment, the invention provides an article of manufacture comprising a ROMP composition comprising at least one cyclic olefin, at least one metal carbene olefin metathesis catalyst, and dicumyl peroxide.

In another embodiment, the invention provides an article of manufacture having improved resistance to hydrocarbon fluids, the article of manufacture comprising a ROMP composition comprising at least one cyclic olefin, at least one metal carbene olefin metathesis catalyst, and dicumyl peroxide.

In another embodiment, the invention provides an article of manufacture comprising a ROMP composition comprising a resin composition and a catalyst composition, wherein the resin composition comprises dicumyl peroxide and a cyclic olefin composition comprising at least one cyclic olefin, and the catalyst composition comprises at least one metal carbene olefin metathesis catalyst.

In another embodiment, the invention provides an article of manufacture having improved resistance to hydrocarbon fluids, the article of manufacture comprising a ROMP composition comprising a resin composition and a catalyst composition, wherein the resin composition comprises dicumyl peroxide and a cyclic olefin composition comprising at least one cyclic olefin, and the catalyst composition comprises at least one metal carbene olefin metathesis catalyst.

In another embodiment, the invention provides an article of manufacture comprising a resin composition comprising at least one cyclic olefin, at least one metal carbene olefin metathesis catalyst, at least one antioxidant, and dicumyl peroxide.

In another embodiment, the invention provides an article of manufacture having improved resistance to hydrocarbon fluids, the article of manufacture comprising a resin composition comprising at least one cyclic olefin, at least one metal carbene olefin metathesis catalyst, at least one antioxidant, and dicumyl peroxide.

In another embodiment, the invention provides an article of manufacture comprising a resin composition comprising a cyclic olefin composition, dicumyl peroxide, at least one antioxidant, and a catalyst composition, wherein the cyclic olefin comprises at least one cyclic olefin and the catalyst composition comprises at least one metal carbene olefin metathesis catalyst.

In another embodiment, the invention provides an article of manufacture having improved resistance to hydrocarbon fluids, the article of manufacture comprising a resin composition comprising a cyclic olefin composition, dicumyl peroxide, at least one antioxidant, and a catalyst composition, wherein the cyclic olefin comprises at least one cyclic olefin and the catalyst composition comprises at least one metal carbene olefin metathesis catalyst.

In another embodiment, the invention provides an article of manufacture comprising a ROMP composition comprising at least one cyclic olefin, at least one metal carbene olefin metathesis catalyst, at least one antioxidant, and dicumyl peroxide.

In another embodiment, the invention provides an article of manufacture having improved resistance to hydrocarbon fluids, the article of manufacture comprising a ROMP composition comprising at least one cyclic olefin, at least one metal carbene olefin metathesis catalyst, at least one antioxidant, and dicumyl peroxide.

In another embodiment, the invention provides an article of manufacture comprising a ROMP composition comprising a resin composition and a catalyst composition, wherein the resin composition comprises dicumyl peroxide, at least one antioxidant, and a cyclic olefin composition comprising at least one cyclic olefin, and the catalyst composition comprises at least one metal carbene olefin metathesis catalyst.

In another embodiment, the invention provides an article of manufacture having improved resistance to hydrocarbon fluids, the article of manufacture comprising a ROMP composition comprising a resin composition and a catalyst composition, wherein the resin composition comprises dicumyl peroxide, at least one antioxidant, and a cyclic olefin composition comprising at least one cyclic olefin, and the catalyst composition comprises at least one metal carbene olefin metathesis catalyst.

In another embodiment, the invention provides an article of manufacture comprising a resin composition comprising at least one cyclic olefin, at least one metal carbene olefin metathesis catalyst, at least one antioxidant, at least one impact modifier and dicumyl peroxide.

In another embodiment, the invention provides an article of manufacture having improved resistance to hydrocarbon fluids, the article of manufacture comprising a resin composition comprising at least one cyclic olefin, at least one metal carbene olefin metathesis catalyst, at least one antioxidant, at least one impact modifier and dicumyl peroxide.

In another embodiment, the invention provides an article of manufacture comprising a resin composition comprising a cyclic olefin composition, dicumyl peroxide, at least one antioxidant, at least one impact modifier and a catalyst composition, wherein the cyclic olefin comprises at least one cyclic olefin and the catalyst composition comprises at least one metal carbene olefin metathesis catalyst.

In another embodiment, the invention provides an article of manufacture having improved resistance to hydrocarbon fluids, the article of manufacture comprising a resin composition comprising a cyclic olefin composition, dicumyl peroxide, at least one antioxidant, at least one impact modifier and a catalyst composition, wherein the cyclic olefin comprises at least one cyclic olefin and the catalyst composition comprises at least one metal carbene olefin metathesis catalyst.

In another embodiment, the invention provides an article of manufacture comprising a ROMP composition comprising at least one cyclic olefin, at least one metal carbene olefin metathesis catalyst, at least one antioxidant, at least one impact modifier and dicumyl peroxide.

In another embodiment, the invention provides an article of manufacture having improved resistance to hydrocarbon fluids, the article of manufacture comprising a ROMP composition comprising at least one cyclic olefin, at least one metal carbene olefin metathesis catalyst, at least one antioxidant, at least one impact modifier and dicumyl peroxide.

In another embodiment, the invention provides an article of manufacture comprising a ROMP composition comprising a resin composition and a catalyst composition, wherein the resin composition comprises dicumyl peroxide, at least one antioxidant, at least one impact modifier and a cyclic olefin composition comprising at least one cyclic olefin, and the catalyst composition comprises at least one metal carbene olefin metathesis catalyst.

In another embodiment, the invention provides an article of manufacture having improved resistance to hydrocarbon fluids, the article of manufacture comprising a ROMP composition comprising a resin composition and a catalyst composition, wherein the resin composition comprises dicumyl peroxide, at least one antioxidant, at least one impact modifier and a cyclic olefin composition comprising at least one cyclic olefin, and the catalyst composition comprises at least one metal carbene olefin metathesis catalyst.

In another embodiment, the invention provides an article of manufacture comprising a resin composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides an article of manufacture having improved resistance to hydrocarbon fluids, the article of manufacture comprising a resin composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides an article of manufacture comprising a resin composition comprising a cyclic olefin composition, dicumyl peroxide, at least one antioxidant, at least one impact modifier, at least one exogenous inhibitor at least one exogenous inhibitor and a catalyst composition, wherein the cyclic olefin comprises at least one cyclic olefin and the catalyst composition comprises at least one metal carbene olefin metathesis catalyst.

In another embodiment, the invention provides an article of manufacture having improved resistance to hydrocarbon fluids, the article of manufacture comprising a resin composition comprising a cyclic olefin composition, dicumyl peroxide, at least one antioxidant, at least one impact modifier, at least one exogenous inhibitor at least one exogenous inhibitor and a catalyst composition, wherein the cyclic olefin comprises at least one cyclic olefin and the catalyst composition comprises at least one metal carbene olefin metathesis catalyst.

In another embodiment, the invention provides an article of manufacture comprising a ROMP composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides an article of manufacture having improved resistance to hydrocarbon fluids, the article of manufacture comprising a ROMP composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides an article of manufacture comprising a ROMP composition comprising a resin composition and a catalyst composition, wherein the resin composition comprises dicumyl peroxide, at least one antioxidant, at least one impact modifier, at least one exogenous inhibitor and a cyclic olefin composition comprising at least one cyclic olefin, and the catalyst composition comprises at least one metal carbene olefin metathesis catalyst.

In another embodiment, the invention provides an article of manufacture having improved resistance to hydrocarbon fluids, the article of manufacture comprising a ROMP composition comprising a resin composition and a catalyst composition, wherein the resin composition comprises dicumyl peroxide, at least one antioxidant, at least one impact modifier, at least one exogenous inhibitor and a cyclic olefin composition comprising at least one cyclic olefin, and the catalyst composition comprises at least one metal carbene olefin metathesis catalyst.

In another embodiment, the invention provides a resin composition for making a ROMP polymer, the resin composition comprising at least one cyclic olefin, at least one metal carbene olefin metathesis catalyst, and dicumyl peroxide.

In another embodiment, the invention provides a resin composition for making a ROMP polymer having improved resistance to hydrocarbon fluids, the resin composition comprising at least one cyclic olefin, at least one metal carbene olefin metathesis catalyst, and dicumyl peroxide.

In another embodiment, the invention provides a resin composition for making a ROMP polymer, the resin composition comprising a cyclic olefin composition, dicumyl peroxide and a catalyst composition, wherein the cyclic olefin composition comprises at least one cyclic olefin and the catalyst composition comprises at least one metal carbene olefin metathesis catalyst.

In another embodiment, the invention provides a resin composition for making a ROMP polymer having improved resistance to hydrocarbon fluids, the resin composition comprising a cyclic olefin composition, dicumyl peroxide and a catalyst composition, wherein the cyclic olefin composition comprises at least one cyclic olefin and the catalyst composition comprises at least one metal carbene olefin metathesis catalyst.

In another embodiment, the invention provides a ROMP composition for making a ROMP polymer, the ROMP composition comprising at least one cyclic olefin, at least one metal carbene olefin metathesis catalyst, and dicumyl peroxide.

In another embodiment, the invention provides a ROMP composition for making a ROMP polymer having improved resistance to hydrocarbon fluids, the ROMP composition comprising at least one cyclic olefin, at least one metal carbene olefin metathesis catalyst, and dicumyl peroxide.

In another embodiment, the invention provides a ROMP composition for making a ROMP polymer, the ROMP composition comprising a resin composition and a catalyst composition, wherein the resin composition comprises dicumyl peroxide and a cyclic olefin composition comprising at least one cyclic olefin, and the catalyst composition comprises at least one metal carbene olefin metathesis catalyst.

In another embodiment, the invention provides a ROMP composition for making a ROMP polymer having improved resistance to hydrocarbon fluids, the ROMP composition comprising a resin composition and a catalyst composition, wherein the resin composition comprises dicumyl peroxide and a cyclic olefin composition comprising at least one cyclic olefin, and the catalyst composition comprises at least one metal carbene olefin metathesis catalyst.

In another embodiment, the invention provides a resin composition for making a ROMP polymer, the resin composition comprising at least one cyclic olefin, at least one metal carbene olefin metathesis catalyst, at least one antioxidant, and dicumyl peroxide.

In another embodiment, the invention provides a resin composition for making a ROMP polymer having improved resistance to hydrocarbon fluids, the resin composition comprising at least one cyclic olefin, at least one metal carbene olefin metathesis catalyst, at least one antioxidant, and dicumyl peroxide.

In another embodiment, the invention provides a resin composition for making a ROMP polymer, the resin composition comprising a cyclic olefin composition, dicumyl peroxide, at least one antioxidant, and a catalyst composition, wherein the cyclic olefin composition comprises at least one cyclic olefin and the catalyst composition comprises at least one metal carbene olefin metathesis catalyst.

In another embodiment, the invention provides a resin composition for making a ROMP polymer having improved resistance to hydrocarbon fluids, the resin composition comprising a cyclic olefin composition, dicumyl peroxide, at least one antioxidant, and a catalyst composition, wherein the cyclic olefin composition comprises at least one cyclic olefin and the catalyst composition comprises at least one metal carbene olefin metathesis catalyst.

In another embodiment, the invention provides a ROMP composition for making a ROMP polymer, the ROMP composition comprising at least one cyclic olefin, at least one metal carbene olefin metathesis catalyst, at least one antioxidant, and dicumyl peroxide.

In another embodiment, the invention provides a ROMP composition for making a ROMP polymer having improved resistance to hydrocarbon fluids, the ROMP composition comprising at least one cyclic olefin, at least one metal carbene olefin metathesis catalyst, at least one antioxidant, and dicumyl peroxide.

In another embodiment, the invention provides a ROMP composition for making a ROMP polymer, the ROMP composition comprising a resin composition and a catalyst composition, wherein the resin composition comprises dicumyl peroxide, at least one antioxidant, and a cyclic olefin composition comprising at least one cyclic olefin, and the catalyst composition comprises at least one metal carbene olefin metathesis catalyst.

In another embodiment, the invention provides a ROMP composition for making a ROMP polymer having improved resistance to hydrocarbon fluids, the ROMP composition comprising a resin composition and a catalyst composition, wherein the resin composition comprises dicumyl peroxide, at least one antioxidant, and a cyclic olefin composition comprising at least one cyclic olefin, and the catalyst composition comprises at least one metal carbene olefin metathesis catalyst.

In another embodiment, the invention provides a resin composition for making a ROMP polymer, the resin composition comprising at least one cyclic olefin, at least one metal carbene olefin metathesis catalyst, at least one antioxidant, at least one impact modifier and dicumyl peroxide.

In another embodiment, the invention provides a resin composition for making a ROMP polymer having improved resistance to hydrocarbon fluids, the resin composition comprising at least one cyclic olefin, at least one metal carbene olefin metathesis catalyst, at least one antioxidant, at least one impact modifier and dicumyl peroxide.

In another embodiment, the invention provides a resin composition for making a ROMP polymer, the resin composition comprising a cyclic olefin composition, dicumyl peroxide, at least one antioxidant, at least one impact modifier and a catalyst composition, wherein the cyclic olefin composition comprises at least one cyclic olefin and the catalyst composition comprises at least one metal carbene olefin metathesis catalyst.

In another embodiment, the invention provides a resin composition for making a ROMP polymer having improved resistance to hydrocarbon fluids, the resin composition comprising a cyclic olefin composition, dicumyl peroxide, at least one antioxidant, at least one impact modifier and a catalyst composition, wherein the cyclic olefin composition comprises at least one cyclic olefin and the catalyst composition comprises at least one metal carbene olefin metathesis catalyst.

In another embodiment, the invention provides a ROMP composition for making a ROMP polymer, the ROMP composition comprising at least one cyclic olefin, at least one metal carbene olefin metathesis catalyst, at least one antioxidant, at least one impact modifier and dicumyl peroxide.

In another embodiment, the invention provides a ROMP composition for making a ROMP polymer having improved resistance to hydrocarbon fluids, the ROMP composition comprising at least one cyclic olefin, at least one metal carbene olefin metathesis catalyst, at least one antioxidant, at least one impact modifier and dicumyl peroxide.

In another embodiment, the invention provides a ROMP composition for making a ROMP polymer, the ROMP composition comprising a resin composition and a catalyst composition, wherein the resin composition comprises dicumyl peroxide, at least one antioxidant, at least one impact modifier and a cyclic olefin composition comprising at least one cyclic olefin, and the catalyst composition comprises at least one metal carbene olefin metathesis catalyst.

In another embodiment, the invention provides a ROMP composition for making a ROMP polymer having improved resistance to hydrocarbon fluids, the ROMP composition comprising a resin composition and a catalyst composition, wherein the resin composition comprises dicumyl peroxide, at least one antioxidant, at least one impact modifier and a cyclic olefin composition comprising at least one cyclic olefin, and the catalyst composition comprises at least one metal carbene olefin metathesis catalyst.

In another embodiment, the invention provides a resin composition for making a ROMP polymer, the resin composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides a resin composition for making a ROMP polymer having improved resistance to hydrocarbon fluids, the resin composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides a resin composition for making a ROMP polymer, the resin composition comprising a cyclic olefin composition, dicumyl peroxide, at least one antioxidant, at least one impact modifier, at least one exogenous inhibitor and a catalyst composition, wherein the cyclic olefin composition comprises at least one cyclic olefin and the catalyst composition comprises at least one metal carbene olefin metathesis catalyst.

In another embodiment, the invention provides a resin composition for making a ROMP polymer having improved resistance to hydrocarbon fluids, the resin composition comprising a cyclic olefin composition, dicumyl peroxide, at least one antioxidant, at least one impact modifier, at least one exogenous inhibitor and a catalyst composition, wherein the cyclic olefin composition comprises at least one cyclic olefin and the catalyst composition comprises at least one metal carbene olefin metathesis catalyst.

In another embodiment, the invention provides a ROMP composition for making a ROMP polymer, the ROMP composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides a ROMP composition for making a ROMP polymer having improved resistance to hydrocarbon fluids, the ROMP composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides a ROMP composition for making a ROMP polymer, the ROMP composition comprising a resin composition and a catalyst composition, wherein the resin composition comprises dicumyl peroxide, at least one antioxidant, at least one impact modifier, at least one exogenous inhibitor and a cyclic olefin composition comprising at least one cyclic olefin, and the catalyst composition comprises at least one metal carbene olefin metathesis catalyst.

In another embodiment, the invention provides a ROMP composition for making a ROMP polymer having improved resistance to hydrocarbon fluids, the ROMP composition comprising a resin composition and a catalyst composition, wherein the resin composition comprises dicumyl peroxide, at least one antioxidant, at least one impact modifier, at least one exogenous inhibitor and a cyclic olefin composition comprising at least one cyclic olefin, and the catalyst composition comprises at least one metal carbene olefin metathesis catalyst.

In another embodiment, the invention provides a resin composition for making an article of manufacture, the resin composition comprising at least one cyclic olefin, at least one metal carbene olefin metathesis catalyst, and dicumyl peroxide.

In another embodiment, the invention provides a resin composition for making an article of manufacture having improved resistance to hydrocarbon fluids, the resin composition comprising at least one cyclic olefin, at least one metal carbene olefin metathesis catalyst, and dicumyl peroxide.

In another embodiment, the invention provides a resin composition for making an article of manufacture, the resin composition comprising a cyclic olefin composition, dicumyl peroxide and a catalyst composition, wherein the cyclic olefin composition comprises at least one cyclic olefin and the catalyst composition comprises at least one metal carbene olefin metathesis catalyst.

In another embodiment, the invention provides a resin composition for making an article of manufacture having improved resistance to hydrocarbon fluids, the resin composition comprising a cyclic olefin composition, dicumyl peroxide and a catalyst composition, wherein the cyclic olefin composition comprises at least one cyclic olefin and the catalyst composition comprises at least one metal carbene olefin metathesis catalyst.

In another embodiment, the invention provides a ROMP composition for making an article of manufacture, the ROMP composition comprising at least one cyclic olefin, at least one metal carbene olefin metathesis catalyst, and dicumyl peroxide.

In another embodiment, the invention provides a ROMP composition for making an article of manufacture having improved resistance to hydrocarbon fluids, the ROMP composition comprising at least one cyclic olefin, at least one metal carbene olefin metathesis catalyst, and dicumyl peroxide.

In another embodiment, the invention provides a ROMP composition for making an article of manufacture, the ROMP composition comprising a resin composition and a catalyst composition, wherein the resin composition comprises dicumyl peroxide and a cyclic olefin composition comprising at least one cyclic olefin, and the catalyst composition comprises at least one metal carbene olefin metathesis catalyst.

In another embodiment, the invention provides a ROMP composition for making an article of manufacture having improved resistance to hydrocarbon fluids, the ROMP composition comprising a resin composition and a catalyst composition, wherein the resin composition comprises dicumyl peroxide and a cyclic olefin composition comprising at least one cyclic olefin, and the catalyst composition comprises at least one metal carbene olefin metathesis catalyst.

In another embodiment, the invention provides a resin composition for making an article of manufacture, the resin composition comprising at least one cyclic olefin, at least one metal carbene olefin metathesis catalyst, at least one antioxidant, and dicumyl peroxide.

In another embodiment, the invention provides a resin composition for making an article of manufacture having improved resistance to hydrocarbon fluids, the resin composition comprising at least one cyclic olefin, at least one metal carbene olefin metathesis catalyst, at least one antioxidant, and dicumyl peroxide.

In another embodiment, the invention provides a resin composition for making an article of manufacture, the resin composition comprising a cyclic olefin composition, dicumyl peroxide, at least one antioxidant, and a catalyst composition, wherein the cyclic olefin composition comprises at least one cyclic olefin and the catalyst composition comprises at least one metal carbene olefin metathesis catalyst.

In another embodiment, the invention provides a resin composition for making an article of manufacture having improved resistance to hydrocarbon fluids, the resin composition comprising a cyclic olefin composition, dicumyl peroxide, at least one antioxidant, and a catalyst composition, wherein the cyclic olefin composition comprises at least one cyclic olefin and the catalyst composition comprises at least one metal carbene olefin metathesis catalyst.

In another embodiment, the invention provides a ROMP composition for making an article of manufacture, the ROMP composition comprising at least one cyclic olefin, at least one metal carbene olefin metathesis catalyst, at least one antioxidant, and dicumyl peroxide.

In another embodiment, the invention provides a ROMP composition for making an article of manufacture having improved resistance to hydrocarbon fluids, the ROMP composition comprising at least one cyclic olefin, at least one metal carbene olefin metathesis catalyst, at least one antioxidant, and dicumyl peroxide.

In another embodiment, the invention provides a ROMP composition for making an article of manufacture, the ROMP composition comprising a resin composition and a catalyst composition, wherein the resin composition comprises dicumyl peroxide, at least one antioxidant, and a cyclic olefin composition comprising at least one cyclic olefin, and the catalyst composition comprises at least one metal carbene olefin metathesis catalyst.

In another embodiment, the invention provides a ROMP composition for making an article of manufacture having improved resistance to hydrocarbon fluids, the ROMP composition comprising a resin composition and a catalyst composition, wherein the resin composition comprises dicumyl peroxide, at least one antioxidant, and a cyclic olefin composition comprising at least one cyclic olefin, and the catalyst composition comprises at least one metal carbene olefin metathesis catalyst.

In another embodiment, the invention provides a resin composition for making an article of manufacture, the resin composition comprising at least one cyclic olefin, at least one metal carbene olefin metathesis catalyst, at least one antioxidant, at least one impact modifier and dicumyl peroxide.

In another embodiment, the invention provides a resin composition for making an article of manufacture having improved resistance to hydrocarbon fluids, the resin composition comprising at least one cyclic olefin, at least one metal carbene olefin metathesis catalyst, at least one antioxidant, at least one impact modifier and dicumyl peroxide.

In another embodiment, the invention provides a resin composition for making an article of manufacture, the resin composition comprising a cyclic olefin composition, dicumyl peroxide, at least one antioxidant, at least one impact modifier and a catalyst composition, wherein the cyclic olefin composition comprises at least one cyclic olefin and the catalyst composition comprises at least one metal carbene olefin metathesis catalyst.

In another embodiment, the invention provides a resin composition for making an article of manufacture having improved resistance to hydrocarbon fluids, the resin composition comprising a cyclic olefin composition, dicumyl peroxide, at least one antioxidant, at least one impact modifier and a catalyst composition, wherein the cyclic olefin composition comprises at least one cyclic olefin and the catalyst composition comprises at least one metal carbene olefin metathesis catalyst.

In another embodiment, the invention provides a ROMP composition for making an article of manufacture, the ROMP composition comprising at least one cyclic olefin, at least one metal carbene olefin metathesis catalyst, at least one antioxidant, at least one impact modifier and dicumyl peroxide.

In another embodiment, the invention provides a ROMP composition for making an article of manufacture having improved resistance to hydrocarbon fluids, the ROMP composition comprising at least one cyclic olefin, at least one metal carbene olefin metathesis catalyst, at least one antioxidant, at least one impact modifier and dicumyl peroxide.

In another embodiment, the invention provides a ROMP composition for making an article of manufacture, the ROMP composition comprising a resin composition and a catalyst composition, wherein the resin composition comprises dicumyl peroxide, at least one antioxidant, at least one impact modifier and a cyclic olefin composition comprising at least one cyclic olefin, and the catalyst composition comprises at least one metal carbene olefin metathesis catalyst.

In another embodiment, the invention provides a ROMP composition for making an article of manufacture having improved resistance to hydrocarbon fluids, the ROMP composition comprising a resin composition and a catalyst composition, wherein the resin composition comprises dicumyl peroxide, at least one antioxidant, at least one impact modifier and a cyclic olefin composition comprising at least one cyclic olefin, and the catalyst composition comprises at least one metal carbene olefin metathesis catalyst.

In another embodiment, the invention provides a resin composition for making an article of manufacture, the resin composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides a resin composition for making an article of manufacture having improved resistance to hydrocarbon fluids, the resin composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides a resin composition for making an article of manufacture, the resin composition comprising a cyclic olefin composition, dicumyl peroxide, at least one antioxidant, at least one impact modifier, at least one exogenous inhibitor and a catalyst composition, wherein the cyclic olefin composition comprises at least one cyclic olefin and the catalyst composition comprises at least one metal carbene olefin metathesis catalyst.

In another embodiment, the invention provides a resin composition for making an article of manufacture having improved resistance to hydrocarbon fluids, the resin composition comprising a cyclic olefin composition, dicumyl peroxide, at least one antioxidant, at least one impact modifier, at least one exogenous inhibitor and a catalyst composition, wherein the cyclic olefin composition comprises at least one cyclic olefin and the catalyst composition comprises at least one metal carbene olefin metathesis catalyst.

In another embodiment, the invention provides a ROMP composition for making an article of manufacture, the ROMP composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides a ROMP composition for making an article of manufacture having improved resistance to hydrocarbon fluids, the ROMP composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides a ROMP composition for making an article of manufacture, the ROMP composition comprising a resin composition and a catalyst composition, wherein the resin composition comprises dicumyl peroxide, at least one antioxidant, at least one impact modifier, at least one exogenous inhibitor and a cyclic olefin composition comprising at least one cyclic olefin, and the catalyst composition comprises at least one metal carbene olefin metathesis catalyst.

In another embodiment, the invention provides a ROMP composition for making an article of manufacture having improved resistance to hydrocarbon fluids, the ROMP composition comprising a resin composition and a catalyst composition, wherein the resin composition comprises dicumyl peroxide, at least one antioxidant, at least one impact modifier, at least one exogenous inhibitor and a cyclic olefin composition comprising at least one cyclic olefin, and the catalyst composition comprises at least one metal carbene olefin metathesis catalyst.

In another embodiment, the invention provides for use of a resin composition for making a ROMP polymer, the resin composition comprising at least one cyclic olefin, at least one metal carbene olefin metathesis catalyst, and dicumyl peroxide.

In another embodiment, the invention provides for use of a resin composition for making a ROMP polymer having improved resistance to hydrocarbon fluids, the resin composition comprising at least one cyclic olefin, at least one metal carbene olefin metathesis catalyst, and dicumyl peroxide.

In another embodiment, the invention provides for use of a resin composition for making a ROMP polymer, the resin composition comprising a cyclic olefin composition, dicumyl peroxide and a catalyst composition, wherein the cyclic olefin composition comprises at least one cyclic olefin and the catalyst composition comprises at least one metal carbene olefin metathesis catalyst.

In another embodiment, the invention provides for use of a resin composition for making a ROMP polymer having improved resistance to hydrocarbon fluids, the resin composition comprising a cyclic olefin composition, dicumyl peroxide and a catalyst composition, wherein the cyclic olefin composition comprises at least one cyclic olefin and the catalyst composition comprises at least one metal carbene olefin metathesis catalyst.

In another embodiment, the invention provides for use of a ROMP composition for making a ROMP polymer, the ROMP composition comprising at least one cyclic olefin, at least one metal carbene olefin metathesis catalyst, and dicumyl peroxide.

In another embodiment, the invention provides for use of a ROMP composition for making a ROMP polymer having improved resistance to hydrocarbon fluids, the ROMP composition comprising at least one cyclic olefin, at least one metal carbene olefin metathesis catalyst, and dicumyl peroxide.

In another embodiment, the invention provides for use of a ROMP composition for making a ROMP polymer, the ROMP composition comprising a resin composition and a catalyst composition, wherein the resin composition comprises dicumyl peroxide and a cyclic olefin composition comprising at least one cyclic olefin, and the catalyst composition comprises at least one metal carbene olefin metathesis catalyst.

In another embodiment, the invention provides for use of a ROMP composition for making a ROMP polymer having improved resistance to hydrocarbon fluids, the ROMP composition comprising a resin composition and a catalyst composition, wherein the resin composition comprises dicumyl peroxide and a cyclic olefin composition comprising at least one cyclic olefin, and the catalyst composition comprises at least one metal carbene olefin metathesis catalyst.

In another embodiment, the invention provides for use of a resin composition for making a ROMP polymer, the resin composition comprising at least one cyclic olefin, at least one metal carbene olefin metathesis catalyst, at least one antioxidant, and dicumyl peroxide.

In another embodiment, the invention provides for use of a resin composition for making a ROMP polymer having improved resistance to hydrocarbon fluids, the resin composition comprising at least one cyclic olefin, at least one metal carbene olefin metathesis catalyst, at least one antioxidant, and dicumyl peroxide.

In another embodiment, the invention provides for use of a resin composition for making a ROMP polymer, the resin composition comprising a cyclic olefin composition, dicumyl peroxide, at least one antioxidant, and a catalyst composition, wherein the cyclic olefin composition comprises at least one cyclic olefin and the catalyst composition comprises at least one metal carbene olefin metathesis catalyst.

In another embodiment, the invention provides for use of a resin composition for making a ROMP polymer having improved resistance to hydrocarbon fluids, the resin composition comprising a cyclic olefin composition, dicumyl peroxide, at least one antioxidant, and a catalyst composition, wherein the cyclic olefin composition comprises at least one cyclic olefin and the catalyst composition comprises at least one metal carbene olefin metathesis catalyst.

In another embodiment, the invention provides for use of a ROMP composition for making a ROMP polymer, the ROMP composition comprising at least one cyclic olefin, at least one metal carbene olefin metathesis catalyst, at least one antioxidant, and dicumyl peroxide.

In another embodiment, the invention provides for use of a ROMP composition for making a ROMP polymer having improved resistance to hydrocarbon fluids, the ROMP composition comprising at least one cyclic olefin, at least one metal carbene olefin metathesis catalyst, at least one antioxidant, and dicumyl peroxide.

In another embodiment, the invention provides for use of a ROMP composition for making a ROMP polymer, the ROMP composition comprising a resin composition and a catalyst composition, wherein the resin composition comprises dicumyl peroxide, at least one antioxidant, and a cyclic olefin composition comprising at least one cyclic olefin, and the catalyst composition comprises at least one metal carbene olefin metathesis catalyst.

In another embodiment, the invention provides for use of a ROMP composition for making a ROMP polymer having improved resistance to hydrocarbon fluids, the ROMP composition comprising a resin composition and a catalyst composition, wherein the resin composition comprises dicumyl peroxide, at least one antioxidant, and a cyclic olefin composition comprising at least one cyclic olefin, and the catalyst composition comprises at least one metal carbene olefin metathesis catalyst.

In another embodiment, the invention provides for use of a resin composition for making a ROMP polymer, the resin composition comprising at least one cyclic olefin, at least one metal carbene olefin metathesis catalyst, at least one antioxidant, at least one impact modifier and dicumyl peroxide.

In another embodiment, the invention provides for use of a resin composition for making a ROMP polymer having improved resistance to hydrocarbon fluids, the resin composition comprising at least one cyclic olefin, at least one metal carbene olefin metathesis catalyst, at least one antioxidant, at least one impact modifier and dicumyl peroxide.

In another embodiment, the invention provides for use of a resin composition for making a ROMP polymer, the resin composition comprising a cyclic olefin composition, dicumyl peroxide, at least one antioxidant, at least one impact modifier and a catalyst composition, wherein the cyclic olefin composition comprises at least one cyclic olefin and the catalyst composition comprises at least one metal carbene olefin metathesis catalyst.

In another embodiment, the invention provides for use of a resin composition for making a ROMP polymer having improved resistance to hydrocarbon fluids, the resin composition comprising a cyclic olefin composition, dicumyl peroxide, at least one antioxidant, at least one impact modifier and a catalyst composition, wherein the cyclic olefin composition comprises at least one cyclic olefin and the catalyst composition comprises at least one metal carbene olefin metathesis catalyst.

In another embodiment, the invention provides for use of a ROMP composition for making a ROMP polymer, the ROMP composition comprising at least one cyclic olefin, at least one metal carbene olefin metathesis catalyst, at least one antioxidant, at least one impact modifier and dicumyl peroxide.

In another embodiment, the invention provides for use of a ROMP composition for making a ROMP polymer having improved resistance to hydrocarbon fluids, the ROMP composition comprising at least one cyclic olefin, at least one metal carbene olefin metathesis catalyst, at least one antioxidant, at least one impact modifier and dicumyl peroxide.

In another embodiment, the invention provides for use of a ROMP composition for making a ROMP polymer, the ROMP composition comprising a resin composition and a catalyst composition, wherein the resin composition comprises dicumyl peroxide, at least one antioxidant, at least one impact modifier and a cyclic olefin composition comprising at least one cyclic olefin, and the catalyst composition comprises at least one metal carbene olefin metathesis catalyst.

In another embodiment, the invention provides for use of a ROMP composition for making a ROMP polymer having improved resistance to hydrocarbon fluids, the ROMP composition comprising a resin composition and a catalyst composition, wherein the resin composition comprises dicumyl peroxide, at least one antioxidant, at least one impact modifier and a cyclic olefin composition comprising at least one cyclic olefin, and the catalyst composition comprises at least one metal carbene olefin metathesis catalyst.

In another embodiment, the invention provides for use of a resin composition for making a ROMP polymer, the resin composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides for use of a resin composition for making a ROMP polymer having improved resistance to hydrocarbon fluids, the resin composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides for use of a resin composition for making a ROMP polymer, the resin composition comprising a cyclic olefin composition, dicumyl peroxide, at least one antioxidant, at least one impact modifier, at least one exogenous inhibitor and a catalyst composition, wherein the cyclic olefin composition comprises at least one cyclic olefin and the catalyst composition comprises at least one metal carbene olefin metathesis catalyst.

In another embodiment, the invention provides for use of a resin composition for making a ROMP polymer having improved resistance to hydrocarbon fluids, the resin composition comprising a cyclic olefin composition, dicumyl peroxide, at least one antioxidant, at least one impact modifier, at least one exogenous inhibitor and a catalyst composition, wherein the cyclic olefin composition comprises at least one cyclic olefin and the catalyst composition comprises at least one metal carbene olefin metathesis catalyst.

In another embodiment, the invention provides for use of a ROMP composition for making a ROMP polymer, the ROMP composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides for use of a ROMP composition for making a ROMP polymer having improved resistance to hydrocarbon fluids, the ROMP composition comprising at least one cyclic olefin, at least one metal carbene olefin metathesis catalyst, at least one antioxidant, at least one impact modifier, at least one exogenous inhibitor and dicumyl peroxide.

In another embodiment, the invention provides for use of a ROMP composition for making a ROMP polymer, the ROMP composition comprising a resin composition and a catalyst composition, wherein the resin composition comprises dicumyl peroxide, at least one antioxidant, at least one impact modifier, at least one exogenous inhibitor and a cyclic olefin composition comprising at least one cyclic olefin, and the catalyst composition comprises at least one metal carbene olefin metathesis catalyst.

In another embodiment, the invention provides for use of a ROMP composition for making a ROMP polymer having improved resistance to hydrocarbon fluids, the ROMP composition comprising a resin composition and a catalyst composition, wherein the resin composition comprises dicumyl peroxide, at least one antioxidant, at least one impact modifier, at least one exogenous inhibitor and a cyclic olefin composition comprising at least one cyclic olefin, and the catalyst composition comprises at least one metal carbene olefin metathesis catalyst.

In another embodiment, the invention provides for use of a resin composition for making an article of manufacture, the resin composition comprising at least one cyclic olefin, at least one metal carbene olefin metathesis catalyst, and dicumyl peroxide.

In another embodiment, the invention provides for use of a resin composition for making an article of manufacture having improved resistance to hydrocarbon fluids, the resin composition comprising at least one cyclic olefin, at least one metal carbene olefin metathesis catalyst, and dicumyl peroxide.

In another embodiment, the invention provides for use of a resin composition for making an article of manufacture, the resin composition comprising a cyclic olefin composition, dicumyl peroxide and a catalyst composition, wherein the cyclic olefin composition comprises at least one cyclic olefin and the catalyst composition comprises at least one metal carbene olefin metathesis catalyst.

In another embodiment, the invention provides for use of a resin composition for making an article of manufacture having improved resistance to hydrocarbon fluids, the resin composition comprising a cyclic olefin composition, dicumyl peroxide and a catalyst composition, wherein the cyclic olefin composition comprises at least one cyclic olefin and the catalyst composition comprises at least one metal carbene olefin metathesis catalyst.

In another embodiment, the invention provides for use of a ROMP composition for making an article of manufacture, the ROMP composition comprising at least one cyclic olefin, at least one metal carbene olefin metathesis catalyst, and dicumyl peroxide.

In another embodiment, the invention provides for use of a ROMP composition for making an article of manufacture having improved resistance to hydrocarbon fluids, the ROMP composition comprising at least one cyclic olefin, at least one metal carbene olefin metathesis catalyst, and dicumyl peroxide.

In another embodiment, the invention provides for use of a ROMP composition for making an article of manufacture, the ROMP composition comprising a resin composition and a catalyst composition, wherein the resin composition comprises dicumyl peroxide and a cyclic olefin composition comprising at least one cyclic olefin, and the catalyst composition comprises at least one metal carbene olefin metathesis catalyst.

In another embodiment, the invention provides for use of a ROMP composition for making an article of manufacture having improved resistance to hydrocarbon fluids, the ROMP composition comprising a resin composition and a catalyst composition, wherein the resin composition comprises dicumyl peroxide and a cyclic olefin composition comprising at least one cyclic olefin, and the catalyst composition comprises at least one metal carbene olefin metathesis catalyst.

In another embodiment, the invention provides for use of a resin composition for making an article of manufacture, the resin composition comprising at least one cyclic olefin, at least one metal carbene olefin metathesis catalyst, at least one antioxidant, and dicumyl peroxide.

In another embodiment, the invention provides for use of a resin composition for making an article of manufacture having improved resistance to hydrocarbon fluids, the resin composition comprising at least one cyclic olefin, at least one metal carbene olefin metathesis catalyst, at least one antioxidant, and dicumyl peroxide.

In another embodiment, the invention provides for use of a resin composition for making an article of manufacture, the resin composition comprising a cyclic olefin composition, dicumyl peroxide, at least one antioxidant, and a catalyst composition, wherein the cyclic olefin composition comprises at least one cyclic olefin and the catalyst composition comprises at least one metal carbene olefin metathesis catalyst.

In another embodiment, the invention provides for use of a resin composition for making an article of manufacture having improved resistance to hydrocarbon fluids, the resin composition comprising a cyclic olefin composition, dicumyl peroxide, at least one antioxidant, and a catalyst composition, wherein the cyclic olefin composition comprises at least one cyclic olefin and the catalyst composition comprises at least one metal carbene olefin metathesis catalyst.

In another embodiment, the invention provides for use of a ROMP composition for making an article of manufacture, the ROMP composition comprising at least one cyclic olefin, at least one metal carbene olefin metathesis catalyst, at least one antioxidant, and dicumyl peroxide.

In another embodiment, the invention provides for use of a ROMP composition for making an article of manufacture having improved resistance to hydrocarbon fluids, the ROMP composition comprising at least one cyclic olefin, at least one metal carbene olefin metathesis catalyst, at least one antioxidant, and dicumyl peroxide.

In another embodiment, the invention provides for use of a ROMP composition for making an article of manufacture, the ROMP composition comprising a resin composition and a catalyst composition, wherein the resin composition comprises dicumyl peroxide, at least one antioxidant, and a cyclic olefin composition comprising at least one cyclic olefin, and the catalyst composition comprises at least one metal carbene olefin metathesis catalyst.

In another embodiment, the invention provides for use of a ROMP composition for making an article of manufacture having improved resistance to hydrocarbon fluids, the ROMP composition comprising a resin composition and a catalyst composition, wherein the resin composition comprises dicumyl peroxide, at least one antioxidant, and a cyclic olefin composition comprising at least one cyclic olefin, and the catalyst composition comprises at least one metal carbene olefin metathesis catalyst.

In another embodiment, the invention provides for use of a resin composition for making an article of manufacture, the resin composition comprising at least one cyclic olefin, at least one metal carbene olefin metathesis catalyst, at least one antioxidant, at least one impact modifier and dicumyl peroxide.

In another embodiment, the invention provides for use of a resin composition for making an article of manufacture having improved resistance to hydrocarbon fluids, the resin composition comprising at least one cyclic olefin, at least one metal carbene olefin metathesis catalyst, at least one antioxidant, at least one impact modifier and dicumyl peroxide.

In another embodiment, the invention provides for use of a resin composition for making an article of manufacture, the resin composition comprising a cyclic olefin composition, dicumyl peroxide, at least one antioxidant, at least one impact modifier and a catalyst composition, wherein the cyclic olefin composition comprises at least one cyclic olefin and the catalyst composition comprises at least one metal carbene olefin metathesis catalyst.

In another embodiment, the invention provides for use of a resin composition for making an article of manufacture having improved resistance to hydrocarbon fluids, the resin composition comprising a cyclic olefin composition, dicumyl peroxide, at least one antioxidant, at least one impact modifier and a catalyst composition, wherein the cyclic olefin composition comprises at least one cyclic olefin and the catalyst composition comprises at least one metal carbene olefin metathesis catalyst.

In another embodiment, the invention provides for use of a ROMP composition for making an article of manufacture, the ROMP composition comprising at least one cyclic olefin, at least one metal carbene olefin metathesis catalyst, at least one antioxidant, at least one impact modifier and dicumyl peroxide.

In another embodiment, the invention provides for use of a ROMP composition for making an article of manufacture having improved resistance to hydrocarbon fluids, the ROMP composition comprising at least one cyclic olefin, at least one metal carbene olefin metathesis catalyst, at least one antioxidant, at least one impact modifier and dicumyl peroxide.

In another embodiment, the invention provides for use of a ROMP composition for making an article of manufacture, the ROMP composition comprising a resin composition and a catalyst composition, wherein the resin composition comprises dicumyl peroxide, at least one antioxidant, at least one impact modifier and a cyclic olefin composition comprising at least one cyclic olefin, and the catalyst composition comprises at least one metal carbene olefin metathesis catalyst.

In another embodiment, the invention provides for use of a ROMP composition for making an article of manufacture having improved resistance to hydrocarbon fluids, the ROMP composition comprising a resin composition and a catalyst composition, wherein the resin composition comprises dicumyl peroxide, at least one antioxidant, at least one impact modifier and a cyclic olefin composition comprising at least one cyclic olefin, and the catalyst composition comprises at least one metal carbene olefin metathesis catalyst.

In another embodiment, the invention provides for use of a resin composition for making an article of manufacture, the resin composition comprising at least one cyclic olefin, at least one metal carbene olefin metathesis catalyst, at least one antioxidant, at least one impact modifier, at least one exogenous inhibitors and dicumyl peroxide.

In another embodiment, the invention provides for use of a resin composition for making an article of manufacture having improved resistance to hydrocarbon fluids, the resin composition comprising at least one cyclic olefin, at least one metal carbene olefin metathesis catalyst, at least one antioxidant, at least one impact modifier, at least one exogenous inhibitors and dicumyl peroxide.

In another embodiment, the invention provides for use of a resin composition for making an article of manufacture, the resin composition comprising a cyclic olefin composition, dicumyl peroxide, at least one antioxidant, at least one impact modifier, at least one exogenous inhibitors and a catalyst composition, wherein the cyclic olefin composition comprises at least one cyclic olefin and the catalyst composition comprises at least one metal carbene olefin metathesis catalyst.

In another embodiment, the invention provides for use of a resin composition for making an article of manufacture having improved resistance to hydrocarbon fluids, the resin composition comprising a cyclic olefin composition, dicumyl peroxide, at least one antioxidant, at least one impact modifier, at least one exogenous inhibitors and a catalyst composition, wherein the cyclic olefin composition comprises at least one cyclic olefin and the catalyst composition comprises at least one metal carbene olefin metathesis catalyst.

In another embodiment, the invention provides for use of a ROMP composition for making an article of manufacture, the ROMP composition comprising at least one cyclic olefin, at least one metal carbene olefin metathesis catalyst, at least one antioxidant, at least one impact modifier, at least one exogenous inhibitors and dicumyl peroxide.

In another embodiment, the invention provides for use of a ROMP composition for making an article of manufacture having improved resistance to hydrocarbon fluids, the ROMP composition comprising at least one cyclic olefin, at least one metal carbene olefin metathesis catalyst, at least one antioxidant, at least one impact modifier, at least one exogenous inhibitors and dicumyl peroxide.

In another embodiment, the invention provides for use of a ROMP composition for making an article of manufacture, the ROMP composition comprising a resin composition and a catalyst composition, wherein the resin composition comprises dicumyl peroxide, at least one antioxidant, at least one impact modifier, at least one exogenous inhibitors and a cyclic olefin composition comprising at least one cyclic olefin, and the catalyst composition comprises at least one metal carbene olefin metathesis catalyst.

In another embodiment, the invention provides for use of a ROMP composition for making an article of manufacture having improved resistance to hydrocarbon fluids, the ROMP composition comprising a resin composition and a catalyst composition, wherein the resin composition comprises dicumyl peroxide, at least one antioxidant, at least one impact modifier, at least one exogenous inhibitors and a cyclic olefin composition comprising at least one cyclic olefin, and the catalyst composition comprises at least one metal carbene olefin metathesis catalyst.

In another embodiment, the invention provides resin compositions having improved resistance to hydrocarbon fluids, comprising, inter alia, dicumyl peroxide which exhibit a gel swell which is at least 10% lower than comparable resin compositions containing an equimolar amount of a peroxide radical initiator not of the invention.

In another embodiment, the invention provides ROMP compositions having improved resistance to hydrocarbon fluids, comprising, inter alia, dicumyl peroxide which exhibit a gel swell which is at least 10% lower than comparable ROMP compositions containing an equimolar amount of a peroxide radical initiator not of the invention.

In another embodiment, the invention provides ROMP polymer compositions having improved resistance to hydrocarbon fluids, comprising, inter alia, dicumyl peroxide which exhibit a gel swell which is at least 10% lower than comparable ROMP polymer compositions containing an equimolar amount of a peroxide radical initiator not of the invention.

In another embodiment, the invention provides ROMP polymers having improved resistance to hydrocarbon fluids, comprising, inter alia, dicumyl peroxide which exhibit a gel swell which is at least 10% lower than comparable ROMP polymers containing an equimolar amount of a peroxide radical initiator not of the invention.

In another embodiment, the invention provides articles of manufacture having improved resistance to hydrocarbon fluids, comprising, inter alia, dicumyl peroxide which exhibit a gel swell which is at least 10% lower than comparable articles of manufacture containing an equimolar amount of a peroxide radical initiator not of the invention.

In another embodiment, the invention provides methods of making resin compositions having improved resistance to hydrocarbon fluids, comprising, inter alia, dicumyl peroxide which exhibit a gel swell which is at least 10% lower than comparable resin compositions containing an equimolar amount of a peroxide radical initiator not of the invention.

In another embodiment, the invention provides methods of making ROMP compositions having improved resistance to hydrocarbon fluids, comprising, inter alia, dicumyl peroxide which exhibit a gel swell which is at least 10% lower than comparable ROMP compositions containing an equimolar amount of a peroxide radical initiator not of the invention.

In another embodiment, the invention provides methods of making ROMP polymer compositions having improved resistance to hydrocarbon fluids, comprising, inter alia, dicumyl peroxide which exhibit a gel swell which is at least 10% lower than comparable ROMP polymer compositions containing an equimolar amount of a peroxide radical initiator not of the invention.

In another embodiment, the invention provides methods of making ROMP polymers having improved resistance to hydrocarbon fluids, comprising, inter alia, dicumyl peroxide which exhibit a gel swell which is at least 10% lower than comparable ROMP polymers containing an equimolar amount of a peroxide radical initiator not of the invention.

In another embodiment, the invention provides methods of making articles of manufacture having improved resistance to hydrocarbon fluids, comprising, inter alia, dicumyl peroxide which exhibit a gel swell which is at least 10% lower than comparable articles of manufacture containing an equimolar amount of a peroxide radical initiator not of the invention.

In another embodiment, the invention provides for use of a resin composition for making articles of manufacture having improved resistance to hydrocarbon fluids, comprising, inter alia, dicumyl peroxide which exhibit a gel swell which is at least 10% lower than comparable articles of manufacture containing an equimolar amount of a peroxide radical initiator not of the invention.

In another embodiment, the invention provides for use of a ROMP composition for making articles of manufacture having improved resistance to hydrocarbon fluids, comprising, inter alia, dicumyl peroxide which exhibit a gel swell which is at least 10% lower than comparable articles of manufacture containing an equimolar amount of a peroxide radical initiator not of the invention.

In another embodiment, the invention provides for use of a resin composition for making ROMP polymers having improved resistance to hydrocarbon fluids, comprising, inter alia, dicumyl peroxide which exhibit a gel swell which is at least 10% lower than comparable ROMP polymers containing an equimolar amount of a peroxide radical initiator not of the invention.

In another embodiment, the invention provides for use of a ROMP composition for making ROMP polymers having improved resistance to hydrocarbon fluids, comprising, inter alia, dicumyl peroxide which exhibit a gel swell which is at least 10% lower than comparable ROMP polymers containing an equimolar amount of a peroxide radical initiator not of the invention.

In another embodiment, the invention provides resin compositions having improved resistance to hydrocarbon fluids, comprising, inter alia, dicumyl peroxide which exhibit a gel swell which is at least 10% lower than comparable resin compositions containing an equimolar amount of di-tert-butyl peroxide.

In another embodiment, the invention provides ROMP compositions having improved resistance to hydrocarbon fluids, comprising, inter alia, dicumyl peroxide which exhibit a gel swell which is at least 10% lower than comparable ROMP compositions containing an equimolar amount of di-tert-butyl peroxide.

In another embodiment, the invention provides ROMP polymer compositions having improved resistance to hydrocarbon fluids, comprising, inter alia, dicumyl peroxide which exhibit a gel swell which is at least 10% lower than comparable ROMP polymer compositions containing an equimolar amount of di-tert-butyl peroxide.

In another embodiment, the invention provides ROMP polymers having improved resistance to hydrocarbon fluids, comprising, inter alia, dicumyl peroxide which exhibit a gel swell which is at least 10% lower than comparable ROMP polymers containing an equimolar amount of di-tert-butyl peroxide.

In another embodiment, the invention provides articles of manufacture having improved resistance to hydrocarbon fluids, comprising, inter alia, dicumyl peroxide which exhibit a gel swell which is at least 10% lower than comparable articles of manufacture containing an equimolar amount of di-tert-butyl peroxide.

In another embodiment, the invention provides methods of making resin compositions having improved resistance to hydrocarbon fluids, comprising, inter alia, dicumyl peroxide which exhibit a gel swell which is at least 10% lower than comparable resin compositions containing an equimolar amount of di-tert-butyl peroxide.

In another embodiment, the invention provides methods of making ROMP compositions having improved resistance to hydrocarbon fluids, comprising, inter alia, dicumyl peroxide which exhibit a gel swell which is at least 10% lower than comparable ROMP compositions containing an equimolar amount of di-tert-butyl peroxide.

In another embodiment, the invention provides methods of making ROMP polymer compositions having improved resistance to hydrocarbon fluids, comprising, inter alia, dicumyl peroxide which exhibit a gel swell which is at least 10% lower than comparable ROMP polymer compositions containing an equimolar amount of di-tert-butyl peroxide.

In another embodiment, the invention provides methods of making ROMP polymers having improved resistance to hydrocarbon fluids, comprising, inter alia, dicumyl peroxide which exhibit a gel swell which is at least 10% lower than comparable ROMP polymers containing an equimolar amount of di-tert-butyl peroxide.

In another embodiment, the invention provides methods of making articles of manufacture having improved resistance to hydrocarbon fluids, comprising, inter alia, dicumyl peroxide which exhibit a gel swell which is at least 10% lower than comparable articles of manufacture containing an equimolar amount of di-tert-butyl peroxide.

In another embodiment, the invention provides for use of a resin composition for making articles of manufacture having improved resistance to hydrocarbon fluids, comprising, inter alia, dicumyl peroxide which exhibit a gel swell which is at least 10% lower than comparable articles of manufacture containing an equimolar amount of di-tert-butyl peroxide.

In another embodiment, the invention provides for use of a ROMP composition for making articles of manufacture having improved resistance to hydrocarbon fluids, comprising, inter alia, dicumyl peroxide which exhibit a gel swell which is at least 10% lower than comparable articles of manufacture containing an equimolar amount of di-tert-butyl peroxide.

In another embodiment, the invention provides for use of a resin composition for making ROMP polymers having improved resistance to hydrocarbon fluids, comprising, inter alia, dicumyl peroxide which exhibit a gel swell which is at least 10% lower than comparable ROMP polymers containing an equimolar amount of di-tert-butyl peroxide.

In another embodiment, the invention provides for use of a ROMP composition for making ROMP polymers having improved resistance to hydrocarbon fluids, comprising, inter alia, dicumyl peroxide which exhibit a gel swell which is at least 10% lower than comparable ROMP polymers containing an equimolar amount of di-tert-butyl peroxide.

In another embodiment, the invention provides an article of manufacture prepared by any of the embodiments or methods disclosed herein.

DETAILED DESCRIPTION OF THE INVENTION

Unless otherwise indicated, the invention is not limited to specific reactants, substituents, catalysts, resin compositions, reaction conditions, or the like, as such may vary. It is also to be understood that the terminology used herein is for the purpose of describing particular embodiments only and is not to be interpreted as being limiting.

As used herein, the term "hydrocarbon fluids" as used in the phrase "resistance to hydrocarbon fluids" and "hydrocarbon fluid resistance," refers to any hydrocarbon in fluid or liquid form, Examples of "hydrocarbon fluids" include, but are not limited to, hydrocarbon solvents such as gasoline, naphthas, chlorinated liquid hydrocarbons, toluenes, benzenes, xylenes and other aromatics; all the naturally occurring liquid hydrocarbons that can be encountered during the drilling, completion and production phases of an oil and/or gas well; oil-based fluids (OBFs) formulated with diesel, mineral oil, or low-toxicity linear olefins and paraffins; API base oils (groups I-V) including PAO synthetic lubricants, ester, silicone, phosphate ester, polyalkylene glycol (PAG), polyolester, biolubes; oil-based muds; oil-based drilling muds; drilling muds; drilling fluids; hydraulic fluids; and lubricants.

As used in the specification and the appended claims, the singular forms "a," "an," and "the" include plural referents unless the context clearly dictates otherwise. Thus, for example, reference to "an α-olefin" includes a single α-olefin as well as a combination or mixture of two or more α-olefins, reference to "a substituent" encompasses a single substituent as well as two or more substituents, and the like.

As used in the specification and the appended claims, the terms "for example," "for instance," "such as," or "including" are meant to introduce examples that further clarify more general subject matter. Unless otherwise specified, these examples are provided only as an aid for understanding the invention, and are not meant to be limiting in any fashion.

In this specification and in the claims that follow, reference will be made to a number of terms, which shall be defined to have the following meanings:

The term "alkyl" as used herein refers to a linear, branched, or cyclic saturated hydrocarbon group typically although not necessarily containing 1 to about 24 carbon atoms, preferably 1 to about 12 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl, and the like. Generally, although again not necessarily, alkyl groups herein contain 1 to about 12 carbon atoms. The term "lower alkyl" refers to an alkyl group of 1 to 6 carbon atoms, and the specific term "cycloalkyl" refers to a cyclic alkyl group, typically having 4 to 8, preferably 5 to 7, carbon atoms. The term "substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

The term "alkylene" as used herein refers to a difunctional linear, branched, or cyclic alkyl group, where "alkyl" is as defined above.

The term "alkenyl" as used herein refers to a linear, branched, or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Preferred alkenyl groups herein contain 2 to about 12 carbon atoms. The term "lower alkenyl" refers to an alkenyl group of 2 to 6 carbon atoms, and the specific term "cycloalkenyl" refers to a cyclic alkenyl group, preferably having 5 to 8 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively.

The term "alkenylene" as used herein refers to a difunctional linear, branched, or cyclic alkenyl group, where "alkenyl" is as defined above.

The term "alkynyl" as used herein refers to a linear or branched hydrocarbon group of 2 to about 24 carbon atoms containing at least one triple bond, such as ethynyl, n-propynyl, and the like. Preferred alkynyl groups herein contain 2 to about 12 carbon atoms. The term "lower alkynyl" refers to an alkynyl group of 2 to 6 carbon atoms. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include linear, branched, unsubstituted, substituted, and/or heteroatom-containing alkynyl and lower alkynyl, respectively.

The term "alkoxy" as used herein refers to an alkyl group bound through a single, terminal ether linkage; that is, an "alkoxy" group may be represented as —O-alkyl where alkyl is as defined above. A "lower alkoxy" group refers to an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms, and particularly preferred aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituents in which at least one carbon atom is replaced with a heteroatom, as will be described in further detail infra.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 24 carbon atoms, and particularly preferred aryloxy groups contain 5 to 14 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Preferred alkaryl and aralkyl groups contain 6 to 24 carbon atoms, and particularly preferred alkaryl and aralkyl groups contain 6 to 16 carbon atoms. Alkaryl groups include, without limitation, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is alkaryl or aralkyl, respectively, as just defined.

The term "acyl" refers to substituents having the formula —(CO)-alkyl, —(CO)-aryl, —(CO)-aralkyl, —(CO)-alkaryl, —(CO)-alkenyl, or —(CO)-alkynyl, and the term "acyloxy" refers to substituents having the formula —O(CO)-alkyl, —O(CO)-aryl, —O(CO)-aralkyl, —O(CO)-alkaryl, —O(CO)-alkenyl, —O(CO)-alkynyl wherein "alkyl," "aryl," "aralkyl," "alkaryl," "alkenyl," and "alkynyl" are as defined above.

The terms "cyclic" and "ring" refer to alicyclic or aromatic groups that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic, or polycyclic.

The terms "halo" and "halogen" are used in the conventional sense to refer to a chloro, bromo, fluoro, or iodo substituent.

"Hydrocarbyl" refers to univalent hydrocarbyl radicals containing 1 to about 30 carbon atoms, preferably 1 to about 24 carbon atoms, most preferably 1 to about 12 carbon atoms, including linear, branched, cyclic, saturated, and unsaturated species, such as alkyl groups, alkenyl groups, alkynyl groups, aryl groups, and the like. The term "lower hydrocarbyl" intends a hydrocarbyl group of 1 to 6 carbon atoms, preferably 1 to 4 carbon atoms, and the term "hydrocarbylene" refers to a divalent hydrocarbyl moiety containing 1 to about 30 carbon atoms, preferably 1 to about 24 carbon atoms, most preferably 1 to about 12 carbon atoms, including linear, branched, cyclic, saturated, and unsaturated species. The term "lower hydrocarbylene" refers to a hydrocarbylene group of 1 to 6 carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to hydrocarbylene substituted with one or more substituent groups, and the terms "heteroatom-containing hydrocarbylene" and "heterohydrocarbylene" refer to hydrocarbylene in which at least one carbon atom is replaced with a heteroatom. Unless otherwise indicated, the term "hydrocarbyl" and "hydrocarbylene" are to be interpreted as including substituted and/or heteroatom-containing hydrocarbyl and heteroatom-containing hydrocarbylene moieties, respectively.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus, or silicon, typically nitrogen, oxygen, or sulfur. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include without limitation alkoxyaryl, alkylsulfanyl-substituted alkyl, N-alkylated amino alkyl, and the like. Examples of heteroaryl substituents include without limitation pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups include without limitation pyrrolidino, morpholino, piperazino, piperidino, etc.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation: functional groups referred to herein as "Fn," such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_2$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl (—(CO)—O-alkyl), $C_6$-$C_{24}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{24}$ arylcarbonato (—O—(CO)—O-aryl), carboxy (—COOH), carboxylato (—COO—), carbamoyl (—(CO)—NH$_2$), mono-($C_1$-$C_{24}$ alkyl)-substituted carbamoyl (—(CO)—NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_1$-$C_{24}$ haloalkyl)-substituted carbamoyl (—(CO)—NH($C_1$-$C_{24}$ haloalkyl)), di-($C_1$-$C_{24}$ haloalkyl)-substituted carbamoyl (—(CO)—N($C_1$-$C_{24}$ haloalkyl)$_2$), mono-($C_5$-$C_{24}$ aryl)-substituted carbamoyl (—(CO)—NH-aryl), di-($C_5$-$C_{24}$ aryl)-substituted carbamoyl (—(CO)—N($C_5$-$C_{24}$ aryl)$_2$), di-N—($C_1$-$C_{24}$ alkyl), N—($C_5$-$C_{24}$ aryl)-substituted carbamoyl (—(CO)—N($C_1$-$C_{24}$ alkyl)($C_5$-$C_{24}$ aryl), thiocarbamoyl (—(CS)—NH$_2$), mono-($C_1$-$C_{24}$ alkyl)-substituted thiocarbamoyl (—(CS)—NH($C_1$-$C_{24}$ alkyl)), di-($C_1$-$C_{24}$ alkyl)-substituted thiocarbamoyl (—(CS)—N($C_1$-$C_{24}$ alkyl)$_2$), mono-($C_5$-$C_{24}$ aryl)-substituted thiocarbamoyl (—(CS)—NH-aryl), di-($C_5$-$C_{24}$ aryl)-substituted thiocarbamoyl (—(CS)—N($C_5$-$C_{24}$ aryl)$_2$), di-N—($C_1$-$C_{24}$ alkyl), N—($C_5$-$C_{24}$ aryl)-substituted thiocarbamoyl (—(CS)—N($C_1$-$C_{24}$ alkyl)($C_5$-$C_{24}$ aryl), carbamido (—NH—(CO)—NH$_2$), cyano (—C≡N), cyanato (—O—C≡N), thiocyanato (—S—C≡N), isocyanate (—N=C=O), thioisocyanate (—N=C=S), formyl (—(CO)—H), thioformyl (—(CS)—H), amino (—NH$_2$), mono-($C_1$-$C_{24}$ alkyl)-substituted amino (—NH($C_1$-$C_{24}$ alkyl), di-($C_1$-$C_{24}$ alkyl)-substituted amino (—N($C_1$-$C_{24}$ alkyl)$_2$), mono-($C_5$-$C_{24}$ aryl)-substituted amino (—NH($C_5$-$C_{24}$ aryl), di-($C_5$-$C_{24}$ aryl)-substituted amino (—N($C_5$-$C_{24}$ aryl)$_2$), $C_2$-$C_{24}$ alkylamido (—NH—(CO)-alkyl), $C_6$-$C_{24}$ arylamido (—NH—(CO)-aryl), imino (—CR=NH where R includes without limitation hydrogen, $C_1$-$C_{24}$ alkyl, $C_5$-$C_{24}$ aryl, $C_6$-$C_{24}$ alkaryl, $C_6$-$C_{24}$ aralkyl, etc.), $C_2$-$C_{20}$ alkylimino (—CR=N(alkyl), where R includes without limitation hydrogen, $C_1$-$C_{24}$ alkyl, $C_5$-$C_{24}$ aryl, $C_6$-$C_{24}$ alkaryl, $C_6$-$C_{24}$ aralkyl, etc.), arylimino (—CR=N(aryl), where R includes without limitation hydrogen, $C_1$-$C_{20}$ alkyl, $C_5$-$C_{24}$ aryl, $C_6$-$C_{24}$ alkaryl, $C_6$-$C_{24}$ aralkyl, etc.), nitro (—NO$_2$), nitroso (—NO), sulfo (—SO$_2$—OH), sulfonato (—SO$_2$—O—), $C_1$-$C_{24}$ alkylsulfanyl (—S-alkyl; also termed "alkylthio"), $C_5$-$C_{24}$ arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—SO$_2$-alkyl), $C_1$-$C_{24}$ monoalkylaminosulfonyl (—SO$_2$—N(H) alkyl), $C_1$-$C_{24}$ dialkylaminosulfonyl (—SO$_2$—N(alkyl)$_2$), $C_5$-$C_{24}$ arylsulfonyl (—SO$_2$-aryl), boryl (—BH$_2$), borono (—B(OH)$_2$), boronato (—B(OR)$_2$ where R includes without limitation alkyl or other hydrocarbyl), phosphono (—P(O)(OH)$_2$), phosphonato (—P(O)(O—)$_2$), phosphinato (—P(O)(O—)), phospho (—PO$_2$), and phosphino (—PH$_2$); and the hydrocarbyl moieties $C_1$-$C_{24}$ alkyl (preferably $C_1$-$C_{12}$ alkyl, more preferably $C_1$-$C_6$ alkyl), $C_2$-$C_{24}$ alkenyl (preferably $C_2$-$C_{12}$ alkenyl, more preferably $C_2$-$C_6$ alkenyl), $C_2$-$C_{24}$ alkynyl (preferably $C_2$-$C_{12}$ alkynyl, more preferably $C_2$-$C_6$ alkynyl), $C_5$-$C_{24}$ aryl (preferably $C_5$-$C_{14}$ aryl), $C_6$-$C_{24}$ alkaryl (preferably $C_6$-$C_{16}$ alkaryl), and $C_6$-$C_{24}$ aralkyl (preferably $C_6$-$C_{16}$ aralkyl).

By "functionalized" as in "functionalized hydrocarbyl," "functionalized alkyl," "functionalized olefin," "functionalized cyclic olefin," and the like, is meant that in the hydrocarbyl, alkyl, olefin, cyclic olefin, or other moiety, at least one hydrogen atom bound to a carbon (or other) atom is replaced with one or more functional groups such as those described hereinabove. The term "functional group" is meant to include any functional species that is suitable for the uses described herein. In particular, as used herein, a functional group would necessarily possess the ability to react with or bond to corresponding functional groups on a substrate surface.

In addition, the aforementioned functional groups may, if a particular group permits, be further substituted with one or more additional functional groups or with one or more hydrocarbyl moieties such as those specifically mentioned above. Analogously, the abovementioned hydrocarbyl moieties may be further substituted with one or more functional groups or additional hydrocarbyl moieties as noted above.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

Cyclic Olefin

Resin compositions and/or cyclic olefin compositions that may be used with the present invention disclosed herein comprise one or more cyclic olefins. The resin compositions disclosed in the present invention, comprise a cyclic olefin composition and dicumyl peroxide, wherein the cyclic olefin composition comprises at least one cyclic olefin. In general, any cyclic olefin suitable for the metathesis reactions disclosed herein may be used. Such cyclic olefins may be optionally substituted, optionally heteroatom-containing, mono-unsaturated, di-unsaturated, or poly-unsaturated $C_5$ to $C_{24}$ hydrocarbons that may be mono-, di-, or poly-cyclic. The cyclic olefin may generally be any strained or unstrained cyclic olefin, provided the cyclic olefin is able to participate in a ROMP reaction either individually or as part of a cyclic olefin composition or as part of a resin composition. While certain unstrained cyclic olefins such as cyclohexene are generally understood to not undergo ROMP reactions by themselves, under appropriate circumstances, such unstrained cyclic olefins may nonetheless be ROMP active. For example, when present as a co-monomer in a ROMP composition, unstrained cyclic olefins may be ROMP active. Accordingly, as used herein and as would be appreciated by the skilled artisan, the term "unstrained cyclic olefin" is intended to refer to those unstrained cyclic olefins that may undergo a ROMP reaction under any conditions, or in any ROMP composition, provided the unstrained cyclic olefin is ROMP active.

In general, the cyclic olefin may be represented by the structure of Formula (A):

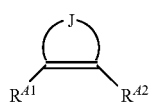

Formula (A)

wherein J, $R^{A1}$, and $R^{A2}$ are as follows: $R^{A1}$ and $R^{A2}$ is selected independently from the group consisting of hydrogen, hydrocarbyl (e.g., $C_1$-$C_{20}$ alkyl, $C_5$-$C_{20}$ aryl, $C_5$-$C_{30}$ aralkyl, or $C_5$-$C_{30}$ alkaryl), substituted hydrocarbyl (e.g., substituted $C_1$-$C_{20}$ alkyl, $C_5$-$C_{20}$ aryl, $C_5$-$C_{30}$ aralkyl, or $C_5$-$C_{30}$ alkaryl), heteroatom-containing hydrocarbyl (e.g., $C_1$-$C_{20}$ heteroalkyl, $C_5$-$C_{20}$ heteroaryl, heteroatom-containing $C_5$-$C_{30}$ aralkyl, or heteroatom-containing $C_5$-$C_{30}$ alkaryl), and substituted heteroatom-containing hydrocarbyl (e.g., substituted $C_1$-$C_{20}$ heteroalkyl, $C_5$-$C_{20}$ heteroaryl, heteroatom-containing $C_5$-$C_{30}$ aralkyl, or heteroatom-containing $C_5$-$C_{30}$ alkaryl) and, if substituted hydrocarbyl or substituted heteroatom-containing hydrocarbyl, wherein the substituents may be functional groups ("Fn") such as phosphonato, phosphoryl, phosphanyl, phosphino, sulfonato, $C_1$-$C_{20}$ alkylsulfanyl, $C_5$-$C_{20}$ arylsulfanyl, $C_1$-$C_{20}$ alkylsulfonyl, $C_5$-$C_{20}$ arylsulfonyl, $C_1$-$C_{20}$ alkylsulfinyl, $C_5$-$C_{20}$ arylsulfinyl, sulfonamido, amino, amido, imino, nitro, nitroso, hydroxyl, $C_1$-$C_{20}$ alkoxy, $C_5$-$C_{20}$ aryloxy, $C_2$-$C_{20}$ alkoxycarbonyl, $C_5$-$C_{20}$ aryloxycarbonyl, carboxyl, carboxylato, mercapto, formyl, $C_1$-$C_{20}$ thioester, cyano, cyanato, thiocyanato, isocyanate, thioisocyanate, carbamoyl, epoxy, styrenyl, silyl, silyloxy, silanyl, siloxazanyl, boronato, boryl, or halogen, or a metal-containing or metalloid-containing group (wherein the metal may be, for example, Sn or Ge). $R^{A1}$ and $R^{A2}$ may itself be one of the aforementioned groups, such that the Fn moiety is directly bound to the olefinic carbon atom indicated in the structure. In the latter case, however, the functional group will generally not be directly bound to the olefinic carbon through a heteroatom containing one or more lone pairs of electrons, e.g., an oxygen, sulfur, nitrogen, or phosphorus atom, or through an electron-rich metal or metalloid such as Ge, Sn, As, Sb, Se, Te, etc. With such functional groups, there will normally be an intervening linkage Z*, such that $R^{A1}$ and/or $R^{A2}$ then has the structure —(Z*)$_n$—Fn wherein n is 1, Fn is the functional group, and Z* is a hydrocarbylene linking group such as an alkylene, substituted alkylene, heteroalkylene, substituted heteroalkene, arylene, substituted arylene, heteroarylene, or substituted heteroarylene linkage. J is a saturated or unsaturated hydrocarbylene, substituted hydrocarbylene, heteroatom-containing hydrocarbylene, or substituted heteroatom-containing hydrocarbylene linkage, wherein when J is substituted hydrocarbylene or substituted heteroatom-containing hydrocarbylene, the substituents may include one or more —(Z*)$_n$—Fn groups, wherein n is 0 or 1, and Fn and Z* are as defined previously. Additionally, two or more substituents attached to ring carbon (or other) atoms within J may be linked to form a bicyclic or polycyclic olefin. J will generally contain in the range of approximately 5 to 14 ring atoms, typically 5 to 8 ring atoms, for a monocyclic olefin, and, for bicyclic and polycyclic olefins, each ring will generally contain 4 to 8, typically 5 to 7, ring atoms.

Mono-unsaturated cyclic olefins encompassed by Formula (A) may be represented by the Formula (B):

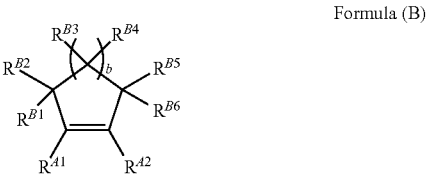

Formula (B)

wherein b is an integer generally although not necessarily in the range of 1 to 10, typically 1 to 5, $R^{A1}$ and $R^{A2}$ are as defined above for structure (A), and $R^{B1}$, $R^{B2}$, $R^{B3}$, $R^{B4}$, $R^{B5}$, and $R^{B6}$ are independently selected from the group consisting of hydrogen, hydrocarbyl, substituted hydrocarbyl, heteroatom-containing hydrocarbyl, substituted heteroatom-containing hydrocarbyl and —(Z*)$_n$—Fn where n, Z* and Fn are as defined previously, and wherein if any of the $R^{B1}$ through $R^{B6}$ moieties is substituted hydrocarbyl or substituted heteroatom-containing hydrocarbyl, the substituents may include one or more —(Z*)$_n$—Fn groups. Accordingly, $R^{B1}$, $R^{B2}$, $R^{B3}$, $R^{B4}$, $R^{B5}$, and $R^{B6}$ may be, for example, hydrogen, hydroxyl, $C_1$-$C_{20}$ alkyl, $C_5$-$C_{20}$ aryl, $C_1$-$C_{20}$ alkoxy, $C_5$-$C_{20}$ aryloxy, $C_2$-$C_{20}$ alkoxycarbonyl, $C_5$-$C_{20}$ aryloxycarbonyl, amino, amido, nitro, etc.

Furthermore, any of the $R^{B1}$, $R^{B2}$, $R^{B3}$, $R^{B4}$, $R^{B5}$, and $R^{B6}$ moieties can be linked to any of the other $R^{B1}$, $R^{B2}$, $R^{B3}$, $R^{B4}$, $R^{B5}$, and $R^{B6}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The alicyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, —(Z*)$_n$—Fn where n is 0 or 1, Z* and Fn are as defined previously, and functional groups (Fn) provided above.

Examples of monounsaturated, monocyclic olefins encompassed by structure (B) include, without limitation, cyclopentene, cyclohexene, cycloheptene, cyclooctene, cyclononene, cyclodecene, cycloundecene, cyclododecene, tricyclodecene, tetracyclodecene, octacyclodecene, and cycloeicosene, and substituted versions thereof such as 1-methylcyclopentene, 1-ethylcyclopentene, 1-isopropylcyclohexene, 1-chloropentene, 1-fluorocyclopentene, 4-methylcyclopentene, 4-methoxy-cyclopentene, 4-ethoxy-cyclopentene, cyclopent-3-ene-thiol, cyclopent-3-ene, 4-methylsulfanyl-cyclopentene, 3-methylcyclohexene, 1-methylcyclooctene, 1,5-dimethylcyclooctene, etc.

Monocyclic diene reactants encompassed by Formula (A) may be generally represented by the Formula (C):

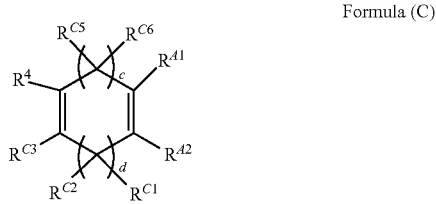

Formula (C)

wherein c and d are independently integers in the range of 1 to about 8, typically 2 to 4, preferably 2 (such that the reactant is a cyclooctadiene), $R^{A1}$ and $R^{A2}$ are as defined above for structure (A), and $R^{C1}$, $R^{C2}$, $R^{C3}$, $R^{C4}$, $R^{C5}$, and $R^{C6}$ are defined as for $R^{B1}$ through $R^{B6}$. In this case, it is preferred that $R^{C3}$ and $R^{C4}$ be non-hydrogen substituents, in which case the second olefinic moiety is tetrasubstituted. Examples of monocyclic diene reactants include, without limitation, 1,3-cyclopentadiene, 1,3-cyclohexadiene, 1,4-cyclohexadiene, 5-ethyl-1,3-cyclohexadiene, 1,3-cycloheptadiene, cyclohexadiene, 1,5-cyclooctadiene, 1,3-cyclooctadiene, and substituted analogs thereof. Triene reactants are analogous to the diene Formula (C), and will generally contain at least one methylene linkage between any two olefinic segments.

Bicyclic and polycyclic olefins encompassed by Formula (A) may be generally represented by the Formula (D):

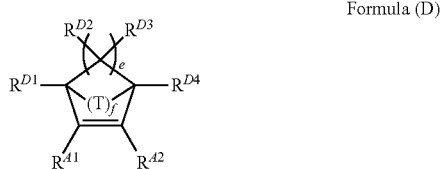

Formula (D)

wherein $R^{A1}$ and $R^{A2}$ are as defined above for Formula (A), $R^{D1}$, $R^{D2}$, $R^{D3}$, and $R^{D4}$ are as defined for $R^{B1}$ through $R^{B6}$, e is an integer in the range of 1 to 8 (typically 2 to 4), f is generally 1 or 2; T is lower alkylene or alkenylene (generally substituted or unsubstituted methyl or ethyl), CHR$^{G1}$, C(R$^{G1}$)$_2$, O, S, N—R$^{G1}$, P—R$^{G1}$, O=P—R$^{G1}$, Si(R$^{G1}$)$_2$, B—R$^{G1}$, or As—R$^{G1}$ where R$^{G1}$ is alkyl, alkenyl, cycloalkyl, cycloalkenyl, aryl, alkaryl, aralkyl, or alkoxy. Furthermore, any of the $R^{D1}$, $R^{D2}$, $R^{D3}$, and $R^{D4}$ moieties can be linked to any of the other $R^{D1}$, $R^{D2}$, $R^{D3}$, and $R^{D4}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The cyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, —(Z*)$_n$—Fn where n is 0 or 1, Z* and Fn are as defined previously, and functional groups (Fn) provided above.

Cyclic olefins encompassed by Formula (D) are in the norbornene family. As used herein, norbornene means any compound that includes at least one norbornene or substituted norbornene moiety, including without limitation norbornene, substituted norbornene(s), norbomadiene, substituted norbornadiene(s), polycyclic norbornenes, and substituted polycyclic norbornene(s). Norbornenes within this group may be generally represented by the Formula (E):

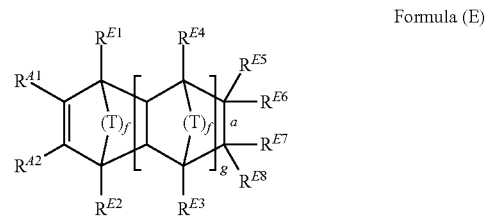

Formula (E)

wherein $R^{A1}$ and $R^{A2}$ are as defined above for Formula (A), T is as defined above for Formula (D), $R^{E1}$, $R^{E2}$, $R^{E3}$, $R^{E4}$, $R^{E5}$, $R^{E6}$, $R^{E7}$, and $R^{E8}$ are as defined for $R^{B1}$ through $R^{B6}$, and "a" represents a single bond or a double bond, f is generally 1 or 2, "g" is an integer from 0 to 5, and when "a" is a double bond one of $R^{E5}$, $R^{E6}$ and one of $R^{E7}$, $R^{E8}$ is not present.

Furthermore, any of the $R^{E5}$, $R^{E6}$, $R^{E7}$, and $R^{E8}$ moieties can be linked to any of the other $R^{E5}$, $R^{E6}$, $R^{E7}$, and $R^{E8}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The cyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, —(Z*)$_n$—Fn where n is 0 or 1, Z* and Fn are as defined previously, and functional groups (Fn) provided above.

More preferred cyclic olefins possessing at least one norbornene moiety have the Formula (F):

Formula (F)

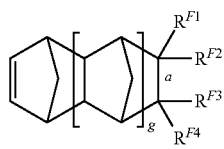

wherein $R^{E1}$, $R^{F2}$, $R^{F3}$, and $R^{F4}$ are as defined for $R^{B1}$ through $R^{B6}$, and "a" represents a single bond or a double bond, "g" is an integer from 0 to 5, and when "a" is a double bond one of $R^{F1}$, $R^{F2}$ and one of $R^{F3}$, $R^{F4}$ is not present.

Furthermore, any of the $R^{F1}$, $R^{F2}$, $R^{F3}$, and $R^{F4}$ moieties can be linked to any of the other $R^{F1}$, $R^{F2}$, $R^{F3}$, and $R^{F4}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The alicyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, —(Z*)$_n$—Fn where n is 0 or 1, Z* and Fn are as defined previously, and functional groups (Fn) provided above.

One route for the preparation of hydrocarbyl substituted and functionally substituted norbornenes employs the Diels-Alder cycloaddition reaction in which cyclopentadiene or substituted cyclopentadiene is reacted with a suitable dienophile at elevated temperatures to form the substituted norbornene adduct generally shown by the following reaction Scheme 1:

Scheme 1

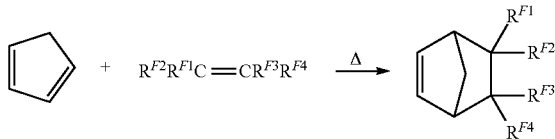

wherein $R^{F1}$ to $R^{F4}$ are as previously defined for Formula (F).

Other norbornene adducts can be prepared by the thermal pyrolysis of dicyclopentadiene in the presence of a suitable dienophile. The reaction proceeds by the initial pyrolysis of dicyclopentadiene to cyclopentadiene followed by the Diels-Alder cycloaddition of cyclopentadiene and the dienophile to give the adduct shown below in Scheme 2:

Scheme 2

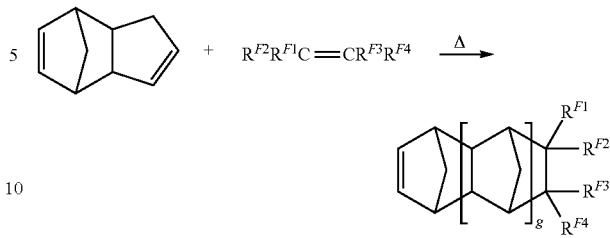

wherein "g" is an integer from 0 to 5, and $R^{F1}$ to $R^{F4}$ are as previously defined for Formula (F).

Norbornadiene and higher Diels-Alder adducts thereof similarly can be prepared by the thermal reaction of cyclopentadiene and dicyclopentadiene in the presence of an acetylenic reactant as shown below in Scheme 3:

Scheme 3

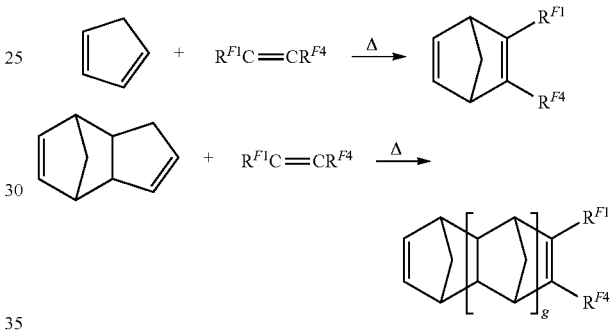

wherein "g" is an integer from 0 to 5, $R^{F1}$ and $R^{F4}$ are as previously defined for Formula (F).

Examples of bicyclic and polycyclic olefins thus include, without limitation, dicyclopentadiene (DCPD); trimer and other higher order oligomers of cyclopentadiene including without limitation tricyclopentadiene (cyclopentadiene trimer), cyclopentadiene tetramer (tetracyclopentadiene), and cyclopentadiene pentamer (pentacyclopentadiene); ethylidenenorbornene; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethyoxycarbonyl-1-norbornene; 5-methyl-5-methoxy-carbonylnorbornene; 5-cyanonorbornene; 5,5,6-trimethyl-2-norbornene; cyclo-hexenylnorbornene; endo, exo-5,6-dimethoxynorbornene; endo, endo-5,6-dimethoxynorbornene; endo, exo-5,6-dimethoxycarbonylnorbornene; endo, endo-5,6-dimethoxycarbonylnorbornene; 2,3-dimethoxynorbornene; norbornadiene; tricycloundecene; tetracyclododecene; 8-methyltetracyclododecene; 8-ethyltetracyclododecene; 8-methoxycarbonyltetracyclododecene; 8-methyl-8-tetracyclododecene; 8-cyanotetracyclododecene; pentacyclopentadecene; pentacyclohexadecene; and the like, and their structural isomers, stereoisomers, and mixtures thereof. Additional examples of bicyclic and polycyclic olefins include, without limitation, $C_2$-$C_{12}$ hydrocarbyl substituted norbornenes such as 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, and 5-butenyl-2-norbornene, and the like. It is well understood by one of skill in the art that bicyclic and polycyclic olefins as disclosed herein may consist of a variety of structural isomers and/or stereoisomers, any and all of which are suitable for use in the present invention. Any reference herein to such bicyclic and polycyclic olefins unless specifically stated includes mixtures of any and all such structural isomers and/or stereoisosmers.

Preferred cyclic olefins include $C_5$ to $C_{24}$ unsaturated hydrocarbons. Also preferred are $C_5$ to $C_{24}$ cyclic hydrocarbons that contain one or more (typically 2 to 12) heteroatoms such as O, N, S, or P. For example, crown ether cyclic olefins may include numerous O heteroatoms throughout the cycle, and these are within the scope of the invention. In addition, preferred cyclic olefins are $C_5$ to $C_{24}$ hydrocarbons that contain one or more (typically 2 or 3) olefins. For example, the cyclic olefin may be mono-, di-, or tri-unsaturated. Examples of cyclic olefins include without limitation cyclooctene, cyclododecene, and (c,t,t)-1,5,9-cyclododecatriene.

The cyclic olefins may also comprise multiple (typically 2 or 3) rings. For example, the cyclic olefin may be mono-, di-, or tri-cyclic. When the cyclic olefin comprises more than one ring, the rings may or may not be fused. Preferred examples of cyclic olefins that comprise multiple rings include norbornene, dicyclopentadiene, tricyclopentadiene, and 5-ethylidene-2-norbornene.

The cyclic olefin may also be substituted, for example, a $C_5$ to $C_{24}$ cyclic hydrocarbon wherein one or more (typically 2, 3, 4, or 5) of the hydrogens are replaced with non-hydrogen substituents. Suitable non-hydrogen substituents may be chosen from the substituents described hereinabove. For example, functionalized cyclic olefins, i.e., $C_5$ to $C_{24}$ cyclic hydrocarbons wherein one or more (typically 2, 3, 4, or 5) of the hydrogens are replaced with functional groups, are within the scope of the invention. Suitable functional groups may be chosen from the functional groups described hereinabove. For example, a cyclic olefin functionalized with an alcohol group may be used to prepare a telechelic polymer comprising pendent alcohol groups. Functional groups on the cyclic olefin may be protected in cases where the functional group interferes with the metathesis catalyst, and any of the protecting groups commonly used in the art may be employed. Acceptable protecting groups may be found, for example, in Greene et al., Protective Groups in Organic Synthesis, 3rd Ed. (New York: Wiley, 1999). Examples of functionalized cyclic olefins include without limitation 2-hydroxymethyl-5-norbornene, 2-[(2-hydroxyethyl)carboxylate]-5-norbornene, cydecanol, 5-n-hexyl-2-norbornene, 5-n-butyl-2-norbornene.

Cyclic olefins incorporating any combination of the abovementioned features (i.e., heteroatoms, substituents, multiple olefins, multiple rings) are suitable for the methods disclosed herein. Additionally, cyclic olefins incorporating any combination of the abovementioned features (i.e., heteroatoms, substituents, multiple olefins, multiple rings) are suitable for the invention disclosed herein.

The cyclic olefins useful in the methods disclosed herein may be strained or unstrained. It will be appreciated that the amount of ring strain varies for each cyclic olefin compound, and depends upon a number of factors including the size of the ring, the presence and identity of substituents, and the presence of multiple rings. Ring strain is one factor in determining the reactivity of a molecule towards ring-opening olefin metathesis reactions. Highly strained cyclic olefins, such as certain bicyclic compounds, readily undergo ring opening reactions with olefin metathesis catalysts. Less strained cyclic olefins, such as certain unsubstituted hydrocarbon monocyclic olefins, are generally less reactive. In some cases, ring opening reactions of relatively unstrained (and therefore relatively unreactive) cyclic olefins may become possible when performed in the presence of the olefinic compounds disclosed herein. Additionally, cyclic olefins useful in the invention disclosed herein may be strained or unstrained.

The resin compositions and/or cyclic olefin compositions of the present invention may comprise a plurality of cyclic olefins. A plurality of cyclic olefins may be used to prepare metathesis polymers from the olefinic compound. For example, two cyclic olefins selected from the cyclic olefins described hereinabove may be employed in order to form metathesis products that incorporate both cyclic olefins. Where two or more cyclic olefins are used, one example of a second cyclic olefin is a cyclic alkenol, i.e., a $C_5$-$C_{24}$ cyclic hydrocarbon wherein at least one of the hydrogen substituents is replaced with an alcohol or protected alcohol moiety to yield a functionalized cyclic olefin.

The use of a plurality of cyclic olefins, and in particular when at least one of the cyclic olefins is functionalized, allows for further control over the positioning of functional groups within the products. For example, the density of cross-linking points can be controlled in polymers and macromonomers prepared using the methods disclosed herein. Control over the quantity and density of substituents and functional groups also allows for control over the physical properties (e.g., melting point, tensile strength, glass transition temperature, etc.) of the products. Control over these and other properties is possible for reactions using only a single cyclic olefin, but it will be appreciated that the use of a plurality of cyclic olefins further enhances the range of possible metathesis products and polymers formed.

Examples of cyclic olefins include dicyclopentadiene; tricyclopentadiene; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethoxycarbonyl-1-norbornene; 5-methyl-5-methoxy-carbonylnorbornene; 5-cyanonorbornene; 5,5,6-trimethyl-2-norbornene; cyclo-hexenylnorbornene; endo, exo-5,6-dimethoxynorbornene; endo, endo-5,6-dimethoxynorbornene; endo, exo-5-6-dimethoxycarbonylnorbornene; endo, endo-5,6-dimethoxycarbonyl-norbornene; 2,3-dimethoxynorbornene; norbornadiene; tricycloundecene; tetracyclododecene; 8-methyltetracyclododecene; 8-ethyl-tetracyclododecene; 8-methoxycarbonyltetracyclododecene; 8-methyl-8-tetracyclo-dodecene; 8-cyanotetracyclododecene; pentacyclopentadecene; pentacyclohexadecene; higher order oligomers of cyclopentadiene such as cyclopentadiene tetramer, cyclopentadiene pentamer, and the like; and $C_2$-$C_{12}$ hydrocarbyl substituted norbornenes such as 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; and 5-butenyl-2-norbornene, and the like. Examples of cyclic olefins include dicyclopentadiene, tricyclopentadiene, and higher order oligomers of cyclopentadiene, such as cyclopentadiene tetramer, cyclopentadiene pentamer, and the like, tetracyclododecene, norbornene, and $C_2$-$C_{12}$ hydrocarbyl substituted norbornenes, such as 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, 5-butenyl-2-norbornene, and the like. Examples of cyclic olefins include dicyclopentadiene, tricyclopentadiene, and higher order oligomers of cyclopentadiene, such as cyclopentadiene tetramer, cyclopentadiene pentamer, and the like, tetracyclododecene, norbornene, and $C_2$-$C_{12}$ hydrocarbyl substituted norbornenes, such as 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, 5-butenyl-2-norbornene, and the like. Examples of cyclic olefins include dicyclopentadiene, tricyclopentadiene, and higher order oligomers of cyclopentadiene, such as cyclopentadiene tetramer, cyclopentadiene pentamer, and the like, including structural isomers and/or stereoisomers, any and all of which are suitable for use in the present invention. Examples of cyclic olefins include dicyclopentadiene, tricyclopentadiene, and tetracyclopentadiene, including structural isomers and/or stereoisomers, any and all of which are suitable for use in the present invention. Examples of cyclic olefins include dicyclopentadiene and tricyclopentadiene, including structural isomers and/or stereoisomers, any and all of which are suitable for use in the present invention.

Metal Carbene Olefin Metathesis Catalysts

Catalyst compositions that may be used in the invention disclosed herein comprise one or more metal carbene olefin metathesis catalysts. Metal carbene olefin metathesis catalyst that may be used in the invention disclosed herein, are preferably a Group 8 transition metal complex having the structure of Formula (I):

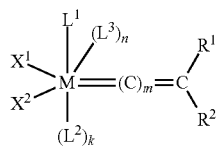

Formula (I)

in which:
M is a Group 8 transition metal;
$L^1$, $L^2$, and $L^3$ are neutral electron donor ligands;
n is 0 or 1, such that $L^3$ may or may not be present;
m is 0, 1, or 2;
k is 0 or 1;
$X^1$ and $X^2$ are anionic ligands; and
$R^1$ and $R^2$ are independently selected from hydrogen, hydrocarbyl, substituted hydrocarbyl, heteroatom-containing hydrocarbyl, substituted heteroatom-containing hydrocarbyl, and functional groups, wherein any two or more of $X^1$, $X^2$, $L^1$, $L^2$, $L^3$, $R^1$, and $R^2$ can be taken together to form one or more cyclic groups.

Additionally, in Formula (I), one or both of $R^1$ and $R^2$ may have the structure —$(W)_n$—$U^+V^-$, in which W is selected from hydrocarbylene, substituted hydrocarbylene, heteroatom-containing hydrocarbylene, or substituted heteroatom-containing hydrocarbylene; U is a positively charged Group 15 or Group 16 element substituted with hydrogen, hydrocarbyl, substituted hydrocarbyl, heteroatom-containing hydrocarbyl, or substituted heteroatom-containing hydrocarbyl; V is a negatively charged counterion; and n is 0 or 1. Furthermore, $R^1$ and $R^2$ may be taken together to form an indenylidene moiety, preferably phenylindenylidene.

Preferred metal carbene olefin metathesis catalysts contain Ru or Os as the Group 8 transition metal, with Ru particularly preferred.

Numerous embodiments of the metal carbene olefin metathesis catalysts useful in the reactions disclosed herein are described in more detail infra. For the sake of convenience, the metal carbene olefin metathesis catalysts are described in groups, but it should be emphasized that these groups are not meant to be limiting in any way. That is, any of the metal carbene olefin metathesis catalysts useful in the invention may fit the description of more than one of the groups described herein.

A first group of metal carbene olefin metathesis catalysts, then, are commonly referred to as First Generation Grubbs-type catalysts, and have the structure of Formula (I). For the first group of catalysts, M is a Group 8 transition metal, m is 0, 1, or 2, and n, $X^1$, $X^2$, $L^1$, $L^2$, $L^3$, $R^1$, and $R^2$ are described as follows. For the first group of catalysts, n is 0, and $L^1$ and $L^2$ are independently selected from phosphine, sulfonated phosphine, phosphite, phosphinite, phosphonite, arsine, stibine, ether, (including cyclic ethers), amine, amide, imine, sulfoxide, carboxyl, nitrosyl, pyridine, substituted pyridine, imidazole, substituted imidazole, pyrazine, substituted pyrazine and thioether. Exemplary ligands are trisubstituted phosphines. Preferred trisubstituted phosphines are of the formula $PR^{H1}R^{H2}R^{H3}$, where $R^{H1}$, $R^{H2}$, and $R^{H3}$ are each independently substituted or unsubstituted aryl or $C_1$-$C_{10}$ alkyl, particularly primary alkyl, secondary alkyl, or cycloalkyl. In the most preferred, $L^1$ and $L^2$ are independently selected from the group consisting of trimethylphosphine (PMe$_3$), triethylphosphine (PEt$_3$), tri-n-butylphosphine (PBu$_3$), tri(ortho-tolyl)phosphine (P-o-tolyl$_3$), tri-tert-butylphosphine (P-tert-Bu$_3$), tricyclopentylphosphine (PCp$_3$), tricyclohexylphosphine (PCy$_3$), triisopropylphosphine (P-i-Pr$_3$), trioctylphosphine (POct$_3$), triisobutylphosphine, (P-i-Bu$_3$), triphenylphosphine (PPh$_3$), tri(pentafluorophenyl)phosphine (P(C$_6$F$_5$)$_3$), methyldiphenylphosphine (PMePh$_2$), dimethylphenylphosphine (PMe$_2$Ph), and diethylphenylphosphine (PEt$_2$Ph). Alternatively, $L^1$ and $L^2$ may be independently selected from phosphabicycloalkane (e.g., monosubstituted 9-phosphabicyclo-[3.3.1]nonane, or monosubstituted 9-phosphabicyclo[4.2.1]nonane] such as cyclohexylphoban, isopropylphoban, ethylphoban, methylphoban, butylphoban, pentylphoban and the like). $X^1$ and $X^2$ are anionic ligands, and may be the same or different, or are linked together to form a cyclic group, typically although not necessarily a five- to eight-membered ring. In preferred embodiments, $X^1$ and $X^2$ are each independently hydrogen, halide, or one of the following groups: $C_1$-$C_{20}$ alkyl, $C_5$-$C_{24}$ aryl, $C_1$-$C_{20}$ alkoxy, $C_5$-$C_{24}$ aryloxy, $C_2$-$C_{20}$ alkoxycarbonyl, $C_6$-$C_{24}$ aryloxycarbonyl, $C_2$-$C_{24}$ acyl, $C_2$-$C_{24}$ acyloxy, $C_1$-$C_{20}$ alkylsulfonato, $C_5$-$C_{24}$ arylsulfonato, $C_1$-$C_{20}$ alkylsulfanyl, $C_5$-$C_{24}$ arylsulfanyl, $C_1$-$C_{20}$ alkylsulfinyl, NO$_3$, —N=C=O, —N=C=S, or $C_5$-$C_{24}$ arylsulfinyl. Optionally, $X^1$ and $X^2$ may be substituted with one or more moieties selected from $C_1$-$C_{12}$ alkyl, $C_1$-$C_{12}$ alkoxy, $C_5$-$C_{24}$ aryl, and halide, which may, in turn, with the exception of halide, be further substituted with one or more groups selected from halide, $C_1$-$C_6$ alkyl, $C_1$-$C_6$ alkoxy, and phenyl. In more preferred embodiments, $X^1$ and $X^2$ are halide, benzoate, $C_2$-$C_6$ acyl, $C_2$-$C_6$ alkoxycarbonyl, $C_1$-$C_6$ alkyl, phenoxy, $C_1$-$C_6$ alkoxy, $C_1$-$C_6$ alkylsulfanyl, aryl, or $C_1$-$C_6$ alkylsulfonyl. In even more preferred embodiments, $X^1$ and $X^2$ are each halide, CF$_3$CO$_2$, CH$_3$CO$_2$, CFH$_2$CO$_2$, (CH$_3$)$_3$CO, (CF$_3$)$_2$(CH$_3$)CO, (CF$_3$)(CH$_3$)$_2$CO, PhO, MeO, EtO, tosylate, mesylate, or trifluoromethanesulfonate. In the most preferred embodiments, $X^1$ and $X^2$ are each chloride. $R^1$ and $R^2$ are independently selected from hydrogen, hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), heteroatom-containing hydrocarbyl (e.g., heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and substituted heteroatom-containing hydrocarbyl (e.g., substituted heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and functional groups. $R^1$ and $R^2$ may also be linked to form a cyclic group, which may be aliphatic or aromatic, and may contain substituents and/or heteroatoms. Generally, such a cyclic group will contain 4 to 12, preferably 5, 6, 7, or 8 ring atoms.

In preferred metal carbene olefin metathesis catalysts, $R^1$ is hydrogen and $R^2$ is selected from $C_1$-$C_{20}$ alkyl, $C_2$-$C_{20}$ alkenyl, and $C_5$-$C_{24}$ aryl, more preferably $C_1$-$C_6$ alkyl, $C_2$-$C_6$ alkenyl, and $C_5$-$C_{14}$ aryl. Still more preferably, $R^2$ is phenyl, vinyl, methyl, isopropyl, or t-butyl, optionally substituted with one or more moieties selected from $C_1$-$C_6$ alkyl, $C_1$-$C_6$ alkoxy, phenyl, and a functional group Fn as defined earlier herein. Most preferably, $R^2$ is phenyl or vinyl substituted with one or more moieties selected from methyl, ethyl, chloro, bromo, iodo, fluoro, nitro, dimethylamino, methyl, methoxy, and phenyl. Optimally, $R^2$ is phenyl or —CH=C(CH$_3$)$_2$. Any two or more (typically two, three, or four) of $X^1$, $X^2$, $L^1$, $L^2$, $L^3$, $R^1$, and $R^2$ can be taken together to form a cyclic group, including bidentate or multidentate ligands, as disclosed, for example, in U.S. Pat. No. 5,312, 940, the disclosure of which is incorporated herein by reference. When any of $X^1$, $X^2$, $L^1$, $L^2$, $L^3$, $R^1$, and $R^2$ are linked to form cyclic groups, those cyclic groups may contain 4 to 12, preferably 4, 5, 6, 7 or 8 atoms, or may comprise two or three of such rings, which may be either fused or linked. The cyclic groups may be aliphatic or aromatic, and may be heteroatom-containing and/or substituted. The cyclic group may, in some cases, form a bidentate ligand or a tridentate ligand. Examples of bidentate ligands include, but are not limited to, bisphosphines, dialkoxides, alkyldiketonates, and aryldiketonates.

A second group of metal carbene olefin metathesis catalysts, commonly referred to as Second Generation Grubbs-type catalysts, have the structure of Formula (I), wherein $L^1$ is a carbene ligand having the structure of Formula (II):

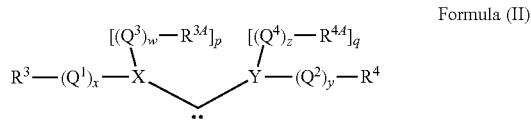

Formula (II)

such that the complex may have the structure of Formula (III):

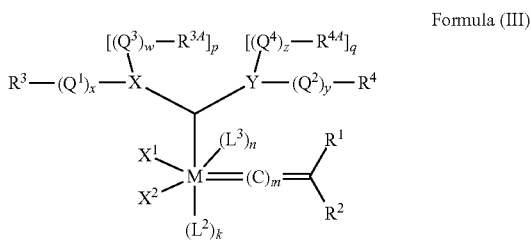

Formula (III)

wherein M, m, n, $X^1$, $X^2$, $L^2$, $L^3$, $R^1$, and $R^2$ are as defined for the first group of catalysts, and the remaining substituents are as follows;

X and Y are heteroatoms typically selected from N, O, S, and P. Since O and S are divalent, p is necessarily 0 when X is O or S, q is necessarily 0 when Y is O or S, and k is 0 or 1. However, when X is N or P, then p is 1, and when Y is N or P, then q is 1. In a preferred embodiment, both X and Y are N;

$Q^1$, $Q^2$, $Q^3$, and $Q^4$ are linkers, e.g., hydrocarbylene (including substituted hydrocarbylene, heteroatom-containing hydrocarbylene, and substituted heteroatom-containing hydrocarbylene, such as substituted and/or heteroatom-containing alkylene) or —(CO)—, and w, x, y, and z are independently 0 or 1, meaning that each linker is optional. Preferably, w, x, y, and z are all 0. Further, two or more substituents on adjacent atoms within $Q^1$, $Q^2$, $Q^3$, and $Q^4$ may be linked to form an additional cyclic group; and $R^3$, $R^{3A}$, $R^4$, and $R^{4A}$ are independently selected from hydrogen, hydrocarbyl, substituted hydrocarbyl, heteroatom-containing hydrocarbyl, and substituted heteroatom-containing hydrocarbyl. In addition, X and Y may be independently selected from carbon and one of the heteroatoms mentioned above, preferably no more than one of X or Y is carbon. Also, $L^2$ and $L^3$ may be taken together to form a single bindentate electron-donating heterocyclic ligand. Furthermore, $R^1$ and $R^2$ may be taken together to form an indenylidene moiety, preferably phenylindenylidene. Moreover, $X^1$, $X^2$, $L^2$, $L^3$, X and Y may be further coordinated to boron or to a carboxylate.

In addition, any two or more of $X^1$, $X^2$, $L^1$, $L^2$, $L^3$, $R^1$, $R^2$, $R^3$, $R^{3A}$, $R^4$, $R^{4A}$, $Q^1$, $Q^2$, $Q^3$, and $Q^4$ can be taken together to form a cyclic group. Any two or more of $X^1$, $X^2$, $L^1$, $L^2$, $L^3$, $R^1$, $R^2$, $R^3$, $R^{3A}$, $R^4$, and $R^{4A}$ can also be taken to be -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the of arylalkylene can be substituted or unsubstituted, and wherein hetero atoms and/or functional groups may be present in either the aryl or the alkyl portions of the alkylene and arylalkylene groups, and Fn is a functional group, or together to form a cyclic group.

A particular class of carbene ligands having the structure of Formula (II), where $R^{3A}$ and $R^{4A}$ are linked to form a cyclic group and at least one of X or Y is a nitrogen, or at least one of $Q^3$ or $Q^4$ is a heteroatom-containing hydrocarbylene or substituted heteroatom-containing hydrocarbylene, where at least one heteroatom is a nitrogen, are commonly referred to as N-heterocyclic carbene (NHC) ligands. Preferably, $R^{3A}$ and $R^{4A}$ are linked to form a cyclic group so that the carbene ligand has the structure of Formula (IV):

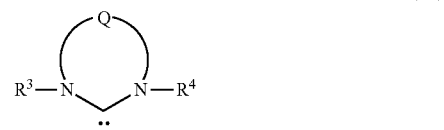

Formula (IV)

wherein $R^3$ and $R^4$ are as defined for the second group of metal carbene olefin metathesis catalysts above, with preferably at least one of $R^3$ and $R^4$, and more preferably both $R^3$ and $R^4$, being alicyclic or aromatic of one to about five rings, and optionally containing one or more heteroatoms and/or substituents. Q is a linker, typically a hydrocarbylene linker, including substituted hydrocarbylene, heteroatom-containing hydrocarbylene, and substituted heteroatom-containing hydrocarbylene linkers, wherein two or more substituents on adjacent atoms within Q may also be linked to form an additional cyclic structure, which may be similarly substituted to provide a fused polycyclic structure of two to about five cyclic groups. Q is often, although not necessarily, a two-atom linkage or a three-atom linkage.

Examples of N-heterocyclic carbene (NHC) ligands and acyclic diaminocarbene ligands suitable as $L^1$ thus include, but are not limited to, the following where DIPP or DiPP is diisopropylphenyl and Mes is 2,4,6-trimethylphenyl:

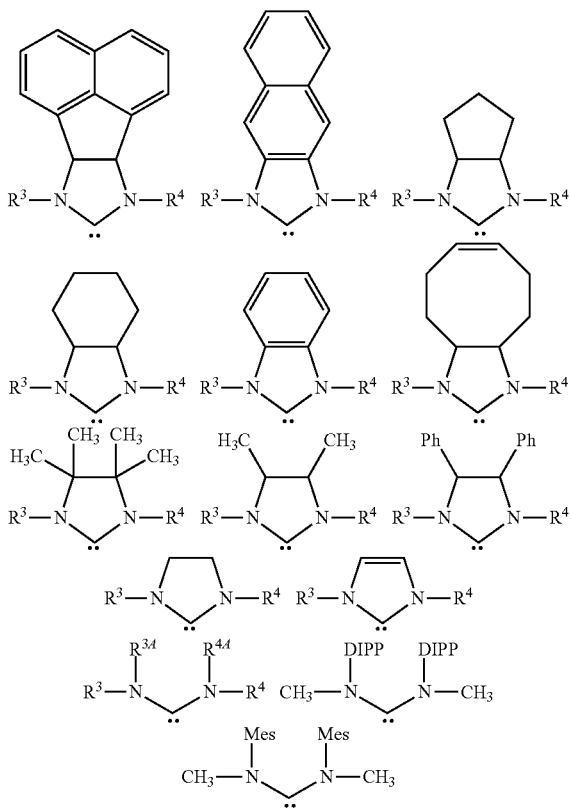

Additional examples of N-heterocyclic carbene (NHC) ligands and acyclic diaminocarbene ligands suitable as $L^1$ thus include, but are not limited to the following:

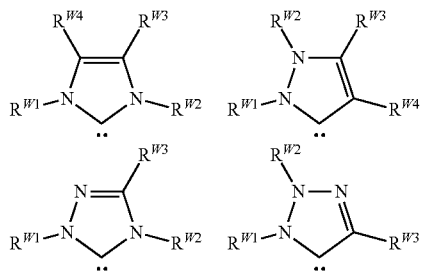

wherein $R^{W1}$, $R^{W2}$, $R^{W3}$, and $R^{W4}$ are independently hydrogen, unsubstituted hydrocarbyl, substituted hydrocarbyl, or heteroatom containing hydrocarbyl, and where one or both of $R^{W3}$ and $R^{W4}$ may be in independently selected from halogen, nitro, amido, carboxyl, alkoxy, aryloxy, sulfonyl, carbonyl, thio, or nitroso groups. Additional examples of N-heterocyclic carbene (NHC) ligands suitable as $L^1$ are further described in U.S. Pat. Nos. 7,378,528; 7,652,145; 7,294,717; 6,787,620; 6,635,768; and 6,552,139, the contents of each are incorporated herein by reference. Additionally, thermally activated N-Heterocyclic Carbene Precursors as disclosed in U.S. Pat. No. 6,838,489, the contents of which are incorporated herein by reference, may also be used with the present invention.

When M is ruthenium, then, the preferred complexes have the structure of Formula (V):

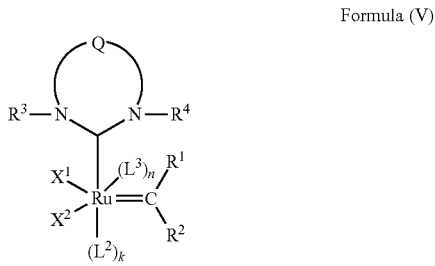

Formula (V)

In a more preferred embodiment, Q is a two-atom linkage having the structure $-CR^{11}R^{12}-CR^{13}R^{14}-$ or $-CR^{11}=CR^{13}-$, preferably $-CR^{11}R^{12}-CR^{13}R^{14}-$, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups. Examples of functional groups here include without limitation carboxyl, $C_1$-$C_{20}$ alkoxy, $C_5$-$C_{24}$ aryloxy, $C_2$-$C_{20}$ alkoxycarbonyl, $C_5$-$C_{24}$ alkoxycarbonyl, $C_2$-$C_{24}$ acyloxy, $C_1$-$C_{20}$ alkylthio, $C_5$-$C_{24}$ arylthio, $C_1$-$C_{20}$ alkylsulfonyl, and $C_1$-$C_{20}$ alkylsulfinyl, optionally substituted with one or more moieties selected from $C_1$-$C_{12}$ alkyl, $C_1$-$C_{12}$ alkoxy, $C_5$-$C_{14}$ aryl, hydroxyl, sulfhydryl, formyl, and halide. $R^{11}$, $R^{12}$, $R^{13}$, and $R^{14}$ are preferably independently selected from hydrogen, $C_1$-$C_{12}$ alkyl, substituted $C_1$-$C_{12}$ alkyl, $C_1$-$C_{12}$ heteroalkyl, substituted $C_1$-$C_{12}$ heteroalkyl, phenyl, and substituted phenyl. Alternatively, any two of $R^{11}$, $R^{12}$, $R^{13}$, and $R^{14}$ may be linked together to form a substituted or unsubstituted, saturated or unsaturated ring structure, e.g., a $C_4$-$C_{12}$ alicyclic group or a $C_5$ or $C_6$ aryl group, which may itself be substituted, e.g., with linked or fused alicyclic or aromatic groups, or with other substituents. In one further aspect, any one or more of $R^{11}$, $R^{12}$, $R^{13}$, and $R^{14}$ comprises one or more of the linkers. Additionally, $R^3$ and $R^4$ may be unsubstituted phenyl or phenyl substituted with one or more substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide. Furthermore, $X^1$ and $X^2$ may be halogen. When $R^3$ and $R^4$ are aromatic, they are typically although not necessarily composed of one or two aromatic rings, which may or may not be substituted, e.g., $R^3$ and $R^4$ may be phenyl, substituted phenyl, biphenyl, substituted biphenyl, or the like. In one preferred embodiment, $R^3$ and $R^4$ are the same and are each unsubstituted phenyl or phenyl substituted with up to three substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide. Preferably, any substituents present are hydrogen, $C_1$-$C_{12}$ alkyl, $C_1$-$C_{12}$ alkoxy, $C_5$-$C_{14}$ aryl, substituted $C_5$-$C_{14}$ aryl, or halide. As an example, $R^3$ and $R^4$ are mesityl (i.e., Mes as defined herein).

In a third group of metal carbene olefin metathesis catalysts having the structure of Formula (I), M, m, n, $X^1$, $X^2$, $R^1$, and $R^2$ are as defined for the first group of metal carbene olefin metathesis catalysts, $L^1$ is a strongly coordinating neutral electron donor ligand such as any of those described for the first and second group of metal carbene olefin metathesis catalysts, and $L^2$ and $L^3$ are weakly coordinating neutral electron donor ligands in the form of optionally substituted heterocyclic groups. Again, n is 0 or 1, such that $L^3$ may or may not be present. Generally, in the third group of metal carbenen olefin metathesis catalysts, $L^2$ and $L^3$ are optionally substituted five- or six-membered monocyclic groups containing 1 to 4, preferably 1 to 3, most preferably 1 to 2 heteroatoms, or are optionally substituted bicyclic or polycyclic structures composed of 2 to 5 such five- or six-membered monocyclic groups. If the heterocyclic group is substituted, it should not be substituted on a coordinating heteroatom, and any one cyclic moiety within a heterocyclic group will generally not be substituted with more than 3 substituents.

For the third group of metal carbene olefin metathesis catalysts, examples of $L^2$ and $L^3$ include, without limitation, heterocycles containing nitrogen, sulfur, oxygen, or a mixture thereof. Examples of nitrogen-containing heterocycles appropriate for $L^2$ and $L^3$ include pyridine, bipyridine, pyridazine, pyrimidine, bipyridamine, pyrazine, 1,3,5-triazine, 1,2,4-triazine, 1,2,3-triazine, pyrrole, 2H-pyrrole, 3H-pyrrole, pyrazole, 2H-imidazole, 1,2,3-triazole, 1,2,4-triazole, indole, 3H-indole, 1H-isoindole, cyclopenta(b)pyridine, indazole, quinoline, bisquinoline, isoquinoline, bisisoquinoline, cinnoline, quinazoline, naphthyridine, piperidine, piperazine, pyrrolidine, pyrazolidine, quinuclidine, imidazolidine, picolylimine, purine, benzimidazole, bisimidazole, phenazine, acridine, and carbazole. Additionally, the nitrogen-containing heterocycles may be optionally substituted on a non-coordinating heteroatom with a non-hydrogen substituent.

Examples of sulfur-containing heterocycles appropriate for $L^2$ and $L^3$ include thiophene, 1,2-dithiole, 1,3-dithiole, thiepin, benzo(b)thiophene, benzo(c)thiophene, thionaphthene, dibenzothiophene, 2H-thiopyran, 4H-thiopyran, and thioanthrene.

Examples of oxygen-containing heterocycles appropriate for $L^2$ and $L^3$ include 2H-pyran, 4H-pyran, 2-pyrone, 4-pyrone, oxepin, furan, 2H-1-benzopyran, coumarin, coumarone, chromene, chroman-4-one, isochromen-1-one, isochromen-3-one, xanthene, tetrahydrofuran, 1,4-dioxan, and dibenzofuran.

Examples of mixed heterocycles appropriate for $L^2$ and $L^3$ include isoxazole, oxazole, thiazole, isothiazole, 1,2,3-oxadiazole, 1,2,4-oxadiazole, 1,3,4-oxadiazole, 1,2,3,4-oxatriazole, 1,2,3,5-oxatriazole, 3H-1,2,3-dioxazole, 3H-1,2-oxathiole, 1,3-oxathiole, 4H-1,2-oxazine, 2H-1,3-oxazine, 1,4-oxazine, 1,2,5-oxathiazine, o-isooxazine, phenoxazine, phenothiazine, pyrano[3,4-b]pyrrole, indoxazine, benzoxazole, anthranil, and morpholine.

Preferred $L^2$ and $L^3$ ligands are aromatic nitrogen-containing and oxygen-containing heterocycles, and particularly preferred $L^2$ and $L^3$ ligands are monocyclic N-heteroaryl ligands that are optionally substituted with 1 to 3, preferably 1 or 2, substituents. Specific examples of particularly preferred $L^2$ and $L^3$ ligands are pyridine and substituted pyridines, such as 3-bromopyridine, 4-bromopyridine, 3,5-dibromopyridine, 2,4,6-tribromopyridine, 2,6-dibromopyridine, 3-chloropyridine, 4-chloropyridine, 3,5-dichloropyridine, 2,4,6-trichloropyridine, 2,6-dichloropyridine, 4-iodopyridine, 3,5-diiodopyridine, 3,5-dibromo-4-methylpyridine, 3,5-dichloro-4-methylpyridine, 3,5-dimethyl-4-bromopyridine, 3,5-dimethylpyridine, 4-methylpyridine, 3,5-diisopropylpyridine, 2,4,6-trimethylpyridine, 2,4,6-triisopropylpyridine, 4-(tert-butyl)pyridine, 4-phenylpyridine, 3,5-diphenylpyridine, 3,5-dichloro-4-phenylpyridine, and the like.

In general, any substituents present on $L^2$ and/or $L^3$ are selected from halo, $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, substituted $C_5$-$C_{24}$ heteroaryl, $C_6$-$C_{24}$ alkaryl, substituted $C_6$-$C_{24}$ alkaryl, $C_6$-$C_{24}$ heteroalkaryl, substituted $C_6$-$C_{24}$ heteroalkaryl, $C_6$-$C_{24}$ aralkyl, substituted $C_6$-$C_{24}$ aralkyl, $C_6$-$C_{24}$ heteroaralkyl, substituted $C_6$-$C_{24}$ heteroaralkyl, and functional groups, with suitable functional groups including, without limitation, $C_1$-$C_{20}$ alkoxy, $C_5$-$C_{24}$ aryloxy, $C_2$-$C_{20}$ alkylcarbonyl, $C_6$-$C_{24}$ arylcarbonyl, $C_2$-$C_{20}$ alkylcarbonyloxy, $C_6$-$C_{24}$ arylcarbonyloxy, $C_2$-$C_{20}$ alkoxycarbonyl, $C_6$-$C_{24}$ aryloxycarbonyl, halocarbonyl, $C_2$-$C_{20}$ alkylcarbonato, $C_6$-$C_{24}$ arylcarbonato, carboxy, carboxylato, carbamoyl, mono-($C_1$-$C_{20}$ alkyl)-substituted carbamoyl, di-($C_1$-$C_{20}$ alkyl)-substituted carbamoyl, di-N—($C_1$-$C_{20}$ alkyl), N—($C_5$-$C_{24}$ aryl)-substituted carbamoyl, mono-($C_5$-$C_{24}$ aryl)-substituted carbamoyl, di-($C_6$-$C_{24}$ aryl)-substituted carbamoyl, thiocarbamoyl, mono-($C_1$-$C_{20}$ alkyl)-substituted thiocarbamoyl, di-($C_1$-$C_{20}$ alkyl)-substituted thiocarbamoyl, di-N—($C_1$-$C_{20}$ alkyl)-N—($C_6$-$C_{24}$ aryl)-substituted thiocarbamoyl, mono-($C_6$-$C_{24}$ aryl)-substituted thiocarbamoyl, di-($C_6$-$C_{24}$ aryl)-substituted thiocarbamoyl, carbamido, formyl, thioformyl, amino, mono-($C_1$-$C_{20}$ alkyl)-substituted amino, di-($C_1$-$C_{20}$ alkyl)-substituted amino, mono-($C_5$-$C_{24}$ aryl)-substituted amino, di-($C_5$-$C_{24}$ aryl)-substituted amino, di-N—($C_1$-$C_{20}$ alkyl), N—($C_5$-$C_{24}$ aryl)-substituted amino, $C_2$-$C_{20}$ alkylamido, $C_6$-$C_{24}$ arylamido, imino, $C_1$-$C_{20}$ alkylimino, $C_5$-$C_{24}$ arylimino, nitro, and nitroso. In addition, two adjacent substituents may be taken together to form a ring, generally a five- or six-membered alicyclic or aryl ring, optionally containing 1 to 3 heteroatoms and 1 to 3 substituents as above.

Preferred substituents on $L^2$ and $L^3$ include, without limitation, halo, $C_1$-$C_{12}$ alkyl, substituted $C_1$-$C_{12}$ alkyl, $C_1$-$C_{12}$ heteroalkyl, substituted $C_1$-$C_{12}$ heteroalkyl, $C_5$-$C_{14}$ aryl, substituted $C_5$-$C_{14}$ aryl, $C_5$-$C_{14}$ heteroaryl, substituted $C_5$-$C_{14}$ heteroaryl, $C_6$-$C_{16}$ alkaryl, substituted $C_6$-$C_{16}$ alkaryl, $C_6$-$C_{16}$ heteroalkaryl, substituted $C_6$-$C_{16}$ heteroalkaryl, $C_6$-$C_{16}$ aralkyl, substituted $C_6$-$C_{16}$ aralkyl, $C_6$-$C_{16}$ heteroaralkyl, substituted $C_6$-$C_{16}$ heteroaralkyl, $C_1$-$C_{12}$ alkoxy, $C_5$-$C_{14}$ aryloxy, $C_2$-$C_{12}$ alkylcarbonyl, $C_6$-$C_{14}$ arylcarbonyl, $C_2$-$C_{12}$ alkylcarbonyloxy, $C_6$-$C_{14}$ arylcarbonyloxy, $C_2$-$C_{12}$ alkoxycarbonyl, $C_6$-$C_{14}$ aryloxycarbonyl, halocarbonyl, formyl, amino, mono-($C_1$-$C_{12}$ alkyl)-substituted amino, di-($C_1$-$C_{12}$ alkyl)-substituted amino, mono-($C_5$-$C_{14}$ aryl)-substituted amino, di-($C_5$-$C_{14}$ aryl)-substituted amino, and nitro.

Of the foregoing, the most preferred substituents are halo, $C_1$-$C_6$ alkyl, $C_1$-$C_6$ haloalkyl, $C_1$-$C_6$ alkoxy, phenyl, substituted phenyl, formyl, N,N-di($C_1$-$C_6$ alkyl)amino, nitro, and nitrogen heterocycles as described above (including, for example, pyrrolidine, piperidine, piperazine, pyrazine, pyrimidine, pyridine, pyridazine, etc.).

In certain embodiments, $L^2$ and $L^3$ may also be taken together to form a bidentate or multidentate ligand containing two or more, generally two, coordinating heteroatoms such as N, O, S, or P, with preferred such ligands being diimine ligands of the Brookhart type. One representative bidentate ligand has the structure of Formula (VI):

Formula (VI)

wherein $R^{15}$, $R^{16}$, $R^{17}$, and $R^{18}$ hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), heteroatom-containing hydrocarbyl (e.g., $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or substituted heteroatom-containing hydrocarbyl (e.g., substituted $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or (1) $R^{15}$ and $R^{16}$, (2) $R^{17}$ and $R^{18}$, (3) $R^{16}$ and $R^{17}$, or (4) both $R^{15}$ and $R^{16}$, and $R^{17}$ and $R^{18}$, may be taken together to form a ring, i.e., an N-heterocycle. Preferred cyclic groups in such a case are five- and six-membered rings, typically aromatic rings.

In a fourth group of metal carbene olefin metathesis catalysts that have the structure of Formula (I), two of the substituents are taken together to form a bidentate ligand or a tridentate ligand. Examples of bidentate ligands include, but are not limited to, bisphosphines, dialkoxides, alkyldiketonates, and aryldiketonates. Specific examples include —P(Ph)$_2$CH$_2$CH$_2$P(Ph)$_2$-, —As(Ph)$_2$CH$_2$CH$_2$As(Ph$_2$)—, —P(Ph)$_2$CH$_2$CH$_2$C(CF$_3$)$_{20}$—, binaphtholate dianions, pinacolate dianions, —P(CH$_3$)$_2$(CH$_2$)$_2$P(CH$_3$)$_2$—, and —OC(CH$_3$)$_2$(CH$_3$)$_2$CO—. Preferred bidentate ligands are —P(Ph)$_2$CH$_2$CH$_2$P(Ph)$_2$- and —P(CH$_3$)$_2$(CH$_2$)$_2$P(CH$_3$)$_2$—. Tridentate ligands include, but are not limited to, (CH$_3$)$_2$NCH$_2$CH$_2$P(Ph)CH$_2$CH$_2$N(CH$_3$)$_2$. Other preferred tridentate ligands are those in which any three of $X^1$, $X^2$, $L^1$, $L^2$, $L^3$, $R^1$, and $R^2$ (e.g., $X^1$, $L^1$, and $L^2$) are taken together to be cyclopentadienyl, indenyl, or fluorenyl, each optionally substituted with $C_2$-$C_{20}$ alkenyl, $C_2$-$C_{20}$ alkynyl, $C_1$-$C_{20}$ alkyl, $C_5$-$C_{20}$ aryl, $C_1$-$C_{20}$ alkoxy, $C_2$-$C_{20}$ alkenyloxy, $C_2$-$C_{20}$ alkynyloxy, $C_5$-$C_{20}$ aryloxy, $C_2$-$C_{20}$ alkoxycarbonyl, $C_1$-$C_{20}$ alkylthio, $C_1$-$C_{20}$ alkylsulfonyl, or $C_1$-$C_{20}$ alkylsulfinyl, each of which may be further substituted with $C_1$-$C_6$ alkyl, halide, $C_1$-$C_6$ alkoxy or with a phenyl group optionally substituted with halide, $C_1$-$C_6$ alkyl, or $C_1$-$C_6$ alkoxy. More preferably, in compounds of this type, X, $L^1$, and $L^2$ are taken together to be cyclopentadienyl or indenyl, each optionally substituted with vinyl, $C_1$-$C_{10}$ alkyl, $C_5$-$C_{20}$ aryl, $C_1$-$C_{10}$ carboxylate, $C_2$-$C_{10}$ alkoxycarbonyl, $C_1$-$C_{10}$ alkoxy, or $C_5$-$C_{20}$ aryloxy, each optionally substituted with $C_1$-$C_6$ alkyl, halide, $C_1$-$C_6$ alkoxy or with a phenyl group optionally substituted with halide, $C_1$-$C_6$ alkyl or $C_1$-$C_6$ alkoxy. Most preferably, X, $L^1$ and $L^2$ may be taken together to be cyclopentadienyl, optionally substituted with vinyl, hydrogen, methyl, or phenyl. Tetradentate ligands include, but are not limited to O$_2$C(CH$_2$)$_2$P(Ph)(CH$_2$)$_2$P(Ph)(CH$_2$)$_2$CO$_2$, phthalocyanines, and porphyrins.

Complexes wherein Y is coordinated to the metal are examples of a fifth group of metal carbene olefin metathesis catalysts, and are commonly called "Grubbs-Hoveyda" catalysts. Grubbs-Hoveyda metathesis-active metal carbene complexes may be described by the Formula (VII):

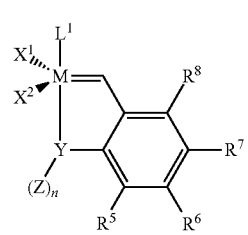

Formula (VII)

wherein M is a Group 8 transition metal, particularly Ru or Os, or, more particularly, Ru;

$X^1$, $X^2$, and $L^1$ are as previously defined herein for the first and second groups of metal carbene olefin metathesis catalysts;

Y is a heteroatom selected from N, O, S, and P; preferably Y is O or N;

$R^5$, $R^6$, $R^7$, and $R^8$ are each, independently, selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, hydroxyl, ester, ether, amine, imine, amide, halogen-substituted amide, trifluoroamide, sulfide, disulfide, sulfonate, carbamate, silane, siloxane, phosphine, phosphate, borate, or -A-Fn, wherein "A" and Fn have been defined above; and any combination of Y, Z, $R^5$, $R^6$, $R^7$, and $R^8$ can be linked to form one or more cyclic groups;

n is 0, 1, or 2, such that n is 1 for the divalent heteroatoms O or S, and n is 2 for the trivalent heteroatoms N or P; and Z is a group selected from hydrogen, alkyl, aryl, functionalized alkyl, functionalized aryl where the functional group(s) may independently be one or more or the following: alkoxy, aryloxy, halogen, carboxylic acid, ketone, aldehyde, nitrate, cyano, isocyanate, hydroxyl, ester, ether, amine, imine, amide, trifluoroamide, sulfide, disulfide, carbamate, silane, siloxane, phosphine, phosphate, or borate; methyl, isopropyl, sec-butyl, t-butyl, neopentyl, benzyl, phenyl and trimethylsilyl. Additionally, $R^5$, $R^6$, $R^7$, $R^8$, and Z may independently be thioisocyanate, cyanato, or thiocyanato.

Examples of complexes comprising Grubbs-Hoveyda ligands suitable in the invention include:

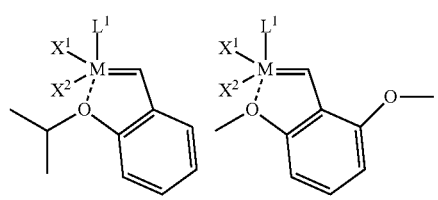

-continued

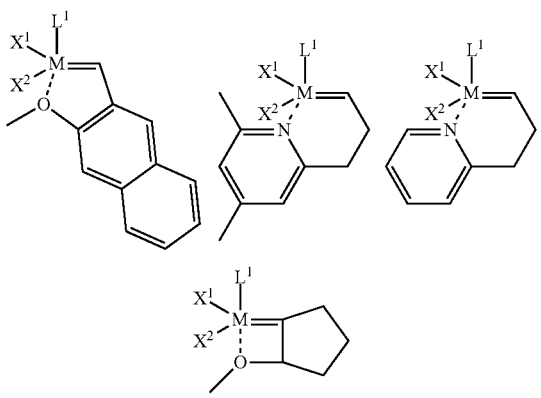

wherein $L^1$, $X^1$, $X^2$, and M are as described for any of the other groups of catalysts. Suitable chelating carbenes and carbene precursors are further described by Pederson et al. (U.S. Pat. Nos. 7,026,495 and 6,620,955, the disclosures of both of which are incorporated herein by reference) and Hoveyda et al. (U.S. Pat. No. 6,921,735 and WO0214376, the disclosures of both of which are incorporated herein by reference).

Further examples of complexes having linked ligands include those having linkages between a neutral NHC ligand and an anionic ligand, a neutral NHC ligand and an alkylidine ligand, a neutral NHC ligand and an $L^2$ ligand, a neutral NHC ligand and an $L^3$ ligand, an anionic ligand and an alkylidine ligand, and any combination thereof. While the possible structures are too numerous to list herein, some suitable structures based on Formula (III) include:

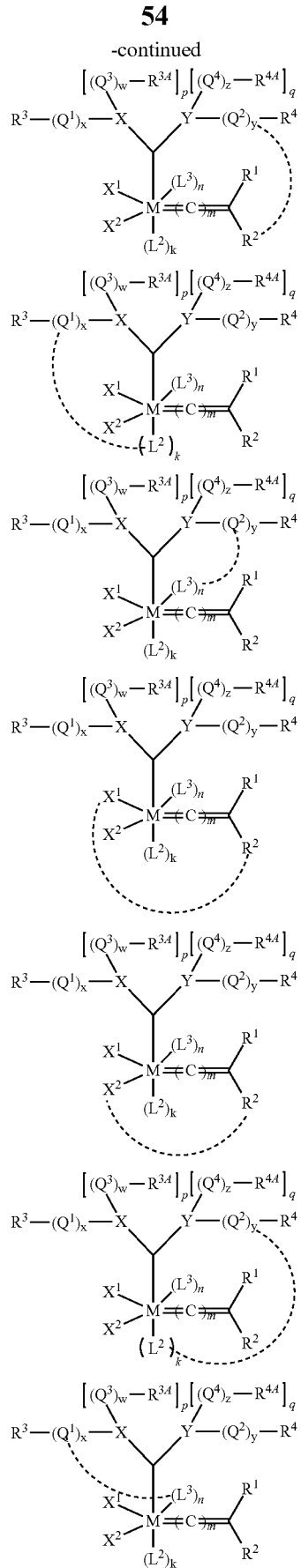

-continued

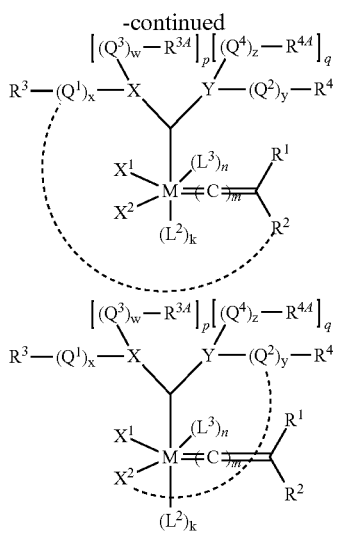

In addition to the metal carbene olefin metathesis catalysts that have the structure of Formula (I), as described above, other transition metal carbene complexes include, but are not limited to:

neutral ruthenium or osmium metal carbene complexes containing metal centers that are formally in the +2 oxidation state, have an electron count of 16, are penta-coordinated, and are of the general Formula (IX);

neutral ruthenium or osmium metal carbene complexes containing metal centers that are formally in the +2 oxidation state, have an electron count of 18, are hexa-coordinated, and are of the general Formula (X);

cationic ruthenium or osmium metal carbene complexes containing metal centers that are formally in the +2 oxidation state, have an electron count of 14, are tetra-coordinated, and are of the general Formula (XI); and cationic ruthenium or osmium metal carbene complexes containing metal centers that are formally in the +2 oxidation state, have an electron count of 14 or 16, are tetra-coordinated or penta-coordinated, respectively, and are of the general Formula (XII):

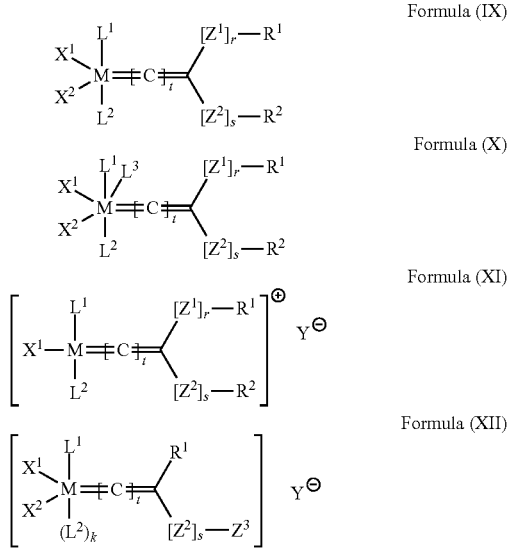

wherein:

M, $X^1$, $X^2$, $L^1$, $L^2$, $L^3$, $R^1$, and $R^2$ are as defined for any of the previously defined four groups of catalysts;

r and s are independently 0 or 1;

t is an integer in the range of 0 to 5;

k is an integer in the range of 0 to 1;

Y is any non-coordinating anion (e.g., a halide ion, $BF_4^-$, etc.);

$Z^1$ and $Z^2$ are independently selected from —O—, —S—, —$NR^2$—, —$PR^2$—, —P(=O)$R^2$—, —P(O$R^2$)—, —P(=O)(O$R^2$)—, —C(=O)—, —C(=O)O—, —OC(=O)—, —OC(=O)O—, —S(=O)—, —S(=O)$_2$—, —, and an optionally substituted and/or optionally heteroatom-containing $C_1$-$C_{20}$ hydrocarbylene linkage;

$Z^3$ is any cationic moiety such as —P($R^2$)$_3^+$ or —N($R^2$)$_3^+$; and any two or more of $X^1$, $X^2$, $L^1$, $L^2$, $L^3$, $Z^1$, $Z^2$, $Z^3$, $R^1$, and $R^2$ may be taken together to form a cyclic group, e.g., a multidentate ligand.

Additionally, another group of metal carbene olefin metathesis catalysts that may be used in the invention disclosed herein, is a Group 8 transition metal complex having the structure of Formula (XIII):

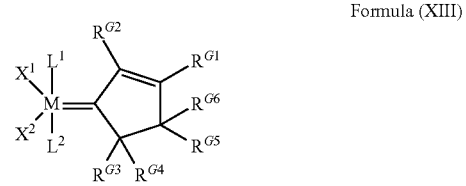

Formula (XIII)

wherein M is a Group 8 transition metal, particularly ruthenium or osmium, or more particularly, ruthenium; $X^1$, $X^2$, $L^1$ and $L^2$ are as defined for the first and second groups of catalysts defined above; and $R^{G1}$, $R^{G2}$, $R^{G3}$, $R^{G4}$, $R^{G5}$, and $R^{G6}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{G1}$, $R^{G2}$, $R^{G3}$, $R^{G4}$, $R^{G5}$, and $R^{G6}$ may be linked together to form a cyclic group.

Additionally, one preferred embodiment of the Group 8 transition metal complex of Formula (XIII) is a Group 8 transition metal complex of Formula (XIV):

Formula (XIV)

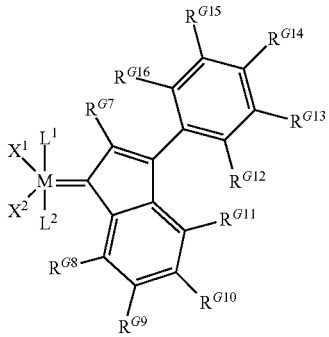

wherein M, $X^1$, $X^2$, $L^1$, $L^2$ are as defined above for Group 8 transition metal complex of Formula (XIII); and $R^{G7}$, $R^{G8}$, $R^{G9}$, $R^{G10}$, $R^{G11}$, $R^{G12}$, $R^{G13}$, $R^{G14}$, $R^{G15}$, and $R^{G16}$ are as defined above for $R^{G1}$, $R^{G2}$, $R^{G3}$, $R^{G4}$, $R^{G5}$, and $R^{G6}$ for Group 8 transition metal complex of Formula (XIII) or any one or more of the $R^{G7}$, $R^{G8}$, $R^{G9}$, $R^{G10}$, $R^{G11}$, $R^{G12}$, $R^{G13}$, $R^{G14}$, $R^{G15}$, and $R^{G16}$ may be linked together to form a cyclic group.

Additionally, another preferred embodiment of the Group 8 transition metal complex of Formula (XIII) is a Group 8 transition metal complex of Formula (XV):

Formula (XV)

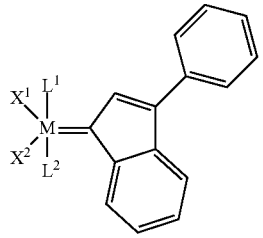

wherein M, $X^1$, $X^2$, $L^1$, and $L^2$ are as defined above for Group 8 transition metal complex of Formula (XIII).

Additionally, another group of metal carbene olefin metathesis catalysts that may be used in the invention disclosed herein, is a Group 8 transition metal complex comprising a Schiff base ligand having the structure of Formula (XVI):

Formula (XVI)

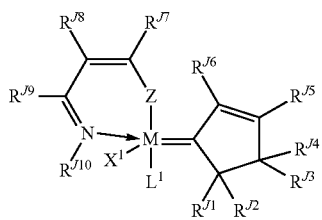

wherein M is a Group 8 transition metal, particularly ruthenium or osmium, or more particularly, ruthenium;

$X^1$, and $L^1$ are as defined for the first and second groups of catalysts defined above;

Z is selected from the group consisting of oxygen, sulfur, selenium, $NR^{J11}$, $PR^{J11}$, $AsR^{J11}$, and $SbR^{J11}$; and $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ may be linked together to form a cyclic group.

Additionally, one preferred embodiment of the Group 8 transition metal complex of Formula (XVI) is a Group 8 transition metal complex comprising a Schiff base ligand having the structure of Formula (XVII):

Formula (XVII)

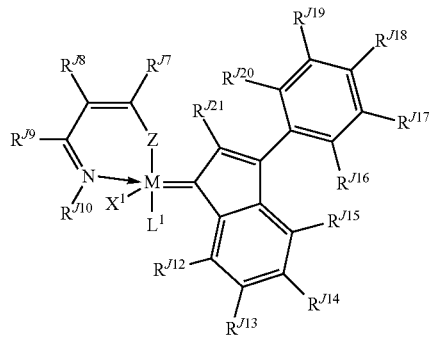

wherein M, $X^1$, $L^1$, Z, $R^{J7}$, $R^{J8}$, $R^{J9}$, $R^{J10}$, and $R^{J11}$ are as defined above for Group 8 transition metal complex of Formula (XVI); and $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ are as defined above for $R^{J1}$, $R^{J2}$, $R^{J3}$, $R^{J4}$, $R^{J5}$, and $R^{J6}$ for Group 8 transition metal complex of Formula (XVI), or any one or more of the $R^{J7}$, $R^{J8}$, $R^{J9}$, $R^{J10}$, $R^{J11}$, $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ may be linked together to form a cyclic group.

Additionally, another preferred embodiment of the Group 8 transition metal complex of Formula (XVI) is a Group 8 transition metal complex comprising a Schiff base ligand having the structure of Formula (XVIII):

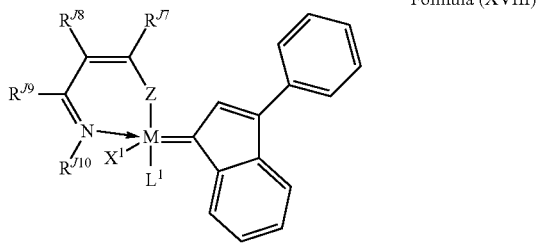

Formula (XVIII)

wherein M, $X^1$, $L^1$, Z, $R^{J7}$, $R^{J8}$, $R^{J9}$, $R^{J10}$, and $R^{J11}$ are as defined above for Group 8 transition metal complex of Formula (XVI).

Additionally, another group of metal carbene olefin metathesis catalysts that may be used in the invention disclosed herein, is a Group 8 transition metal complex comprising a Schiff base ligand having the structure of Formula (XIX):

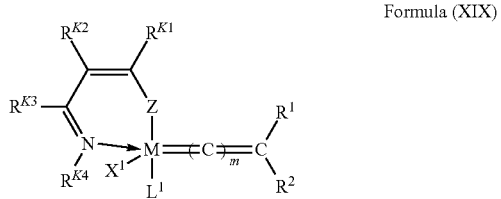

Formula (XIX)

wherein M is a Group 8 transition metal, particularly ruthenium or osmium, or more particularly, ruthenium;

$X^1$, $L^1$, $R^1$, and $R^2$ are as defined for the first and second groups of catalysts defined above;

Z is selected from the group consisting of oxygen, sulfur, selenium, $NR^{K5}$, $PR^{K5}$, $AsR^{K5}$, and $SbR^{K5}$;

m is 0, 1, or 2; and $R^{K1}$, $R^{K2}$, $R^{K3}$, $R^{K4}$, and $R^{K5}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{K1}$, $R^{K2}$, $R^{K3}$, $R^{K4}$, and $R^{K5}$ may be linked together to form a cyclic group.

In addition, catalysts of Formulae (XVI) to (XIX) may be optionally contacted with an activating compound, where at least partial cleavage of a bond between the Group 8 transition metal and at least one Schiff base ligand occurs, wherein the activating compound is either a metal or silicon compound selected from the group consisting of copper (I) halides; zinc compounds of the formula $Zn(R^{Y1})_2$, wherein $R^{Y1}$ is halogen, $C_1$-$C_7$ alkyl or aryl; tin compounds represented by the formula $SnR^{Y2}R^{Y3}R^{Y4}R^{Y5}$ wherein each of $R^{Y2}$, $R^{Y3}$, $R^{Y4}$ and $R^{Y5}$ is independently selected from the group consisting of halogen, $C_1$-$C_{20}$ alkyl, $C_3$-$C_{10}$ cycloalkyl, aryl, benzyl and $C_2$-$C_7$ alkenyl; and silicon compounds represented by the formula $SiR^{Y6}R^{Y7}R^{Y8}R^{Y9}$ wherein each of $R^{Y6}$, $R^{Y7}$, $R^{Y8}$, $R^{Y9}$ is independently selected from the group consisting of hydrogen, halogen, $C_1$-$C_{20}$ alkyl, halo, $C_1$-$C_7$ alkyl, aryl, heteroaryl, and vinyl.

In addition, catalysts of Formulae (XVI) to (XIX) may be optionally contacted with an activating compound where at least partial cleavage of a bond between the Group 8 transition metal and at least one Schiff base ligand occurs, wherein the activating compound is an inorganic acid such as hydrogen iodide, hydrogen bromide, hydrogen chloride, hydrogen fluoride, sulfuric acid, nitric acid, iodic acid, periodic acid, perchloric acid, HOCl, $HOClO_2$ and $HOIO_3$.

In addition, catalysts of Formulae (XVI) to (XIX) may be optionally contacted with an activating compound where at least partial cleavage of a bond between the Group 8 transition metal and at least one Schiff base ligand occurs, wherein the activating compound is an organic acid such as sulfonic acids including but not limited to methanesulfonic acid, aminobenzenesulfonic acid, benzenesulfonic acid, napthalenesulfonic acid, sulfanilic acid and trifluoromethanesulfonic acid; monocarboxylic acids including but not limited to acetoacetic acid, barbituric acid, bromoacetic acid, bromobenzoic acid, chloroacetic acid, chlorobenzoic acid, chlorophenoxyacetic acid, chloropropionic acid, cis-cinnamic acid, cyanoacetic acid, cyanobutyric acid, cyanophenoxyacetic acid, cyanopropionic acid, dichloroacetic acid, dichloroacetylacetic acid, dihydroxybenzoic acid, dihydroxymalic acid, dihydroxytartaric acid, dinicotinic acid, diphenylacetic acid, fluorobenzoic acid, formic acid, furancarboxylic acid, furoic acid, glycolic acid, hippuric acid, iodoacetic acid, iodobenzoic acid, lactic acid, lutidinic acid, mandelic acid, α-naphtoic acid, nitrobenzoic acid, nitrophenylacetic acid, o-phenylbenzoic acid, thioacetic acid, thiophene-carboxylic acid, trichloroacetic acid, and trihydroxybenzoic acid; and other acidic substances such as but not limited to picric acid and uric acid.

In addition, other examples of catalysts that may be used with the present invention are located in the following disclosures, each of which is incorporated herein by reference, U.S. Pat. Nos. 7,687,635; 7,671,224; 6,284,852; 6,486,279; and 5,977,393; International Publication Number WO2010/037550; and U.S. patent application Ser. Nos. 12/303,615; 10/590,380; 11/465,651 (Publication No.: US 2007/0043188); and Ser. No. 11/465,651 (Publication No.: US 2008/0293905 Corrected Publication); and European Pat. Nos. EP1757613B1 and EP1577282B1.

Non-limiting examples of catalysts that may be used in the reactions disclosed herein include the following, some of which for convenience are identified throughout this disclosure by reference to their molecular weight:

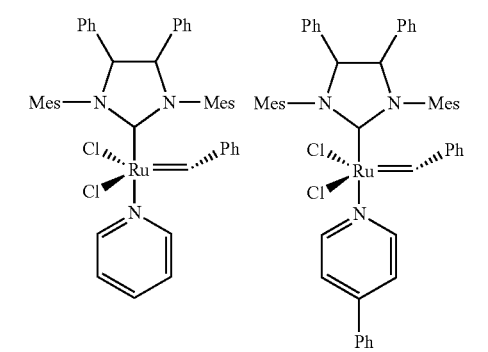
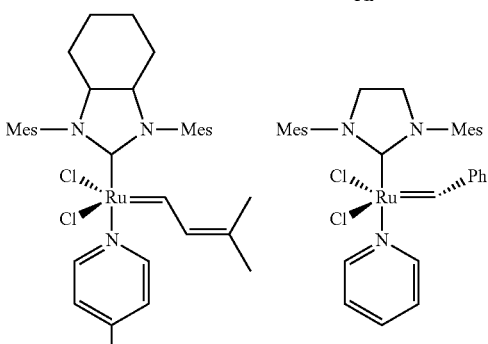
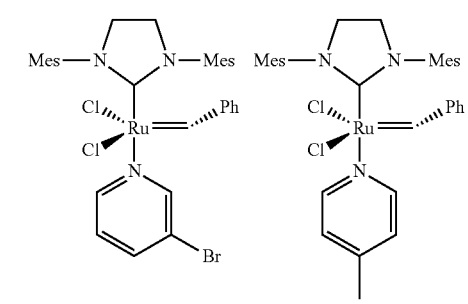
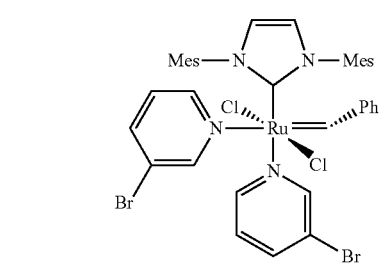
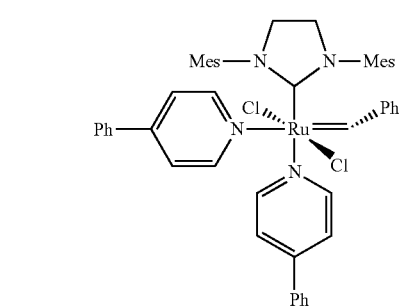
-continued
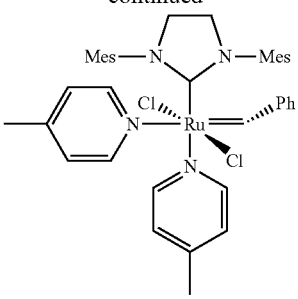
C884
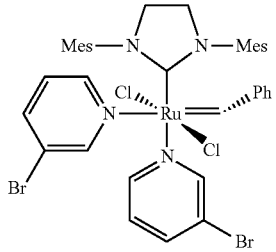
C727
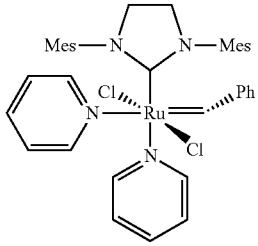
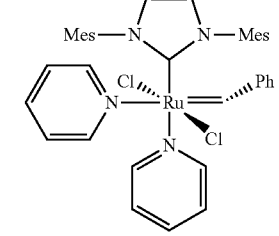
C827
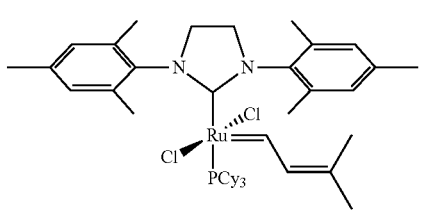
C859
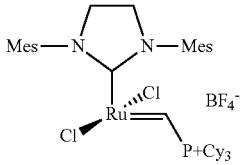
C841-n
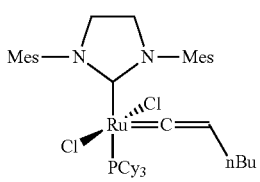

-continued
C916
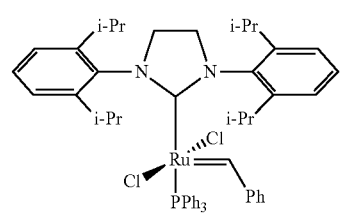
C965-p
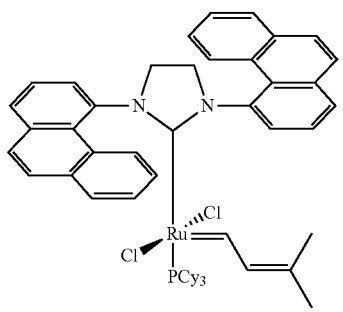
C727
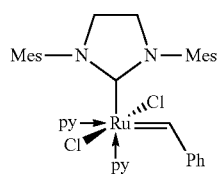
C577
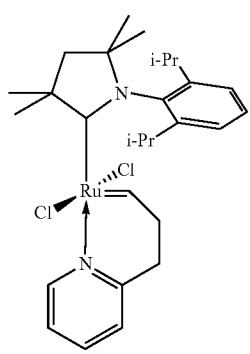
C646
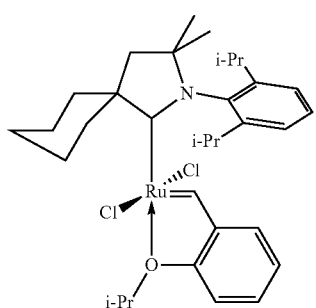
C701
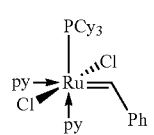
-continued
C767-m
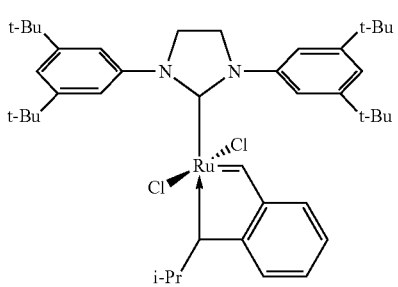
C811
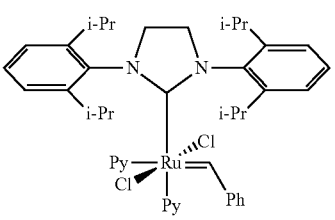
C801
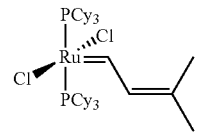
C838
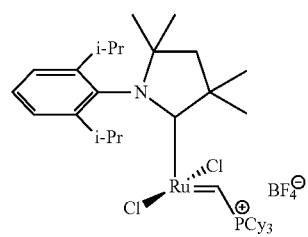
C711
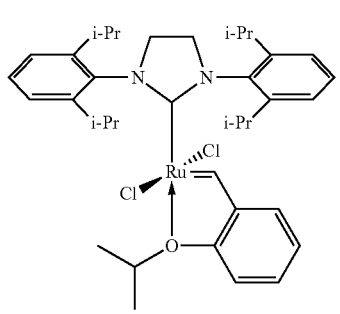
C933
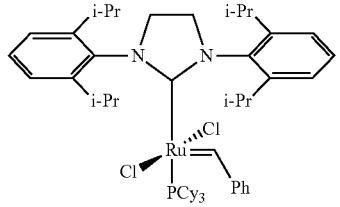

-continued
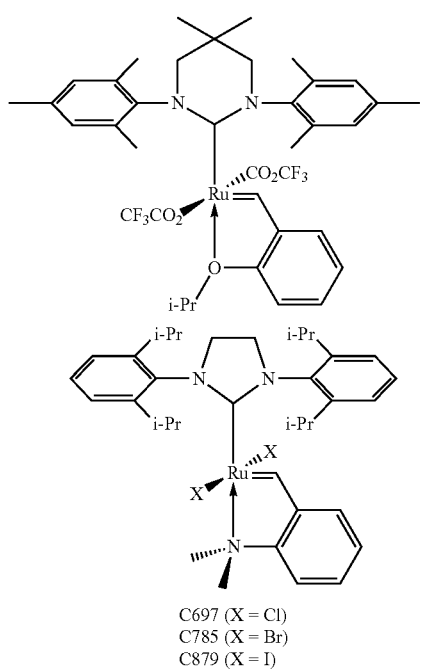
C824
C697 (X = Cl)
C785 (X = Br)
C879 (X = I)
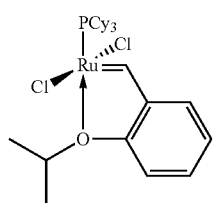
C601
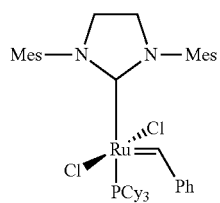
C848
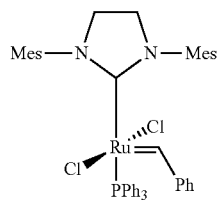
C831
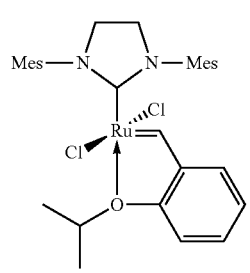
C627
-continued
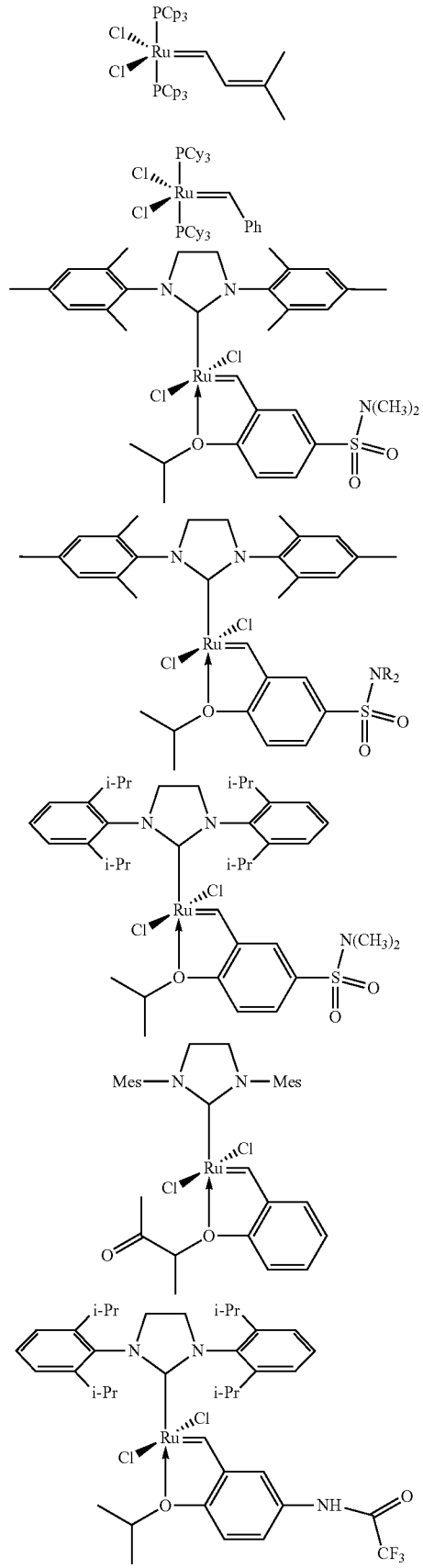
C716
C823

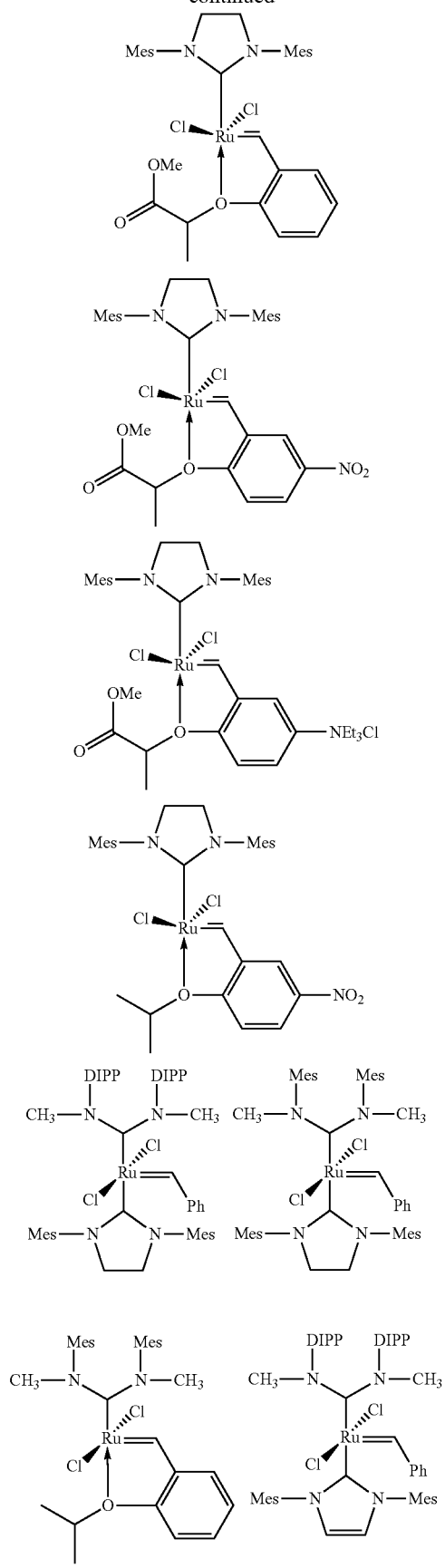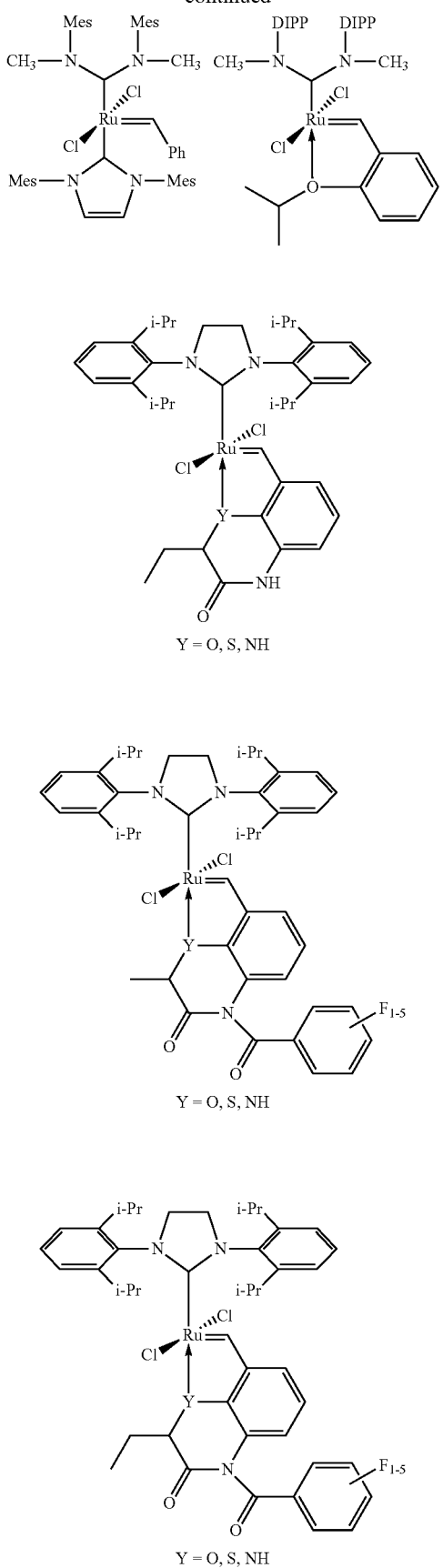

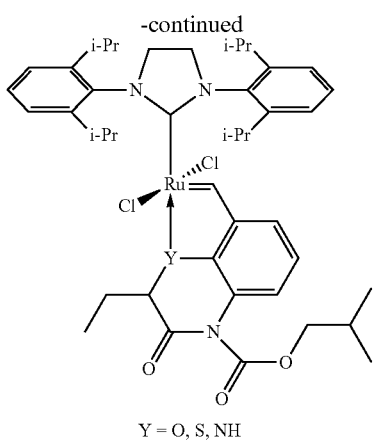

Y = O, S, NH

In the foregoing molecular structures and formulae, Ph represents phenyl, Cy represents cyclohexyl, Cp represents cyclopentyl, Me represents methyl, Bu represents n-butyl, t-Bu represents tert-butyl, i-Pr represents isopropyl, py represents pyridine (coordinated through the N atom), Mes represents mesityl (i.e., 2,4,6-trimethylphenyl), DiPP and DIPP represents 2,6-diisopropylphenyl, and MiPP represents 2-isopropylphenyl.

Further examples of metal carbene olefin metathesis catalysts useful in the reactions disclosed herein include the following: ruthenium(II) dichloro (3-methyl-2-butenylidene) bis(tricyclopentylphosphine) (C716); ruthenium (II) dichloro (3-methyl-2-butenylidene) bis(tricyclohexylphosphine) (C801); ruthenium(II) dichloro (phenylmethylene) bis(tricyclohexylphosphine) (C823); ruthenium(II) (1,3-bis-(2,4,6-trimethylphenyl)-2-imidazolidinylidene) dichloro (phenylmethylene) (triphenylphosphine) (C830); ruthenium(II) dichloro (phenylvinylidene) bis(tricyclohexylphosphine) (C835); ruthenium(II) dichloro (tricyclohexylphosphine) (o-isopropoxyphenylmethylene) (C601); ruthenium(II) (1,3-bis-(2, 4,6-trimethylphenyl)-2-imidazolidinylidene) dichloro (phenylmethylene) bis(3-bromopyridine) (C884); [1,3-bis-(2,4,6-trimethylphenyl)-2-imidazolidinylidene]dichloro(o-isopropoxyphenylmethylene) ruthenium(II) (C627); [1,3-bis-(2,4,6-trimethylphenyl)-2-imidazolidinylidene] dichloro (benzylidene) (triphenylphosphine) ruthenium(II) (C831); [1,3-bis-(2,4,6-trimethylphenyl)-2-imidazolidinylidene] dichloro (benzylidene)(methyldiphenylphosphine) ruthenium(II) (C769); [1,3-bis-(2,4,6-trimethylphenyl)-2-imidazolidinylidene]dichloro(benzylidene) (tricyclohexylphosphine) ruthenium(II) (C848); [1,3-bis-(2,4,6-trimethylphenyl)-2-imidazolidinylidene] dichloro (benzylidene) (diethylphenylphosphine) ruthenium(II) (C735); [1,3-bis-(2,4,6-trimethylphenyl)-2-imidazolidinylidene]dichloro(benzylidene)(tri-n-butylphosphine) ruthenium(II) (C771); [1,3-bis-(2,4,6-trimethylphenyl)-2-imidazolidinylidene]dichloro(3-methyl-2-butenylidene)(triphenylphosphine) ruthenium(II) (C809); [1,3-bis-(2,4,6-trimethylphenyl)-2-imidazolidinylidene]dichloro(3-methyl-2-butenylidene)(methyldiphenylphosphine) ruthenium(II) (C747); [1,3-bis-(2,4,6-trimethylphenyl)-2-imidazolidinylidene]dichloro(3-methyl-2-butenylidene) (tricyclohexylphosphine) ruthenium(II) (C827); [1,3-bis-(2,4,6-trimethylphenyl)-2-imidazolidinylidene] dichloro(3-methyl-2-butenylidene) (diethylphenylphosphine) ruthenium(II) (C713); [1,3-bis-(2,4,6-trimethylphenyl)-2-imidazolidinylidene] dichloro (3-methyl-2-butenylidene) (tri-n-butylphosphine) ruthenium(II) (C749); [1,3-bis-(2,4,6-trimethylphenyl)-2-imidazolidinylidene] dichloro (phenylindenylidene)(triphenylphosphine) ruthenium(II) (C931); [1,3-bis-(2,4,6-trimethylphenyl)-2-imidazolidinylidene] dichloro (phenylindenylidene) (methylphenylphosphine) ruthenium(II) (C869); [1,3-bis-(2,4,6-trimethylphenyl)-2-imidazolidinylidene]dichloro (phenylindenylidene) (tricyclohexylphosphine) ruthenium (II) (C949); [1,3-bis-(2,4,6-trimethylphenyl)-2-imidazolidinylidene]dichloro (phenylindenylidene) (diethylphenylphosphine) ruthenium(II) (C835); [1,3-bis-(2,4,6-trimethylphenyl)-2-imidazolidinylidene]dichloro (phenylindenylidene)(tri-n-butylphosphine) ruthenium(II) (C871); [1,3-bis-(2,4,6-trimethylphenyl)-2-imidazolidinylidene]dichloro(tert-butylvinylidene) (tricyclohexylphosphine) ruthenium(II) (C841); [1,3-bis-(2,4,6-trimethylphenyl)-2-imidazolidinylidene]dichloro(phenylvinylidene) (tricyclohexylphosphine) ruthenium(II), ruthenium(II) and dichloro (tert-butylvinylidene) bis(tricyclohexylphosphine) (C815).

Still further metal carbene olefin metathesis catalysts useful in ROMP reactions, and/or in other metathesis reactions, such as ring-closing metathesis, cross metathesis, ring-opening cross metathesis, self-metathesis, ethenolysis, alkenolysis, acyclic diene metathesis polymerization, and combinations thereof, include the following structures:

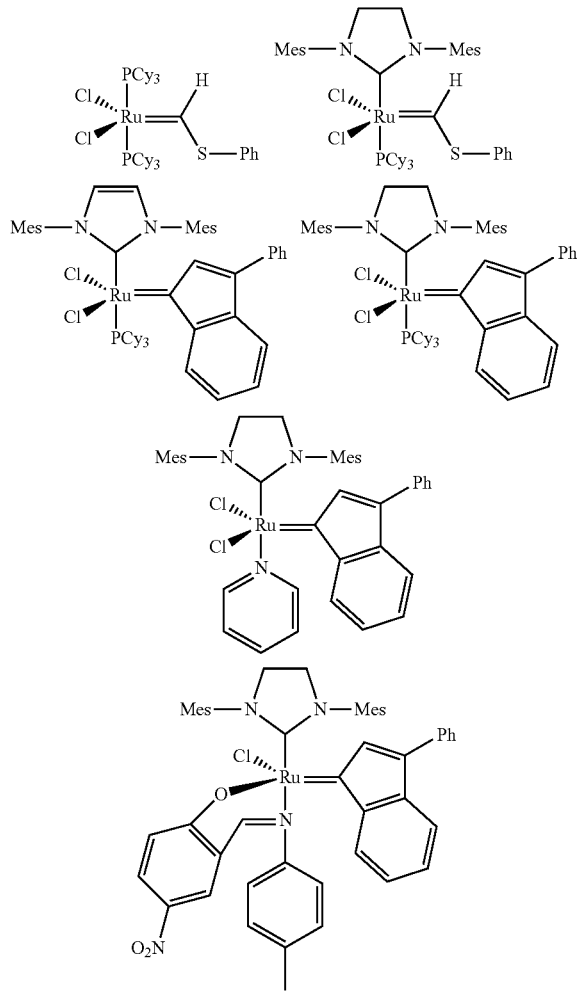

-continued

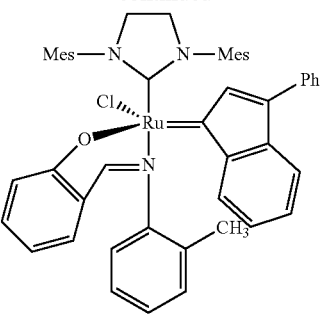
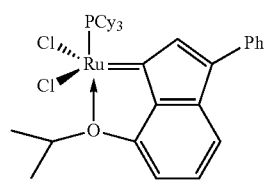
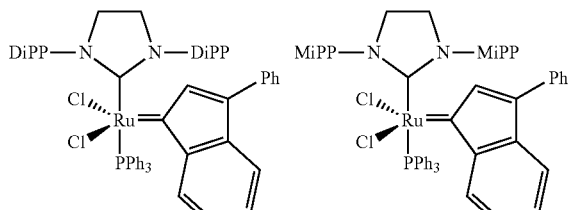
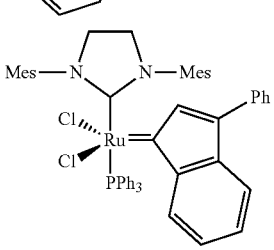
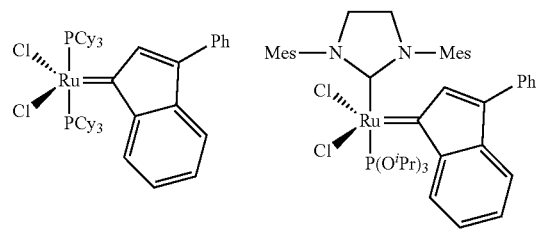
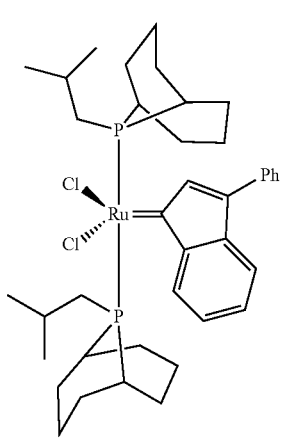

-continued

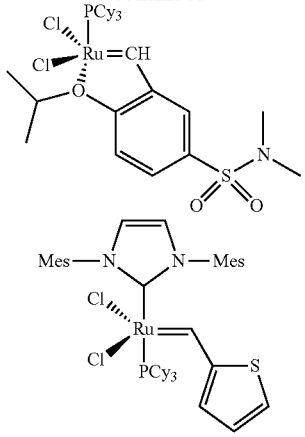
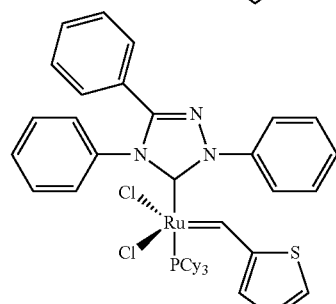
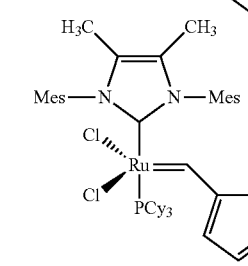

In general, the transition metal complexes (metal carbene olefin metathesis catalysts) used herein can be prepared by several different methods, such as those described by Schwab et al. (1996) *J. Am. Chem. Soc.* 118:100-110, Scholl et al. (1999) *Org. Lett.* 6:953-956, Sanford et al. (2001) *J. Am. Chem. Soc.* 123:749-750, U.S. Pat. Nos. 5,312,940, and 5,342,909, the disclosures of each of which are incorporated herein by reference. Also see U.S. Pat. Pub. No. 2003/0055262 to Grubbs et al., WO 02/079208, and U.S. Pat. No. 6,613,910 to Grubbs et al., the disclosures of each of which are incorporated herein by reference. Preferred synthetic methods are described in WO 03/11455A1 to Grubbs et al., the disclosure of which is incorporated herein by reference.

Examples of preferred metal carbene olefin metathesis catalysts are Group 8 transition metal complexes having the structure of Formula (I) commonly called "First Generation Grubbs" catalysts, Formula (III) commonly called "Second Generation Grubbs" catalysts, or Formula (VII) commonly called "Grubbs-Hoveyda" catalysts.

Examples of preferred metal carbene olefin metathesis catalysts have the structure of Formula (I), wherein:

M is a Group 8 transition metal;
$L^1$, $L^2$, and $L^3$ are neutral electron donor ligands;
n is 0 or 1;
m is 0, 1, or 2;
k is 0 or 1;
$X^1$ and $X^2$ are anionic ligands;

$R^1$ and $R^2$ are independently selected from hydrogen, hydrocarbyl, substituted hydrocarbyl, heteroatom-containing hydrocarbyl, substituted heteroatom-containing hydrocarbyl, and functional groups, wherein any two or more of $X^1$, $X^2$, $L^1$, $L^2$, $L^3$, $R^1$, and $R^2$ can be taken together to form one or more cyclic groups.

Examples of preferred metal carbene olefin metathesis catalysts have the structure of Formula (VII), wherein:

M is a Group 8 transition metal;

$L^1$ is a neutral electron donor ligand;

$X^1$ and $X^2$ are anionic ligands;

Y is a heteroatom selected from O or N;

$R^5$, $R^6$, $R^7$, and $R^8$ are independently selected from hydrogen, hydrocarbyl, substituted hydrocarbyl, heteroatom-containing hydrocarbyl, substituted heteroatom-containing hydrocarbyl, and functional groups;

n is 0, 1, or 2; and

Z is selected from hydrogen, hydrocarbyl, substituted hydrocarbyl, heteroatom-containing hydrocarbyl, substituted heteroatom-containing hydrocarbyl, and functional groups, wherein any combination of Y, Z, $R^5$, $R^6$, $R^7$, and $R^8$ can be linked to form one or more cyclic groups.

Examples of preferred metal carbene olefin metathesis catalysts have the structure of Formula (I), wherein:

M is ruthenium;

n is 0;

m is 0;

k is 1;

$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene and $L^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

$X^1$ and $X^2$ are chloride;

$R^1$ is hydrogen and $R^2$ is phenyl or —CH=C(CH$_3$)$_2$ or thienyl; or $R^1$ and $R^2$ are taken together to form phenylindenylidene.

Examples of preferred metal carbene olefin metathesis catalysts have the structure of Formula (VII), wherein:

M is ruthenium;

$L^1$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene;

$X^1$ and $X^2$ are chloride;

Y is oxygen;

$R^5$, $R^6$, $R^7$, and $R^8$ are each hydrogen;

n is 1; and

Z is isopropyl.

Examples of preferred metal carbene olefin metathesis catalysts have the structure of Formula (I), wherein:

M is Ruthenium;

n is 0;

m is 0;

k is 1;

$L^1$ is an N-heterocyclic carbene selected from the group consisting of 1,3-bis(2,4,6-trimethylphenyl)-2-imidazolidinylidene and 1,3-bis(2,4,6-trimethylphenyl)imidazol-2-ylidene;

$L^2$ is a trisubstituted phosphine independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

$X^1$ and $X^2$ are chloride; and $R^1$ is hydrogen and $R^2$ is phenyl or —CH=C(CH$_3$)$_2$ or thienyl; or $R^1$ and $R^2$ are taken together to form phenylindenylidene.

Examples of preferred metal carbene olefin metathesis catalysts have the structure of Formula (I), wherein:

M is Ruthenium;

n is 0;

m is 0;

k is 1;

$L^1$ is an N-heterocyclic carbene 1,3-bis(2,4,6-trimethylphenyl)-2-imidazolidinylidene;

$L^2$ is a trisubstituted phosphine independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

$X^1$ and $X^2$ are chloride; and $R^1$ is hydrogen and $R^2$ is phenyl or —CH=C(CH$_3$)$_2$ or thienyl; or $R^1$ and $R^2$ are taken together to form phenylindenylidene.

Examples of preferred metal carbene olefin metathesis catalysts have the structure of Formula (I), wherein:

M is Ruthenium;

n is 0;

m is 0;

k is 1;

$L^1$ is an N-heterocyclic carbene 1,3-bis(2,4,6-trimethylphenyl)imidazol-2-ylidene;

$L^2$ is a trisubstituted phosphine independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

$X^1$ and $X^2$ are chloride; and $R^1$ is hydrogen and $R^2$ is phenyl or —CH=C(CH$_3$)$_2$ or thienyl; or $R^1$ and $R^2$ are taken together to form phenylindenylidene.

Examples of preferred metal carbene olefin metathesis catalysts have the structure of Formula (I), wherein:
M is Ruthenium;
n is 0;
m is 0;
k is 1;
$L^1$ is an N-heterocyclic carbene selected from the group consisting of 1,3-bis(2,4,6-trimethylphenyl)-2-imidazolidinylidene and 1,3-bis(2,4,6-trimethylphenyl)imidazol-2-ylidene;
$L^2$ is a trisubstituted phosphine independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
$X^1$ and $X^2$ are chloride; and
$R^1$ is hydrogen and $R^2$ is phenyl or —CH=C(CH$_3$)$_2$; or $R^1$ and $R^2$ are taken together to form phenylindenylidene.

Examples of preferred metal carbene olefin metathesis catalysts have the structure of Formula (I), wherein:
M is Ruthenium;
n is 0;
m is 0;
k is 1;
$L^1$ is an N-heterocyclic carbene 1,3-bis(2,4,6-trimethylphenyl)-2-imidazolidinylidene;
$L^2$ is a trisubstituted phosphine independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
$X^1$ and $X^2$ are chloride; and
$R^1$ is hydrogen and $R^2$ is phenyl or —CH=C(CH$_3$)$_2$; or $R^1$ and $R^2$ are taken together to form phenylindenylidene.

Examples of preferred metal carbene olefin metathesis catalysts have the structure of Formula (I), wherein:
M is Ruthenium;
n is 0;
m is 0;
k is 1;
$L^1$ is an N-heterocyclic carbene 1,3-bis(2,4,6-trimethylphenyl)imidazol-2-ylidene;
$L^2$ is a trisubstituted phosphine independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
$X^1$ and $X^2$ are chloride; and
$R^1$ is hydrogen and $R^2$ is phenyl or —CH=C(CH$_3$)$_2$; or $R^1$ and $R^2$ are taken together to form phenylindenylidene.

Examples of preferred metal carbene olefin metathesis catalysts have the structure of Formula (I), wherein:
M is Ruthenium;
n is 0;
m is 0;
k is 1;
$L^1$ is an N-heterocyclic carbene selected from the group consisting of 1,3-bis(2,4,6-trimethylphenyl)-2-imidazolidinylidene and 1,3-bis(2,4,6-trimethylphenyl)imidazol-2-ylidene;
$L^2$ is a trisubstituted phosphine independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
$X^1$ and $X^2$ are chloride;
$R^1$ is hydrogen; and
$R^2$ is phenyl or —CH=C(CH$_3$)$_2$.

Examples of preferred metal carbene olefin metathesis catalysts have the structure of Formula (I), wherein:
M is Ruthenium;
n is 0;
m is 0;
k is 1;
$L^1$ is an N-heterocyclic carbene 1,3-bis(2,4,6-trimethylphenyl)-2-imidazolidinylidene;
$L^2$ is a trisubstituted phosphine independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
$X^1$ and $X^2$ are chloride;
$R^1$ is hydrogen; and
$R^2$ is phenyl or —CH=C(CH$_3$)$_2$.

Examples of preferred metal carbene olefin metathesis catalysts have the structure of Formula (I), wherein:
M is Ruthenium;
n is 0;
m is 0;
k is 1;
$L^1$ is an N-heterocyclic carbene 1,3-bis(2,4,6-trimethylphenyl)imidazol-2-ylidene;
$L^2$ is a trisubstituted phosphine independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
$X^1$ and $X^2$ are chloride;
$R^1$ is hydrogen; and
$R^2$ is phenyl or —CH=C(CH$_3$)$_2$.

Examples of preferred metal carbene olefin metathesis catalysts have the structure of Formula (I), wherein:
M is Ruthenium;
n is 0;
m is 0;
k is 1;
$L^1$ is an N-heterocyclic carbene selected from the group consisting of 1,3-bis(2,4,6-trimethylphenyl)-2-imidazolidinylidene and 1,3-bis(2,4,6-trimethylphenyl)imidazol-2-ylidene;
$L^2$ is a trisubstituted phosphine independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
$X^1$ and $X^2$ are chloride; and
$R^1$ and $R^2$ are taken together to form phenylindenylidene.

Examples of preferred metal carbene olefin metathesis catalysts have the structure of Formula (I), wherein:

M is Ruthenium;
n is 0;
m is 0;
k is 1;
L$^1$ is an N-heterocyclic carbene 1,3-bis(2,4,6-trimethylphenyl)-2-imidazolidinylidene;
L$^2$ is a trisubstituted phosphine independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
X$^1$ and X$^2$ are chloride; and
R$^1$ and R$^2$ are taken together to form phenylindenylidene.

Examples of preferred metal carbene olefin metathesis catalysts have the structure of Formula (I), wherein:
M is ruthenium;
n is 0;
m is 0;
k is 1;
L$^1$ is an N-heterocyclic carbene 1,3-bis(2,4,6-trimethylphenyl)imidazol-2-ylidene;
L$^2$ is a trisubstituted phosphine independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
X$^1$ and X$^2$ are chloride; and
R$^1$ and R$^2$ are taken together to form phenylindenylidene.

Examples of preferred metal carbene olefin metathesis catalysts have the structure of Formula (I), wherein:
M is ruthenium;
n is 0;
m is 1;
k is 1;
L$^1$ and L$^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or L$^1$ is an N-heterocyclic carbene selected from the group consisting of 1,3-bis(2,4,6-trimethylphenyl)-2-imidazolidinylidene, and 1,3-bis(2,4,6-trimethylphenyl)imidazol-2-ylidene, and L$^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
X$^1$ and X$^2$ are chloride;
R$^1$ is hydrogen; and
R$^2$ is phenyl or tert-butyl.

Examples of preferred metal carbene olefin metathesis catalysts have the structure of Formula (I), wherein:
M is ruthenium;
n is 0;
m is 1;
k is 1;
L$^1$ is an N-heterocyclic carbene selected from the group consisting of 1,3-bis(2,4,6-trimethylphenyl)-2-imidazolidinylidene and 1,3-bis(2,4,6-trimethylphenyl)imidazol-2-ylidene;
L$^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
X$^1$ and X$^2$ are chloride;
R$^1$ is hydrogen; and
R$^2$ is phenyl or tert-butyl.

Examples of preferred metal carbene olefin metathesis catalysts have the structure of Formula (I), wherein:
M is ruthenium;
n is 0;
m is 1;
k is 1;
L$^1$ is an N-heterocyclic carbene 1,3-bis(2,4,6-trimethylphenyl)-2-imidazolidinylidene;
L$^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
X$^1$ and X$^2$ are chloride;
R$^1$ is hydrogen; and
R$^2$ is phenyl or tert-butyl.

Examples of preferred metal carbene olefin metathesis catalysts have the structure of Formula (I), wherein:
M is ruthenium;
n is 0;
m is 1;
k is 1;
L$^1$ is an N-heterocyclic carbene 1,3-bis(2,4,6-trimethylphenyl)imidazol-2-ylidene;
L$^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
X$^1$ and X$^2$ are chloride;
R$^1$ is hydrogen; and
R$^2$ is phenyl or tert-butyl.

The catalyst compositions comprising at least one metal carbene olefin metathesis catalyst may be utilized in olefin metathesis reactions according to techniques known in the art. The catalyst compositions comprising at least one metal carbene olefin metathesis catalyst are typically added to the resin composition as a solid, a solution, or as a suspension. When the catalyst composition comprising at least one metal carbene olefin metathesis catalyst is added to the resin composition as a suspension, the at least one metal carbene olefin metathesis catalyst is suspended in a dispersing carrier such as mineral oil, paraffin oil, soybean oil, tri-isopropylbenzene, or any hydrophobic liquid which has a sufficiently high viscosity so as to permit effective dispersion of the catalyst(s), and which is sufficiently inert and which has a sufficiently high boiling point so that is does not act as a low-boiling impurity in the olefin metathesis reaction. It will be appreciated that the amount of catalyst that is used (i.e., the "catalyst loading") in the reaction is dependent upon a variety of factors such as the identity of the reactants and the reaction conditions that are employed. It is therefore understood that catalyst loading may be optimally and independently chosen for each reaction. In general, however, the catalyst will be present in an amount that ranges from a low of about 0.1 ppm, 1 ppm, or 5 ppm, to a high of about 10 ppm, 15 ppm, 25 ppm, 50 ppm, 100 ppm, 200 ppm, 500 ppm, or 1000 ppm relative to the amount of an olefinic substrate.

The catalyst will generally be present in an amount that ranges from a low of about 0.00001 mol %, 0.0001 mol %, or 0.0005 mol %, to a high of about 0.001 mol %, 0.0015 mol %, 0.0025 mol %, 0.005 mol %, 0.01 mol %, 0.02 mol %, 0.05 mol %, or 0.1 mol % relative to the olefinic substrate.

When expressed as the molar ratio of monomer to catalyst, the catalyst (the "monomer to catalyst ratio"), loading will generally be present in an amount that ranges from a low of about 10,000,000:1, 1,000,000:1, 500,000:1 or 200,00:1, to a high of about 100,000:1 60,000:1, 50,000:1, 45,000;1, 40,000:1, 30,000:1, 20,000:1, 10,000:1, 5,000:1, or 1,000:1.

Resin Compositions and Articles

Commercially important ROMP resin formulations are generally based on readily available and inexpensive cyclic olefins or polycyclic olefins such as dicyclopentadiene (DCPD), tricyclopentadiene (TCPD) and various other cycloalkenes. Cyclic olefins according to the invention are generally polymers of cyclopentadiene, such as dicyclopentadiene and tricyclopentadiene. Typically the cyclic olefin composition used in preparing the resin compositions and/or ROMP compositions of the invention, is dicyclopentadiene containing about 0% or about 6% or about 24% or about 40% or about 70% of tricyclopentadiene. It has been seen that with a cyclic olefin composition containing about 40% tricyclopentadiene, the thermo-properties of the final product are improved and there are less defects which occur during the curing process, such as out-gassing.

Resin compositions according to the invention generally comprise a cyclic olefin composition and dicumyl peroxide, wherein the cyclic olefin composition comprises at least one cyclic olefin. In another embodiment, resin compositions of the invention comprise dicumyl peroxide and a cyclic olefin composition comprising at least one cyclic olefin, where the resin composition is combined with a catalyst composition comprising at least one metal carbene olefin metathesis catalyst to form a ROMP composition.

When formulated or combined with a resin composition, the concentration of the dicumyl peroxide typically ranges from 0.50-10.00 phr, 0.50-9.00 phr, 0.50-8.00 phr, 0.50-7.00 phr, 0.50-6.00 phr, 0.50-5.00 phr, 0.50-4.00 phr, 0.50-3.00 phr, 0.50-2.00 phr, 1.00-5.00 phr, 1.00-4.00 phr, 1.00-3.00 phr, 2.00-5.00 phr, 2.00-4.00 phr, 1.00 phr, 1.50 phr, 2.00 phr, 2.50 phr, 3.00 phr, 3.50 phr, 4.00 phr, 4.50 phr, or 5.00 phr.

In another embodiment, resin compositions according to the invention may additionally comprise at least one exogenous inhibitor. Exogenous inhibitors or "gel modification additives," for use in the present invention are disclosed in U.S. Pat. No. 5,939,504, the contents of which are also incorporated herein by reference. Non-limiting examples of exogenous inhibitors or "gel modification additives" include water, tetrahydrofuran (THF), 2-methyltetrahydrofuran (2-Me-THF), diethyl ether $((C_2H_5)_2O)$, methyl-tert-butyl ether $(CH_3OC(CH_3)_3)$, dimethoxyethane $(CH_3OCH_2CH_2OCH_3)$, diglyme $(CH_3OCH_2OCH_2OCH_3)$, trimethylphosphine $(PMe_3)$, triethylphosphine $(PEt_3)$, tributylphosphine $(PBu_3)$, tri(ortho-tolyl)phosphine $(P-o-tolyl_3)$, tri-tert-butylphosphine $(P-tert-Bu_3)$, tricyclopentylphosphine $(PCp_3)$, tricyclohexylphosphine $(PCy_3)$, triisopropylphosphine $(P-i-Pr_3)$, trioctylphosphine $(POct_3)$, triisobutylphosphine $(P-i-Bu_3)$, triphenylphosphine $(PPh_3)$, tri(pentafluorophenyl)phosphine $(P(C_6F_5)_3)$, methyldiphenylphosphine $(PMePh_2)$, dimethylphenylphosphine $(PMe_2Ph)$, diethylphenylphosphine $(PEt_2Ph)$, trimethylphosphite $(P(OMe)_3)$, triethylphosphite, $(P(OEt)_3)$, triisopropylphosphite $(P(O-i-Pr)_3)$, ethyl diphenylphosphinite $(P(OEt)Ph_2)$, tributylphosphite $(P(OBu)_3)$, triphenylphosphite $(P(OPh)_3)$, diethylphenylphosphonite $(P(OEt)_2Ph)$, and tribenzylphosphine $(P(CH_2Ph)_3)$, 2-cyclohexenone, and triphenylphosphine oxide. Preferred exogenous inhibitors include triphenylphosphine, tricyclohexylphosphine, and tributylphosphine. The most preferred exogenous inhibitor is triphenylphosphine. When formulated or combined with a resin composition, the concentration of the exogenous inhibitor typically ranges from 0.001-10 phr, particularly 0.01-5 phr, more particularly 0.05-3 phr. Exogenous inhibitors may be added to the resin composition in the absence of solvent, or as organic solutions. A single exogenous inhibitor may be used, or a combination of two or more different exogenous inhibitors may be used.

In another embodiment, resin compositions according to the invention may additionally comprise a hydroperoxide gel modifier. Hydroperoxide gel modifiers for use in the present invention are disclosed in International Pat. App. No. PCT/US2012/042850, the contents of which are also incorporated herein by reference. Non-limiting examples of hydroperoxide gel modifiers include tert-butyl hydroperoxide, tert-amyl hydroperoxide, cumene hydroperoxide, diisopropyl benzene hydroperoxide, (2,5-dihydroperoxy)-2,5-dimethylhexane, cyclohexyl hydroperoxide, triphenylmethyl hydroperoxide, pinane hydroperoxide (e.g., Glidox® 500; LyondellBasell), and paramenthane hydroperoxide (e.g., Glidox® 300; LyondellBasell). More preferably, the hydroperoxides suitable for use include tert-butyl hydroperoxide and cumene hydroperoxide. Hydroperoxide gel-modification additives may be added to the reaction mixture in the absence of solvent, or as organic or aqueous solutions. A single hydroperoxide compound may be used as the gel-modification additive, or a combination of two or more different hydroperoxide compounds may be used. All concentrations of hydroperoxide which delay the onset of the gel-state of a particular metathesis polymerization. Advantageously, the use of hydroperoxides gel modifiers has been found to substantially maintain the properties of the cured polymer including peak exotherm temperature and mechanical properties. While not necessarily limited, the hydroperoxide concentration is advantageously between 0.01 and 1000 equivalents with respect to catalyst. In other embodiments the hydroperoxide concentration may be between 0.1 and 20 equivalents with respect to catalyst. Generally, higher concentrations of hydroperoxide will lead to longer pot life. Additionally, in other embodiments the hydroperoxide concentration may be between 0.05 and 100 equivalents with respect to catalyst. Additionally, in other embodiments the hydroperoxide concentration may be between 0.1 and 50 equivalents with respect to catalyst.

In another embodiment, resin compositions of the invention may additionally comprise at least one 5-alkenyl-2-norbornene as a pot life adjusting agent. 5-alkenyl-2-norbornenes for use in the present invention are disclosed in U.S. Pat. No. 5,204,427 and non-limiting examples include 5-vinylbicyclo[2.2.1]hepto-2-ene (5-vinyl-2-norbornene); 5-isopropenylbicyclo[2.2.1]hepto-2-ene (5-isopropenyl-2-norbornene); 5-vinyl-4-vinylbicyclo[2.2.1]hepto-2-ene (5-vinyl-4-vinyl-2-norbornene); 5-propenyl-bicyclo[2.2.1]hepto-2-ene (5-propenyl-2-norbornene); 5-butenyl-bicyclo[2.2.1]hepto-2-ene (5-butenyl-2-norbornene; 5-pentenyl-bicyclo[2.2.1]hepto-2-ene (5-pentenyl-2-norbornene); and their monomethyl, monochloro, and dichloro substituents, including the endo and exo isomers, and mixtures thereof. More preferred 5-alkenyl-2-norbornene(s) include 5-vinyl-2-norbornene, 5-isopropenyl-2-nobornornene, 5-propenyl-2-norbornene, and 5-butenyl-2-norbornene, including the endo and exo isomers, and mixtures thereof. The most preferred 5-alkenyl-2-norborne pot life adjusting agent is 5-vinyl-2-norborene, including the endo and exo isomers, and mixtures thereof. 5-alkenyl-2-norbornene pot life adjusting agents are normally employed in the resin composition at levels of about 0.01 phr to 10 phr, more preferably at levels of about 0.1 phr to 5 phr, even more preferably at levels of about 0.1 phr to 3 phr. 5-alkenyl-2-norborne pot life adjusting agents may be added to the resin composition in the absence of solvent, or as organic solutions. A single 5-alkenyl-2-norborne pot life adjusting agent may be used as a pot life adjusting agent, or a combination of two or more different 5-alkenyl-2-norbornene pot life adjusting agents may be used.

Resin compositions of the invention may be optionally formulated with additives. Suitable additives include, but are not limited to, gel modifiers, hardness modulators, impact modifiers, elastomers, antioxidants, antiozonants, stabilizers, crosslinkers, fillers, binders, coupling agents, thixotropes, wetting agents, biocides, plasticizers, pigments, flame retardants, dyes, fibers and reinforcement materials, including sized reinforcements and substrates, such as those treated with finishes, coatings, coupling agents, film formers and/or lubricants. Furthermore, the amount of additives present in the resin compositions may vary depending on the particular type of additive used. The concentration of the additives in the resin compositions typically ranges from, for example, 0.001-85 percent by weight, particularly, from 0.1-75 percent by weight, or even more particularly, from 2-60 percent by weight.

In another embodiment, resin compositions of the invention may additionally comprise at least one crosslinking monomer. Examples of crosslinking monomers include: fused multicyclic ring systems and linked multicyclic ring systems, as described in International Patent Application WO0276613A1 and in U.S. Pat. No. 6,281,307B1.

In another embodiment, resin compositions of the invention may additionally comprise at least one impact modifier. Suitable impact modifiers or elastomers include without limitation natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, styrene-ethylene/butylene-styrene copolymer, styrene-ethylene/propylene-styrene copolymer, ethylene-propylene-diene terpolymers, ethylene-vinyl acetate, and nitrile rubbers. Preferred impact modifiers or elastomers are polybutadiene Diene 55AC10 (Firestone), polybutadiene Diene 55AM5 (Firestone), EPDM Royalene 301T, EPDM Buna T9650 (Bayer), styrene-ethylene/butylene-styrene copolymer Kraton G1651H, Polysar Butyl 301 (Bayer), polybutadiene Taktene 710 (Bayer), styrene-ethylene/butylene-styrene Kraton G1726M, Ethylene-Octene Engage 8150 (DuPont-Dow), styrene-butadiene Kraton D1184, EPDM Nordel 1070 (DuPont-Dow), and polyisobutylene Vistanex MML-140 (Exxon). Such materials are normally employed in the resin composition at levels of about 0.10 phr to 10 phr, but more preferably at levels of about 0.1 phr to 5 phr. Various polar impact modifiers or elastomers can also be used.

It is known in the art impact properties (e.g., impact toughness or impact strength) of ROMP polymers can be improved by the use of impact modifiers. Typical impact modifiers known in the art for use with ROMP polymers include natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, styrene-ethylene/butylene-styrene copolymer, hydrogenated styrene-ethylene/butylene copolymer, styrene-ethylene/propylene-styrene copolymer, ethylene-propylene-diene terpolymers, ethylene-vinyl acetate, and nitrile rubbers. Specific impact modifiers known in the art include polybutadiene Diene 55AC10 (Firestone), polybutadiene Diene® 55AM5 (Firestone), EPDM Royalene® 301T, EPDM Buna T9650 (Bayer), hydrogenated styrene-ethylene/butylene-styrene copolymer Kraton® G1651H (Kraton Polymers U.S. LLC), Polysar® Butyl 301 (Bayer), hydrogenated styrene-ethylene/butylene-styrene copolymer Kraton G1726M, Engage™ 8150 ethylene-octene copolymer (DuPont-Dow), styrene-butadiene Kraton D1184, EPDM Nordel®1070 (DuPont-Dow), polyisobutylene Vistanex® MML-140 (Exxon), hydrogenated styrene-ethylene/butylene-styrene copolymer Kraton G1650M, hydrogenated styrene-ethylene/butylene-styrene copolymer Kraton G1657M, and styrene-butadiene block copolymer Kraton D1101.

Impact modifiers according to the invention are generally manufactured by Addivant™ sold under the trade names of Royaltuf® or high performance elastomers manufactured by Kraton Polymers sold under the trade names of Kraton®. Typically the composition to be polymerized comprises Kraton® G1650, Kraton® G1652, Kraton® FG1901, Kraton® FG1924, Royaltuf® 498, Royaltuf® 485. The invention provides concentrations of impact modifiers. The invention provides quantities of impact modifier from about 0.0 phr to about 6.00 phr. Impact modifiers can be added to the composition of the invention from about 1.00 phr to about 5.00 phr. In another embodiment of the invention impact modifiers can be added to the composition of the invention from about 2.00 phr to about 4.00 phr. In another embodiment of the invention impact modifiers can be added to the composition of the invention from about 2.50 phr to about 3.00 phr. In another embodiment of the invention impact modifiers can be added to the composition of the invention from about 1.00 phr to about 1.50 phr. In another embodiment of the invention impact modifiers can be added to the composition of the invention in concentrations of about 1.10 phr, about 1.2 phr, about 1.3 phr, about 1.4 phr, 1.5 phr.

In another embodiment, resin compositions of the invention may additionally comprise at least one antioxidant. In another embodiment, resin compositions of the invention may additionally comprise at least one antiozonant. Antioxidants and antiozonants include any antioxidant or antiozonant used in the rubber or plastics industry. An "Index of Commercial Antioxidants and Antiozonants, Fourth Edition" is available from Goodyear Chemicals, The Goodyear Tire and Rubber Company, Akron, Ohio 44316. Suitable stabilizers (i.e., antioxidants or antiozonants) include without limitation: 2,6-di-tert-butyl-4-methylphenol (BHT); styrenated phenol, such as Wingstay® S (Goodyear); 2- and 3-tert-butyl-4-methoxyphenol; alkylated hindered phenols, such as Wingstay C (Goodyear); 4-hydroxymethyl-2,6-di-tert-butylphenol; 2,6-di-tert-butyl-4-sec-butylphenol; 2,2'-methylenebis(4-methyl-6-tert-butylphenol); 2,2'-methylenebis(4-ethyl-6-tert-butylphenol); 4,4'-methylenebis(2,6-di-tert-butylphenol); miscellaneous bisphenols, such as Cyanox® 53 (Cytec Industries Inc.) and Permanax WSO; 2,2'-ethylidenebis(4,6-di-tert-butylphenol); 2,2'-methylenebis(4-methyl-6-(1-methylcyclohexyl)phenol); 4,4'-butylidenebis(6-tert-butyl-3-methylphenol); polybutylated Bisphenol A; 4,4'-thiobis(6-tert-butyl-3-methylphenol); 4,4'-methylenebis(2,6-dimethylphenol); 1,1'-thiobis(2-naphthol); methylene bridged polyaklylphenol, such as Ethyl antioxidant 738; 2,2'-thiobis(4-methyl-6-tert-butylphenol); 2,2'-isobutylidenebis(4,6-dimethylphenol); 2,2'-methylenebis(4-methyl-6-cyclohexylphenol); butylated reaction product of p-cresol and dicyclopentadiene, such as Wingstay L; tetrakis(methylene-3,5-di-tert-butyl-4-hydroxyhydrocinnamate)methane, i.e., Irganox® 1010 (BASF); 1,3,5-trimethyl-2,4,6-tris(3,5-di-tert-butyl-4-hydroxybenzyl)benzene, e.g., Ethanox®330 (Albemarle Corporation); 4,4'-methylenebis (2,6-di-tertiary-butylphenol), e.g., Ethanox 4702 or Ethanox 4710; 1,3,5-tris(3,5-di-tert-butyl-4-hydroxybenzyl)isocyanurate, i.e., Good-Rite® 3114 (Emerald Performance Materials), 2,5-di-tert-amylhydroquinone, tert-butylhydroquinone, tris(nonylphenylphosphite), bis(2,4-di-tert-butyl)pentaerythritol)diphosphite, distearyl pentaerythritol diphosphite, phosphited phenols and bisphenols, such as Naugard® 492 (Chemtura Corporation), phosphite/phenolic antioxidant blends, such as Irganox B215; di-n-octadecyl(3,5-di-tert-butyl-4-hydroxybenzyl) phosphonate, such as Irganox 1093; 1,6-hexamethylene bis (3-(3,5-di-tert-butyl-4-hydroxyphenylpropionate), such as Irganox 259, and octadecyl-3,5-di-tert-butyl-4-hydroxyhydrocinnamate, i.e., Irganox 1076, tetrakis(2,4-di-tert-butylphenyl)4,4'-biphenylylenediphosphonite, diphenylamine, and 4,4'-diemthoxydiphenylamine. Antioxidants and/or antiozonants are normally employed in the resin composition at levels of about 0.10 phr to 10 phr, but more preferably at levels of about 0.1 phr to 5 phr.

In another embodiment, resin compositions of the invention may further comprise at least one filler. Suitable fillers include, for example, metallic density modulators, microparticulate density modulators, organic fillers, inorganic fillers, such as, for example, microspheres, and macroparticulate density modulators, such as, for example, glass or ceramic beads. Metallic density modulators include, but are not limited to, powdered, sintered, shaved, flaked, filed, particulated, or granulated metals, metal oxides, metal nitrides, and/or metal carbides, and the like. Preferred metallic density modulators include, among others, tungsten, tungsten carbide, aluminum, titanium, iron, lead, silicon oxide, aluminum oxide, boron carbide, and silicon carbide. Microparticulate density modulators include, but are not limited to, glass, metal, thermoplastic (either expandable or pre-expanded) or thermoset, and/or ceramic/silicate microspheres. Macroparticulate density modulators include, but are not limited to, glass, plastic, or ceramic beads; metal rods, chunks, pieces, or shot; hollow glass, ceramic, plastic, or metallic spheres, balls, or tubes; and the like. Organic fillers include, but are not limited to, powdered, particles, flakes, flour, shells, of polytetrafluoroethylene, polyethylene, polyethylene ultra high molecular weight (PE-UHMWPE), polypropylene, polystyrene, acrylic, polyamides, aromatic polyamides, aramid fibers, carbon nanotubes, carbon fibers, graphite, carbon black, polysulfone, polyethersulfone, polyphenylsulfone, fluorinates etheylene proppylene (FEP), polyether ethyl ketone (PEEK), polyvinylidene fluoride, polyamide imide, polyester, cellulose fibers, wood flour, wood fibers. Inorganic fillers include, but are not limited to, powdered, particles, flakes, flour, shells, fibers of aluminum trihydrate, barium sulfate, calcium sulfate, calcium carbonate, phosphates, talc, clay, mica, montmorillonite, molybdenum disulfide ($MoS_2$), tungsten disulfide ($WS_2$), boron nitrate, glass, silicates, aluminosilicates, magnesium oxide, zinc oxide, wollastonite, barite.

The invention is also directed to articles manufactured from a resin composition comprising at least one cyclic olefin composition and dicumyl peroxide, and a catalyst composition comprising at least one metal carbene olefin metathesis catalyst.

Articles may include, but are not limited to, those formed by standard manufacturing techniques including casting, centrifugal casting, pultrusion, molding, rotational molding, open molding, reaction injection molding (RIM), resin transfer molding (RTM), pouring, vacuum impregnation, surface coating, filament winding and other methods known to be useful for production of polymer articles and/or polymer composite articles. Furthermore, the compositions and articles of manufacture of the invention are not limited to a single polymer-surface interface but include also multilayers and laminates containing multiple polymer-surface interfaces. The invention is also suitable for manufacture of articles by the infusion of the resin into a porous material. Such porous materials include but are not limited to wood, cement, concrete, open-cell and reticulated foams and sponges, papers, cardboards, felts, ropes or braids of natural or synthetic fibers, and various sintered materials. Additionally, other manufacturing techniques include without limitation cell casting, dip casting, continuous casting, embedding, potting, encapsulation, film casting or solvent casting, gated casting, mold casting, slush casting, extrusion, mechanical foaming, chemical foaming, physical foaming, compression molding or matched die molding, spaying, spray up, Vacuum Assisted Resin Transfer Molding (VARTM), Seeman's Composite Resin Infusion Molding Process (SCRIMP), blow molding, in mold coating, in-mold painting or injection, vacuum forming, Reinforced Reaction Injection Molding (RRIM), Structural Reaction Injection Molding (SRIM), thermal expansion transfer molding (TERM), resin injection recirculation molding (RICM), controlled atmospheric pressure resin infusion (CAPRI), hand-layup. For manufacturing techniques requiring the use of a RIM or impingement style mixhead, including without limitation RIM, SRIM, and RRIM, articles of manufacture may be molded using a single mixhead or a plurality of mixheads as well as a plurality of material injection streams (e.g., two resin streams and one catalyst stream). As the invention allows for increasingly faster cycle times and increasingly higher mold temperatures using any of the aforementioned manufacturing techniques, particularly mold temperatures above 90° C., it may become necessary to mold ROMP compositions of the invention under high pressures or under vacuum to prevent defects caused by mixing issues and/or entrapped gases.

Furthermore, the present invention also allows for the making of articles of manufacture of any configuration, weight, size, thickness, or geometric shape. Examples of articles of manufacture include without limitation any molded or shaped article for use as an aerospace component, a marine component, an automotive component, a sporting goods component, an electrical component, and industrial component, medical component, dental component, or military component. In one embodiment an article may be a turbine component used on aircraft or general power generation. In one embodiment, turbine components may include without limitation one or more of an inlet, pylon, pylon fairing, an acoustic panel, a thrust reverser panel, a fan blade, a fan containment case, a bypass duct, an aerodynamic cowl, or an airfoil component. In one embodiment, an article may be a turbine blade component or may be a turbine blade. In one embodiment, an article may be a wind rotor blade, tower, spar cap, or nacelle for wind turbines. In one embodiment, an article may be an airframe component. Examples of aerospace components may include without limitation one or more of fuselage skin, wing, fairing, doors, access panel, aerodynamic control surface, or stiffener. In one embodiment an article may be an automotive component. Examples of automotive components may include without limitation one or more of body panel, fender, spoiler, truck bed, protective plate, hood, longitudinal rail, pillar, or door. Examples of industrial components may include without limitation one or more of risers platforms, impact protection structures for oil and gas; bridges, pipes, pressure vessels, power poles, coils, containers, tanks, liners, containment vessels, articles for application in corrosive environments (e.g., chlor-alkali, caustic, acidic, brine, etc.), centralizers (e.g., oilfield centralizer), electrolytic cell covers, reinforcement structures for concrete architectures and roads, or radiators. Examples of electrical components may include without limitation one or more wound articles, such as coils or electric motors, or insulating devices. In one embodiment, an article may be an eddy-current shielding component of a magnetic resonance imaging system or shielding component for any electromagnetic radiation. In one embodiment, an article may be a military component including without limitation ballistics resistant armor for personnel or vehicles, or ballistics resistant structures for protecting personnel or equipment. In one embodiment, an article may be a sporting goods component including without limitation an arrow shaft, a tennis racket frame, a hockey stick, compound bow limbs, or a golf club shaft. In one embodiment, an article may be an object used in offshore applications, where the object is at least partially coated with a ROMP composition of the invention, where the object includes but is not limited to pipes, pipelines, pipe fittings, hoses, hose fittings, tanks, containers, drums, manifolds, risers, field joints, configurations designated as Christmas trees (oil field Christmas tree, subsea Christmas tree), jumpers, spool pieces, configurations designated as pipeline end termination (PLET), configurations designated as pipeline end manifolds (PLEM), robotic parts, devices and vehicles used in sub-sea applications, configurations designated as subsea dog houses, and other sub-sea architectures and equipment.

In a preferred embodiment, the metathesis reactions disclosed herein are carried out under a dry, inert atmosphere. Such an atmosphere may be created using any inert gas, including such gases as nitrogen and argon. The use of an inert atmosphere is optimal in terms of promoting catalyst activity, and reactions performed under an inert atmosphere typically are performed with relatively low catalyst loading. The reactions disclosed herein may also be carried out in an oxygen-containing and/or a water-containing atmosphere, and in one embodiment, the reactions are carried out under ambient conditions. The presence of oxygen or water in the reaction may, however, necessitate the use of higher catalyst loadings as compared with reactions performed under an inert atmosphere. Where the vapor pressure of the reactants allows, the reactions disclosed herein may also be carried out under reduced pressure.

The reactions disclosed herein may be carried out in a solvent, and any solvent that is inert towards cross-metathesis may be employed. Generally, solvents that may be used in the metathesis reactions include organic, protic, or aqueous solvents, such as aromatic hydrocarbons, chlorinated hydrocarbons, ethers, aliphatic hydrocarbons, alcohols, water, or mixtures thereof. Example solvents include benzene, toluene, p-xylene, methylene chloride, 1,2-dichloroethane, dichlorobenzene, chlorobenzene, tetrahydrofuran, diethyl ether, pentane, methanol, ethanol, water, or mixtures thereof. In a preferred embodiment, the reactions disclosed herein are carried out neat, i.e., without the use of a solvent.

It will be appreciated that the temperature at which a metathesis reaction according to methods disclosed herein is conducted can be adjusted as needed over a wide range of temperatures. With highly active metathesis catalysts, olefin metathesis may occur at temperatures as low as $-78°$ C. With increasingly latent catalysts, olefin metathesis may not be observed until temperatures of $-40°$ C., $-10°$ C., $0°$ C., $10°$ C., $20°$ C., $25°$ C., $35°$ C., $50°$ C., $70°$ C., $100°$ C., or $150°$ C. In a preferred embodiment, the reactions are carried out at a temperature of at least about $35°$ C., and in another preferred embodiment, the reactions are carried out at a temperature of at least about $50°$ C. In certain embodiments, a mold or preform may be filled with resin and catalyst at a temperature near room temperature (e.g., about $10$-$45°$ C., or preferably $15$-$40°$ C., or more preferably $20$-$35°$ C.) and then heated over a period time to a higher temperature (e.g., about $50$-$200°$ C., or preferably $70$-$150°$ C., or more preferably $90$-$120°$ C.) to allow polymerization to complete more quickly. In certain embodiments, a mold or preform may be preheated to a temperature considerably above room temperature (e.g., about $50$-$250°$ C., or about $50$-$200°$ C., or about $50$-$150°$ C., or about $40$-$80°$ C., or about $40$-$60°$ C., or about $60$-$80°$ C., or about $50$-$100°$ C., or about $100$-$150°$ C., or about $150$-$200°$ C.) and then filled quickly with resin and catalyst to allow for fast cycle times.

It is to be understood that both the foregoing general description and the following detailed description are exemplary and explanatory only and are not restrictive of the invention claimed. As used herein, the use of the singular includes the plural unless specifically stated otherwise.

EXPERIMENTAL

In the following examples, efforts have been made to ensure accuracy with respect to numbers used (e.g., amounts, temperature, etc.) but some experimental error and deviation should be accounted for. Unless indicated otherwise, temperature is in degrees Celsius (° C.), and pressure is at or near atmospheric. Additives added to the cyclic olefin compositions to form resin compositions are reported as ppm, which is defined as the weight in grams of additive per million grams of cyclic olefin composition, or as phr, which is defined as the weight in grams of the additive per hundred grams of cyclic olefin composition. Ambient temperature and room temperature are used interchangeably herein and mean a temperature of 20-25° C.

As is known in the art, weight percent (wt %) can be represented by gas chromatography (GC) percent area (area %). Hence, GC area % obtained from the GC was reported as wt %. Weight percent (wt %) and percent by weight are used interchangeably herein.

The following examples are for illustrative purposes only and are not intended, nor should they be construed as limiting the invention in any manner. Those skilled in the art will appreciate that variations and modifications of the following examples can be made without exceeding the spirit or scope of the invention.

All glassware was oven dried and reactions were performed under ambient conditions unless otherwise noted. All solvents and reagents were purchased from commercial suppliers and used as received unless otherwise noted.

The following abbreviations are used in the examples:
DC dicumyl peroxide
DTB di-tert-butyl peroxide DCPD dicyclopentadiene
TCPD tricyclopentadiene
GC gas chromatography
° C. degrees Celsius
wt % weight percent

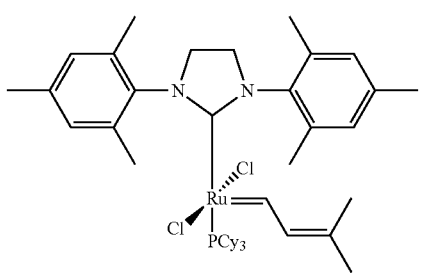

C827

[1,3-bis-(2,4,6-trimethylphenyl)-2-imidazolidinylidene]dichloro(3-methyl-2-butenylidene) (tricyclohexylphosphine) Ruthenium(II) CAS [253688-91-4]

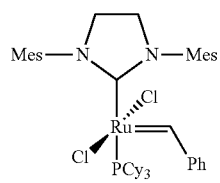

C848 [1,3-bis-(2,4,6-trimethylphenyl)-2-imidazolidinylidene]dichloro(phenylmethylene) (tricyclohexyiphosphine) ruthenium(II)

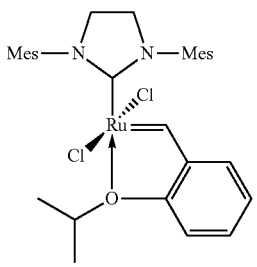

C627 (1,3-Bis-(2,4,6-trimethylphenyl)-2-imidazolidinylidene)dichloro(o-isopropoxyphenylmethylene) ruthenium(II)

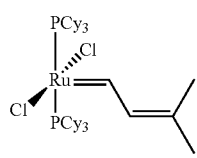

C801 Ruthenium(II) dichloro (3-methyl-2-butenylidene) bis(tricyclohexylphosphine)

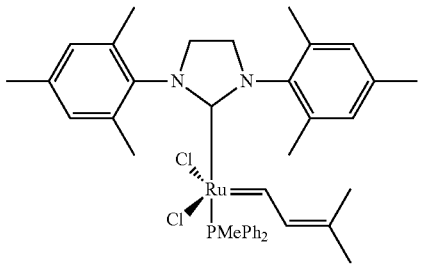

C747 [1,3-bis-(2,4,6-trimethyl phenyl)-2-imidazolidinylidene]dichloro(3-methyl-2-butenylidene) (methyldiphenylphosphine)Ruthenium(II)

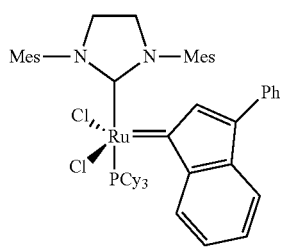

C949 [1,3-bis-(2,4,6-trimethylphenyl)-2-imidazolidinylidene] dichloro (phenylindenylidene) (tricyclohexylphosphine) Ruthenium(II)

Dicyclopentadiene (DCPD) (Ultrene® 99) was obtained from Cymetech Corporation. A representative lot of Ultrene® 99 comprised DCPD (99.83 wt %) and TCPD (0.17 wt %) as measured by GC. Purified tricyclopentadiene (TCPD-95) was prepared as generally described in European Pat. No. EP0271007B2 and purified to greater than 95% by vacuum distillation.

The following cyclic olefin compositions were used in the examples:

Cyclic Olefin Composition (I): A modified DCPD base resin (DCPD-40T) containing 35-40 wt % TCPD (and small amounts of higher cyclopentadiene homologs) was prepared by heat treatment of Ultrene® 99 generally as described in U.S. Pat. No. 4,899,005.

Cyclic Olefin Composition (II): A modified DCPD base resin (DCPD-25T) containing 20-25% TCPD (and small amounts of higher cyclopentadiene homologs) was prepared by heat treatment of Ultrene® 99 generally as described in U.S. Pat. No. 4,899,005.

Cyclic Olefin Composition (III): A modified DCPD base resin (DCPD-6T) containing 5-7% TCPD (and small amounts of higher cyclopentadiene homologs) was prepared by heat treatment of Ultrene® 99 generally as described in U.S. Pat. No. 4,899,005.

Cyclic Olefin Composition (IV): Dicyclopentadiene (DCPD) (Ultrene® 99) was obtained from Cymetech Corporation. A representative lot of Ultrene® 99 comprised DCPD (99.83 weight percent) and TCPD (0.17 weight percent) as measured by GC.

The following additives were used within the examples: Ethanox® 4702 antioxidant (4,4'-methylenebis(2,6-ditertiary-butylphenol), Albemarle Corporation) was used as received. Crystal Plus 70FG mineral oil containing 2 phr Cab-o-Sil® TS610 fumed silica or Crystal Plus 500FG mineral oil containing 2 phr Cab-o-Sil® TS610, was used to prepare the catalyst suspensions. Dicumyl peroxide was used as received from Sigma Aldrich (≥98% purity) or Arkema through Harwick Standard Distribution Corporation (DI-CUP®, 99.0% minimum). tert-Butyl peroxide (Luperox® DI) was used as received from Sigma Aldrich (≥98% purity). Cab-o-Sil® TS610 was obtained from Cabot Corporation and used as received. Kraton® G1651H and Kraton® FG1924 were used as received from Kraton® Performance Polymers. ROYALTUF® 485 and ROYALTUF® 498 (maleic anhydride grafted with bicyclo[2.2.1]hept-2-ene, 5-ethylidene-, polymer with ethene and 1-propene) were used as received from Addivant™. Triphenyl phosphine (TPP) was used as received from Arkema. Cumene hydroperoxide (CHP) was used as received unless otherwise indicated from Sigma Aldrich (88% purity), Syrgis Performance Initiators (Norox® CHP, 85%), or Trigonox K-90®, Akzo Nobel, 88%). CHP was used as a 1,000 ppm or 10,000 ppm concentration stock solution in DCPD, or as received.

Toluene was used as received from Nexeo Solutions Chemical Distribution. Twaron 5011 powder was used as received from Teijin Aramid. ZONYL® FLUOROADDITIVE 1600 PTFE powder (polytetrafluororethylene resin) was used as received from Dupont.

Metal carbene olefin metathesis catalysts were prepared by standard methods and include: [1,3-bis-(2,4,6-trimethylphenyl)-2-imidazolidinylidene]dichloro(3-methyl-2-butenylidene) (tricyclohexylphosphine) ruthenium(II) (C827); [1,3-bis-(2,4,6-trimethyl phenyl)-2-imidazolidinylidene]dichloro(phenylmethylene) (tricyclohexylphosphine) ruthenium(II) (C848); (1,3-Bis-(2,4,6-trimethylphenyl)-2-imidazolidinylidene)dichloro(o-isopropoxyphenylmethylene) ruthenium(II) (C627); Ruthenium(II) dichloro (3-methyl-2-butenylidene) bis(tricyclohexylphosphine) (C801); [1,3-bis-(2,4,6-trimethylphenyl)-2-imidazolidinylidene]dichloro(3-methyl-2-butenylidene) (methyldiphenylphosphine) Ruthenium(II) (C747); [1,3-bis-(2,4,6-trimethylphenyl)-2-imidazolidinylidene] dichloro (phenylindenylidene) (tricyclohexylphosphine) Ruthenium(II) (C949).

The catalyst compositions used in the experimental section were prepared as follows:

Catalyst Composition (A): C827 was suspended in mineral oil (Crystal Plus 70 FG) containing 2 phr Cab-o-sil TS610. Catalyst composition (A) was prepared so as to have a monomer to catalyst ratio of 30,000:1 at 2 grams of catalyst suspension per 100 grams of DCPD monomer.

Catalyst Composition (B): C848 (monomer to catalyst ratio 500,000:1) and C827 (monomer to catalyst ratio 45,000:1) was suspended in mineral oil (Crystal Plus 500 FG or Crystal Plus 70 FG) containing 2 phr Cab-o-sil TS610. Catalyst composition (B) was prepared so as to have a monomer to catalyst ratio of 45,000:1 (C827) and 500,000:1 (C848) at 2 grams of suspension per 100 grams of DCPD monomer.

Catalyst Composition (C): C801 was suspended in mineral oil (Crystal Plus 70 FG) containing 2 phr Cab-o-sil TS610. Catalyst composition (C) was prepared so as to have a monomer to catalyst ratio of 5,000:1 at 2 grams of catalyst suspension per 100 grams of DCPD monomer.

Catalyst Composition (D): C627 was suspended in mineral oil (Crystal Plus 70 FG) containing 2 phr Cab-o-sil TS610. Catalyst composition (D) was prepared so as to have a monomer to catalyst ratio of 60,000:1 at 2 grams of catalyst suspension per 100 grams of DCPD monomer.

Catalyst Composition (E): C747 was suspended in mineral oil (Crystal Plus 70 FG) containing 2 phr Cab-o-sil TS610. Catalyst composition (E) was prepared so as to have a monomer to catalyst ratio of 45,000:1 at 2 grams of catalyst suspension per 100 grams of DCPD monomer.

Catalyst Composition (F): C949 was suspended in mineral oil (Crystal Plus 70 FG) containing 2 phr Cab-o-sil TS610. Catalyst composition (F) was prepared so as to have a monomer to catalyst ratio of 45,000:1 at 2 grams of catalyst suspension per 100 grams of DCPD monomer.

Catalyst Composition (G): C827 was suspended in mineral oil (Crystal Plus 70 FG) containing 2 phr Cab-o-sil TS610. Catalyst composition (G) was prepared so as to have a monomer to catalyst ratio of 45,000:1 at 2 grams of catalyst suspension per 100 grams of DCPD monomer.

Table 1a summarizes unfilled resin compositions (1-59) tested in the experimental section.

TABLE 1a

| Resin Composition | Cyclic Olefin Composition | Peroxide | Antioxidant | Inhibitor | Impact Modifier |
|---|---|---|---|---|---|
| 1 | I | n/a | 2 phr Ethanox® 4702 | n/a | n/a |
| 2 | I | 3 phr DC | 2 phr Ethanox® 4702 | n/a | n/a |
| 3 | I | 1.62 phr DTB | 2 phr Ethanox® 4702 | n/a | n/a |
| 4 | II | n/a | 2 phr Ethanox® 4702 | n/a | n/a |
| 5 | II | 3 phr DC | 2 phr Ethanox® 4702 | n/a | n/a |
| 6 | II | 1.62 phr DTB | 2 phr Ethanox® 4702 | n/a | n/a |
| 7 | III | n/a | 2 phr Ethanox® 4702 | n/a | n/a |
| 8 | III | 3 phr DC | 2 phr Ethanox® 4702 | n/a | n/a |
| 9 | III | 1.62 phr DTB | 2 phr Ethanox® 4702 | n/a | n/a |
| 10 | I | n/a | 2 phr Ethanox® 4702 | 0.1 phr TPP | n/a |

TABLE 1a-continued

| Resin Composition | Cyclic Olefin Composition | Peroxide | Antioxidant | Inhibitor | Impact Modifier |
|---|---|---|---|---|---|
| 11 | I | 3 phr DC | 2 phr Ethanox ® 4702 | 0.1 phr TPP | n/a |
| 12 | I | 1.62 phr DTB | 2 phr Ethanox ® 4702 | 0.1 phr TPP | n/a |
| 13 | II | n/a | 2 phr Ethanox ® 4702 | 0.1 phr TPP | n/a |
| 14 | II | 3 phr DC | 2 phr Ethanox ® 4702 | 0.1 phr TPP | n/a |
| 15 | II | 1.62 phr DTB | 2 phr Ethanox ® 4702 | 0.1 phr TPP | n/a |
| 16 | II | n/a | 2 phr Ethanox ® 4702 | 1.0 phr TPP | n/a |
| 17 | II | 3 phr DC | 2 phr Ethanox ® 4702 | 1.0 phr TPP | n/a |
| 18 | II | 1.62 phr DTB | 2 phr Ethanox ® 4702 | 1.0 phr TPP | n/a |
| 19 | II | n/a | 2 phr Ethanox ® 4702 | 0.4 phr TPP | n/a |
| 20 | II | 3 phr DC | 2 phr Ethanox ® 4702 | 0.4 phr TPP | n/a |
| 21 | II | 1.62 phr DTB | 2 phr Ethanox ® 4702 | 0.4 phr TPP | n/a |
| 22 | II | n/a | 2 phr Ethanox ® 4702 | 5.0 ppm CHP | n/a |
| 23 | II | 3 phr DC | 2 phr Ethanox ® 4702 | 5.0 ppm CHP | n/a |
| 24 | II | 1.62 phr DTB | 2 phr Ethanox ® 4702 | 5.0 ppm CHP | n/a |
| 25 | I | 1 phr DC | 2 phr Ethanox ® 4702 | n/a | n/a |
| 26 | I | 5 phr DC | 2 phr Ethanox ® 4702 | n/a | n/a |
| 27 | I | 10 phr DTB | 2 phr Ethanox ® 4702 | n/a | n/a |
| 28 | I | 0.54 phr DTB | 2 phr Ethanox ® 4702 | n/a | n/a |
| 29 | I | 2.7 phr DTB | 2 phr Ethanox ® 4702 | n/a | n/a |
| 30 | I | 5.4 phr DTB | 2 phr Ethanox ® 4702 | n/a | n/a |
| 31 | I | 3 phr DC | 2 phr Ethanox ® 4702 | 0.1 TPP | 0.1 phr Royaltuf ® 485 |
| 32 | I | 1.62 phr DTB | 2 phr Ethanox ® 4702 | 0.1 TPP | 0.1 phr Royaltuf ® 485 |
| 33 | I | n/a | 2 phr Ethanox ® 4702 | 0.1 TPP | 0.1 phr Royaltuf ® 485 |
| 34 | I | 5.0 phr DC | 2 phr Ethanox ® 4702 | n/a | 0.1 phr Royaltuf ® 485 |
| 35 | I | 2.7 phr DTB | 2 phr Ethanox ® 4702 | n/a | 0.1 phr Royaltuf ® 485 |
| 36 | II | n/a | n/a | n/a | 3.0 phr Royaltuf ® 498 |
| 37 | II | 3.0 phr DC | n/a | n/a | 3.0 phr Royaltuf ® 498 |
| 38 | II | 1.62 phr DTB | n/a | n/a | 3.0 phr Royaltuf ® 498 |
| 39 | II | n/a | 2 phr Ethanox ® 4702 | 0.1 TPP | 2.0 phr Kraton ® FG1924 G Polymer |
| 40 | II | 3.0 phr DC | 2 phr Ethanox ® 4702 | 0.1 TPP | 2.0 phr Kraton ® FG1924 G Polymer |
| 41 | II | 1.62 phr DTB | 2 phr Ethanox ® 4702 | 0.1 TPP | 2.0 phr Kraton ® FG1924 G Polymer |

TABLE 1a-continued

| Resin Composition | Cyclic Olefin Composition | Peroxide | Antioxidant | Inhibitor | Impact Modifier |
|---|---|---|---|---|---|
| 42 | II | n/a | 2 phr Ethanox® 4702 | n/a | 1.0 phr Kraton® G1651 H Polymer |
| 43 | II | 1.5 phr DC | 2 phr Ethanox® 4702 | n/a | 1.0 phr Kraton® G1651 H Polymer |
| 44 | II | 0.81 phr DTB | 2 phr Ethanox® 4702 | n/a | 1.0 phr Kraton® G1651 H Polymer |
| 45 | II | n/a | 2 phr Ethanox® 4702 | n/a | 0.5 phr Royaltuf® 485 |
| 46 | II | 2.0 phr DC | 2 phr Ethanox® 4702 | n/a | 0.5 phr Royaltuf® 485 |
| 47 | II | 1.08 phr DTB | 2 phr Ethanox® 4702 | n/a | 0.5 phr Royaltuf® 485 |
| 48 | II | n/a | 2 phr Ethanox® 4702 | 5.0 ppm CHP | 0.75 phr Royaltuf® 498 |
| 49 | II | 3.5 phr DC | 2 phr Ethanox® 4702 | 5.0 ppm CHP | 0.75 phr Royaltuf® 498 |
| 50 | II | 1.89 phr DTB | 2 phr Ethanox® 4702 | 5.0 ppm CHP | 0.75 phr Royaltuf® 498 |
| 51 | II | n/a | 2 phr Ethanox® 4702 | n/a | 1.25 phr Royaltuf® 485 |
| 52 | II | 4.0 phr DC | 2 phr Ethanox® 4702 | n/a | 1.25 phr Royaltuf® 485 |
| 53 | II | 2.16 phr DTB | 2 phr Ethanox® 4702 | n/a | 1.25 phr Royaltuf® 485 |
| 54 | II | n/a | 2 phr Ethanox® 4702 | 0.1 phr TPP | 1.5 phr Royaltuf® 498 |
| 55 | II | 6.0 phr DC | 2 phr Ethanox® 4702 | 0.1 phr TPP | 1.5 phr Royaltuf® 498 |
| 56 | II | 3.24 phr DTB | 2 phr Ethanox® 4702 | 0.1 phr TPP | 1.5 phr Royaltuf® 498 |
| 57 | IV | n/a | 2 phr Ethanox® 4702 | n/a | n/a |
| 58 | IV | 3.0 phr DC | 2 phr Ethanox® 4702 | n/a | n/a |
| 59 | IV | 1.62 phr DTB | 2 phr Ethanox® 4702 | n/a | n/a |

Table 1b summarizes filled resin compositions (60-65) tested in the experimental section.

TABLE 1b

| Resin Composition | Cyclic Olefin Composition | Peroxide | Antioxidant | Inhibitor | Impact Modifier | Fillers |
|---|---|---|---|---|---|---|
| 60 | II | n/a | 2 phr Ethanox® 4702 | n/a | 1.0 phr Royaltuf® 485 | 7.5 wt % Twaron® 5011 powder |
| 61 | II | 3.0 phr DC | 2 phr Ethanox® 4702 | n/a | 1.0 phr Royaltuf® 485 | 7.5 wt % Twaron® 5011 powder |
| 62 | II | 1.62 phr DTB | 2 phr Ethanox® 4702 | n/a | 1.0 phr Royaltuf® 485 | 7.5 wt % Twaron® 5011 powder |

TABLE 1b-continued

| Resin Composition | Cyclic Olefin Composition | Peroxide | Antioxidant | Inhibitor | Impact Modifier | Fillers |
|---|---|---|---|---|---|---|
| 63 | II | n/a | 2 phr Ethanox® 4702 | n/a | 1.0 phr Royaltuf® 498 | 10.0 wt % Zonyl® Fluoroadditive 1600 PTFE powder |
| 64 | II | 3.0 phr DC | 2 phr Ethanox® 4702 | n/a | 1.0 phr Royaltuf® 498 | 10.0 wt % Zonyl® Fluoroadditive 1600 PTFE powder |
| 65 | II | 1.62 phr DTB | 2 phr Ethanox® 4702 | n/a | 1.0 phr Royaltuf® 498 | 10.0 wt % Zonyl® Fluoroadditive 1600 PTFE powder |

Examples 1-104

Samples (350 g) of the resin compositions were catalyzed by the addition of 7 grams of catalyst compositions (A-G) to form a ROMP composition at ambient temperature. The ROMP composition at ambient temperature was poured into a mold composed of a ½ inch aluminum bracket and G10 epoxy plates (8 inches×8 inches×½ inches) at a specified mold temperature (40° C., 60° C. or 80° C.) as reported in Tables 2, 3, 4, and 5 below.

In the resin compositions described above and used in the examples herein, the amounts of dicumyl peroxide and di-tert-butyl peroxide were normalized on a mol percent (mol %) basis to correct for the difference in molecular weight between dicumyl peroxide and di-tert-butyl peroxide. In other words, 3.0 phr dicumyl peroxide are equivalent to 1.62 phr di-tert-butyl peroxide on a mol percent basis.

Glass transition temperatures (Tg) were obtained by differential scanning calorimetry (DSC) using a TA Instruments Q200 DSC, heated at 10° C./min, with a nominal sample size of 10-20 mg.

Gel Swell Experiment determined in Toluene. The gel swell (Δ wt %) was determined by a modified version of ASTM D-3616 as described below. From each example (1-89), 3 sample coupons were cut that measured approximately 1"×½"×½". The sample coupons were numbered, weighed and then placed in an 8 oz. glass bottle. 200 mL of toluene were added to the respective glass bottle containing each sample set and the bottles were sealed and stored for 24 h at room temperature, after which the solvent was removed. The samples were then, allowed to air dry inside a fume hood for 1 h and then weighed. The gel swell (Δ wt %) was calculated as follows: [((final weight−initial weight)/(initial weight))×100] and recorded in Tables 2, 3, and 4.

Table 2 reflects the Tg and Gel swell values for resin compositions 1, 2, 3, 4, 5, 6, 7, 8, 9, 10, 11, 12, 42, 43, and 44, wherein the mold temperature is 80° C.

TABLE 2

| Example | Resin Composition | Catalyst Composition | Tg (° C.) | Gel Swell (Δ wt %) |
|---|---|---|---|---|
| 1 | 1 | A | 175.8 | 18.2 |
| 2 | 2 | A | 177.4 | 10.3 |
| 3 | 3 | A | 176.4 | 15.7 |
| 4 | 1 | B | 164.9 | 19.3 |
| 5 | 2 | B | 164.1 | 11.0 |
| 6 | 3 | B | 163.6 | 18.4 |
| 7 | 4 | A | 164.4 | 21.8 |
| 8 | 5 | A | 163.3 | 12.6 |
| 9 | 6 | A | 164.3 | 16.2 |
| 10 | 4 | B | 161.5 | 22.6 |
| 11 | 5 | B | 155.9 | 15.4 |
| 12 | 6 | B | 148.8 | 22.4 |
| 13 | 7 | A | 141.8 | 34.0 |
| 14 | 8 | A | 127.8 | 21.7 |
| 15 | 9 | A | 134.6 | 27.4 |
| 16 | 7 | B | 130.0 | 35.2 |
| 17 | 8 | B | 109.2 | 27.1 |
| 18 | 9 | B | 116.4 | 31.1 |
| 19 | 10 | B | 179.7 | 14.5 |
| 20 | 11 | B | 168.0 | 9.1 |
| 21 | 12 | B | 175.3 | 10.9 |
| 22 | 42 | A | 170.0 | 23.4 |
| 23 | 43 | A | 162.8 | 16.9 |
| 24 | 44 | A | 168.0 | 19.7 |

Table 3 reflects the Tg and Gel swell values for resin compositions 4, 5, 6, 13, 14, 15, 16, 17, 18, 19, 20, 21, 22, 23, 24, 31, 32, 33, 34, 35, 36, 37, 38, 39, 40, 41, 45, 46, 47, 48, 49, 50, 51, 52, 53, 54, 55, 56, 57, 58, 59, 66, 67, and 68, wherein the mold temperature is 60° C.

TABLE 3

| Example | Resin Composition | Catalyst Composition | Tg (° C.) | Gel Swell (Δ wt %) |
|---|---|---|---|---|
| 25 | 13 | C | 127.1 | 23.2 |
| 26 | 14 | C | 139.2 | 14.8 |
| 27 | 15 | C | 130.8 | 19.4 |
| 28 | 16 | D | 152.3 | 23.5 |
| 29 | 17 | D | 146.3 | 17.2 |
| 30 | 18 | D | 144.3 | 20.6 |
| 31 | 19 | E | 158.6 | 22.2 |
| 32 | 20 | E | 137.1 | 16.4 |
| 33 | 21 | E | 148.2 | 19.3 |
| 34 | 4 | F | 167.9 | 20.6 |
| 35 | 5 | F | 156.5 | 12.3 |
| 36 | 6 | F | 164.9 | 14.9 |
| 37 | 22 | G | 165.0 | 21.3 |
| 38 | 23 | G | 155.8 | 13.0 |
| 39 | 24 | G | 151.8 | 17.6 |
| 40 | 31 | B | 173.2 | 13.3 |
| 41 | 32 | B | 179.5 | 15.3 |
| 42 | 33 | B | 183.1 | 21.8 |
| 43 | 34 | B | 176.4 | 15.5 |
| 44 | 35 | B | 183.6 | 20.0 |
| 45 | 36 | A | 182.9 | 21.8 |

TABLE 3-continued

| Example | Resin Composition | Catalyst Composition | Tg (° C.) | Gel Swell (Δ wt %) |
|---|---|---|---|---|
| 46 | 37 | A | 183.9 | 13.9 |
| 47 | 38 | A | 183.3 | 20.5 |
| 48 | 39 | B | 167.4 | 24.1 |
| 49 | 40 | B | 143.2 | 18.4 |
| 50 | 41 | B | 157.2 | 22.2 |
| 51 | 45 | B | 165.1 | 22.9 |
| 52 | 46 | B | 160.0 | 17.3 |
| 53 | 47 | B | 165.2 | 19.8 |
| 54 | 48 | A | 172.6 | 21.6 |
| 55 | 49 | A | 165.5 | 12.3 |
| 56 | 50 | A | 172.6 | 15.4 |
| 57 | 51 | A | 171.4 | 22.9 |
| 58 | 52 | A | 165.6 | 12.7 |
| 59 | 53 | A | 172.9 | 15.7 |
| 60 | 54 | B | 168.3 | 23.6 |
| 61 | 55 | B | 150.4 | 13.5 |
| 62 | 56 | B | 164.0 | 16.9 |
| 63 | 57 | B | 137.9 | 38.8 |
| 64 | 58 | B | 118.8 | 26.9 |
| 65 | 59 | B | 126.4 | 32.4 |
| 66 | 63 | A | 169.8 | 22.5 |
| 67 | 64 | A | 164.0 | 15.1 |
| 68 | 65 | A | 171.7 | 18.9 |

Table 4 reflects the Tg and Gel swell values for resin compositions 1, 2, 3, 10, 11, 12, 25, 26, 27, 28, 29, 30, 63, 64, and 65, wherein the mold temperature is 40° C.

TABLE 4

| Example | Resin Composition | Catalyst Composition | Tg (° C.) | Gel Swell (Δ wt %) |
|---|---|---|---|---|
| 69 | 1 | A | 184.3 | 16.6 |
| 70 | 2 | A | 181.7 | 10.2 |
| 71 | 3 | A | 183.6 | 12.4 |
| 72 | 1 | B | 179.6 | 17.2 |
| 73 | 2 | B | 176.7 | 10.7 |
| 74 | 3 | B | 182.6 | 13.2 |
| 75 | 10 | B | 178.1 | 17.4 |
| 76 | 11 | B | 178.5 | 11.0 |
| 77 | 12 | B | 182.5 | 13.9 |
| 78 | 25 | B | 180.0 | 14.6 |
| 79 | 2 | B | 180.9 | 11.4 |
| 80 | 26 | B | 179.3 | 9.5 |
| 81 | 27 | B | 187.3 | 6.8 |
| 82 | 28 | B | 180.3 | 16.3 |
| 83 | 3 | B | 180.7 | 14.3 |
| 84 | 29 | B | 184.1 | 12.6 |
| 85 | 30 | B | 200.2 | 11.9 |
| 86 | 1 | B | 179.6 | 17.5 |
| 87 | 60 | B | 166.9 | 21.9 |
| 88 | 61 | B | 158.9 | 16.6 |
| 89 | 62 | B | 164.3 | 19.8 |

Gel Swell Experiment determined in Diesel fuel. From examples 25-39, two sample coupons were cut that measured approximately 1"×½"×½". The sample coupons were numbered, weighed and then placed in a 4 oz glass bottle containing 50 mL of Diesel fuel. The respective glass bottle containing each sample set were sealed and stored for 24 h at room temperature (20° C.), followed by 72 h at 100° C. in a sealed autoclave after which the solvent was removed. The samples were washed with hexanes to remove any residual fuel from the coupon surface and then allowed to air dry inside a fume hood for 15 min. At this stage, the coupons were weighed and the gel swell (Δ wt %) was calculated as follows: [(final weight−initial weight)/(initial weight)×100] and recorded in Table 5.

Table 5 reflects the Tg and Gel swell values for resin compositions 13, 14, 15, 16, 17, 18, 19, 20, 21, 4, 5, 6, 22, 23, and 24, wherein the mold temperature is 60° C.

TABLE 5

| Example | Resin Composition | Catalyst Composition | Tg (° C.) | Gel Swell (Δ wt %) |
|---|---|---|---|---|
| 90 | 13 | C | 127.1 | 7.1 |
| 91 | 14 | C | 139.2 | 4.5 |
| 92 | 15 | C | 130.8 | 5.7 |
| 93 | 16 | D | 152.3 | 8.4 |
| 94 | 17 | D | 146.3 | 6.1 |
| 95 | 18 | D | 144.3 | 7.3 |
| 96 | 19 | E | 147.4 | 7.1 |
| 97 | 20 | E | 128.6 | 5.1 |
| 98 | 21 | E | 125.2 | 6.1 |
| 99 | 4 | F | 167.9 | 7.1 |
| 100 | 5 | F | 156.5 | 3.8 |
| 101 | 6 | F | 164.9 | 4.6 |
| 102 | 22 | G | 165.0 | 7.2 |
| 103 | 23 | G | 155.8 | 3.9 |
| 104 | 24 | G | 151.8 | 5.5 |

What is claimed is:

1. A ROMP composition having an improved resistance to hydrocarbon fluids determined by the gel swell, the ROMP composition comprising a resin composition and a catalyst composition, wherein the resin composition comprises dicumyl peroxide and a cyclic olefin composition formed by a mixture of dicyclopentadiene/tricyclopentadiene in % ratios of 65-60/35-40 or 80-75/20-25 or 95-93/5-7 or 99.83/0.17, and the catalyst composition comprises at least one metal carbene olefin metathesis catalyst; wherein, the ROMP composition exhibits a gel swell which is at least 10% lower than a comparable ROMP composition containing an equimolar amount of di-tert-butyl peroxide.

2. The ROMP composition according to claim 1, wherein the resin composition further comprises at least one antioxidant.

3. The ROMP composition according to claim 1, wherein the resin composition further comprises at least one impact modifier.

4. The ROMP composition according to claim 1, wherein the resin composition further comprises at least one exogenous inhibitor.

5. The ROMP composition according to claim 1, wherein the at least one cyclic olefin is a polycyclic olefin.

6. A method of making a ROMP composition having an improved resistance to hydrocarbon fluids determined by gel swell, the method comprising: providing a catalyst composition comprising at least one metal carbene olefin metathesis catalyst; providing a resin composition comprising a cyclic olefin composition and dicumyl peroxide, wherein the cyclic olefin composition is formed by a mixture of dicyclopentadiene/tricyclopentadiene in % ratios of 65-60/35-40 or 80-75/20-25 or 95-93/5-7 or 99.83/0.17; combining the catalyst composition and the resin composition to form a ROMP composition; and subjecting the ROMP composition to conditions effective to promote polymerization of the ROMP composition, wherein the ROMP composition exhibits a gel swell which is at least 10% lower than a comparable ROMP composition containing an equimolar amount of di-tert-butyl peroxide.

7. The method according to claim 6, wherein the ROMP composition further comprises at least one antioxidant.

8. The method according to claim 6, wherein the ROMP composition further comprises at least one impact modifier.

9. The method according to claim 6, wherein the ROMP composition further comprises at least one exogenous inhibitor.

10. The method according to claim 6, wherein the at least one cyclic olefin is a polycyclic olefin.

11. An article of manufacture made by the method of claim 6.

12. An article of manufacture having an improved resistance to hydrocarbon fluids, determined by gel swell, the article of manufacture comprising a ROMP composition comprising a resin composition and a catalyst composition, wherein the resin composition comprises dicumyl peroxide and a cyclic olefin composition formed by a mixture of dicyclopentadiene/tricyclopentadiene in % ratios of 65-60/35-40 or 80-75/20-25 or 95-93/5-7 or 99.83/0.17, and the catalyst composition comprises at least one metal carbene olefin metathesis catalyst, wherein article of manufacture exhibits a gel swell which is at least 10% lower than a comparable article of manufacture comprising a ROMP composition comprising an equimolar amount of di-tert-butyl peroxide.

* * * * *